US011220010B2

(12) United States Patent
Negishi

(10) Patent No.: US 11,220,010 B2
(45) Date of Patent: Jan. 11, 2022

(54) FORCE SENSOR, TORQUE SENSOR, FORCE-SENSE SENSOR, FINGERTIP-FORCE SENSOR, AND METHOD OF MANUFACTURING THE SAME

(71) Applicant: CANON KABUSHIKI KAISHA, Tokyo (JP)

(72) Inventor: Mahito Negishi, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 16/781,419

(22) Filed: Feb. 4, 2020

(65) Prior Publication Data

US 2020/0173869 A1 Jun. 4, 2020

Related U.S. Application Data

(63) Continuation of application No. PCT/JP2018/031156, filed on Aug. 23, 2018.

(30) Foreign Application Priority Data

Aug. 30, 2017 (JP) .............................. JP2017-166220

(51) Int. Cl.
*B25J 13/08* (2006.01)
*G01L 1/04* (2006.01)
(Continued)

(52) U.S. Cl.
CPC ............ *B25J 13/085* (2013.01); *B25J 13/084* (2013.01); *G01L 1/04* (2013.01); *G01L 3/08* (2013.01); *G01L 3/101* (2013.01); *G01L 5/169* (2020.01)

(58) Field of Classification Search
CPC ... G01L 1/04; G01L 5/169; G01L 3/08; G01L 3/101; B25J 13/085; B25J 13/084
(Continued)

(56) References Cited

U.S. PATENT DOCUMENTS

| 4,747,313 A | 5/1988 | Okada |
|---|---|---|
| 7,057,154 B2 | 6/2006 | Kitamura |

(Continued)

FOREIGN PATENT DOCUMENTS

| CN | 1229915 A | 9/1999 |
|---|---|---|
| CN | 101722519 A | 6/2010 |

(Continued)

OTHER PUBLICATIONS

Yu Chunzhan et al., Research on the dynamic characteristics of parallel six-axis accelerometer based on Kane's method, Chinese Journal of Scientific Instrument, vol. 36, No. 7, Jul. 2015, pp. 1611-1617.

(Continued)

*Primary Examiner* — Octavia Hollington
(74) *Attorney, Agent, or Firm* — Canon U.S.A., Inc. I.P. Division

(57) ABSTRACT

A force sensor includes a first member, a second member, an intermediate member, a first elastic structure that couples the first member and the intermediate member, a second elastic structure that couples the second member and the intermediate member, and a displacement detector that measures displacements of the first member and the second member. It is possible to provide a force sensor that has high detection precision and that is compact.

20 Claims, 47 Drawing Sheets

(51) Int. Cl.
*G01L 3/08* (2006.01)
*G01L 3/10* (2006.01)
*G01L 5/169* (2020.01)

(58) Field of Classification Search
USPC .................................................... 73/862.041
See application file for complete search history.

(56) References Cited

U.S. PATENT DOCUMENTS

| | | | | |
|---|---|---|---|---|
| 9,035,873 | B2* | 5/2015 | Takahata | G06F 3/0362 |
| | | | | 345/156 |
| 9,200,969 | B2* | 12/2015 | Ueno | G01L 1/125 |
| 9,261,422 | B2* | 2/2016 | Wu | G01L 5/1627 |
| 10,583,570 | B2* | 3/2020 | Ogata | G01L 1/12 |
| 11,002,625 | B2* | 5/2021 | Noh | G01L 5/166 |
| 2002/0056326 | A1* | 5/2002 | Gombert | G01L 5/166 |
| | | | | 73/862.046 |
| 2016/0288338 | A1 | 10/2016 | Murphy et al. | |
| 2017/0136629 | A1 | 5/2017 | Nagata | |

FOREIGN PATENT DOCUMENTS

| | | |
|---|---|---|
| CN | 102317750 A | 1/2012 |
| CN | 105308411 A | 2/2016 |
| CN | 105651446 A | 6/2016 |
| CN | 205691271 U | 11/2016 |
| CN | 205826190 U | 12/2016 |
| DE | 10301059 A1 | 7/2004 |
| JP | 562162935 A | 7/1987 |
| JP | S63311121 A | 12/1988 |
| JP | H041540 A | 1/1992 |
| JP | H04130220 A | 5/1992 |
| JP | 08-199856 A | 8/1996 |
| JP | H10282134 A | 10/1998 |
| JP | 2007040774 A | 2/2007 |
| JP | 2007315878 A | 12/2007 |
| JP | 2010169586 A | 8/2010 |
| JP | 4779117 B2 | 9/2011 |
| JP | 2012237570 A | 12/2012 |
| JP | 2017096929 A | 6/2017 |
| WO | 2005015146 A1 | 2/2005 |
| WO | 2010/088922 A1 | 8/2010 |
| WO | 2012153643 A1 | 11/2012 |

OTHER PUBLICATIONS

Tae-Keun Kim, et al., Development of Joint Torque Sensor and Calibration Method for Robot Finger, 2013 10th International Conference on Ubiquitous Robots and Ambient Intelligence (URAI), Nov. 2013, pp. 161-162.

* cited by examiner

FORCE SENSOR, TORQUE SENSOR, FORCE-SENSE SENSOR, FINGERTIP-FORCE SENSOR, AND METHOD OF MANUFACTURING THE SAME

CROSS-REFERENCE TO RELATED APPLICATIONS

This application is a Continuation of International Patent Application No. PCT/JP2018/031156, filed Aug. 23, 2018, which claims the benefit of Japanese Patent Application No. 2017-166220, filed Aug. 30, 2017, both of which are hereby incorporated by reference herein in their entirety.

TECHNICAL FIELD

The present invention relates to a force sensor that measures a force and a torque and a method of manufacturing the force sensor. In particular, the present invention relates to a force sensor that is suitably used in the fields of automatic assembly apparatuses, robots, and the like.

BACKGROUND ART

For example, in the field of robots, torque sensors, force-sense sensors, fingertip-force sensors, and the like are used as force sensors for detecting a torque and a force.

A torque sensor is attached, for example, to a rotary joint of a robot and is used as a device that measures a torque in one direction, which is transmitted via the joint.

A force-sense sensor is attached, for example, to a wrist between a robot arm and a robot hand and is used as a device that detects a force in six directions and a moment applied to a distal end of the robot hand. A fingertip-force sensor is used, for example, as a device that measures a force in three directions applied to a fingertip at a distal end of a robot hand and that detects a force that a grasped object receives from the environment.

Japanese Patent Laid-Open No. 2010-169586 (PTL 1) discloses a torque sensor that measures a rotational torque around the Y axis that is generated between a first member and a second member. The torque sensor includes a strain-generating portion that is disposed between the first member and the second member and a plurality of column portions that are outside the strain-generating portion and that are coupled to the first member and the second member. The torque sensor described in PTL 1 is a sensor in which the strain-generating portion deforms when a torsional torque is applied, the deformation is measured by a strain gauge, and the deformation is converted to a torque value. Because the torque sensor includes the column portions, even when a bending moment force around an axis at right angles to the Y axis is applied, deformation of the strain-generating portion is suppressed.

However, in the sensor described in PTL 1, the column portions, which support a bending moment, need to be rigid against the bending moment, while the column portions need to be flexible against a rotational torque. This is because, if the columns portions are rigid, a rotational torque is also supported by the column portions, and therefore deformation of the strain-generating portion is suppressed, and it becomes difficult to measure a torque. In order to make the column portions flexible against a rotational torque, it is necessary to increase the length of the column portions. However, if the length is increased, the distance between the first member and the second member, which are targets whose rotational torques around the Y axis measures are to be measured, is increased.

When measuring displacement between the first member and the second member, in general, measurement sensitivity decreases as the distance between the measurement targets increases. Accordingly, when the length of the column portions is increased, it becomes difficult to configure a sensor having high sensitivity.

For example, it is far more difficult to achieve a sensitivity (resolution) of 1 nm for a long distance of 10 mm than to achieve the same sensitivity for a short distance of 10 µm.

In this regard, an example of a magnetic displacement gauge will be described in further detail. A magnetic displacement gauge is a displacement gauge that utilizes a fact that the strength of magnetic field of a permanent magnet changes in accordance with distance.

The relationship between the strength of magnetic field of a cylindrical magnet, which has a radius R and a length L, and the distance between the magnet and a measurement target is represented by the following equation.

$$B = \frac{B_r}{2}\left(\frac{L+x}{\sqrt{R^2+(L+x)^2}} - \frac{x}{\sqrt{R^2+x^2}}\right) \quad (1)$$

Here, B is the magnetic flux density at a distance x from the magnet, and $B_r$ is the residual magnetic flux density of the magnet.

FIG. 52 is a graph illustrating the relationship between the distance and the sensitivity when a neodymium magnet whose Br=12000 Gauss is used. From this figure, it can be seen that the sensitivity extremely decreases when the distance increases to 10 mm. When the value is calculated, the sensitivity for the distance of 10 mm is only 0.5% of the sensitivity for the distance of 10 µm. Thus, it is difficult to configure a sensor having high sensitivity.

Moreover, when the distance to a measurement target is large, the size of a component to which a detector for detecting change in magnetism is attached needs to be large. Considering change in dimensions of the attachment component, due to the temperature and the weight thereof, and vibrations, increase in size is disadvantageous for a sensor having high sensitivity.

Moreover, the thickness of the sensor is increased, because the column portions need to be long. The thickness of the sensor influences the size of each joint when, for example, the sensor is mounted as a component of robot. Increase in the thickness has a negative effect on the movable range of the joint and the operable range of the robot.

Therefore, it is desirable to realize a force sensor that has high detection precision and that is compact.

SUMMARY OF INVENTION

The present invention is a force sensor that detects information of a force by using a relative displacement amount between a first member and a second member. The first member and the second member are coupled to each other via a first elastic structure, a second elastic structure, and an intermediate member. The first elastic structure couples the first member and the intermediate member. The second elastic structure couples the second member and the intermediate member. A displacement detector that detects the relative displacement amount between the first member and the second member is provided in the first member and the second member.

Further features of the present invention will become apparent from the following description of exemplary embodiments with reference to the attached drawings.

DESCRIPTION OF EMBODIMENTS

Hereafter, embodiments of the present invention will be described with reference to the drawings.

First Embodiment

Figure 1:
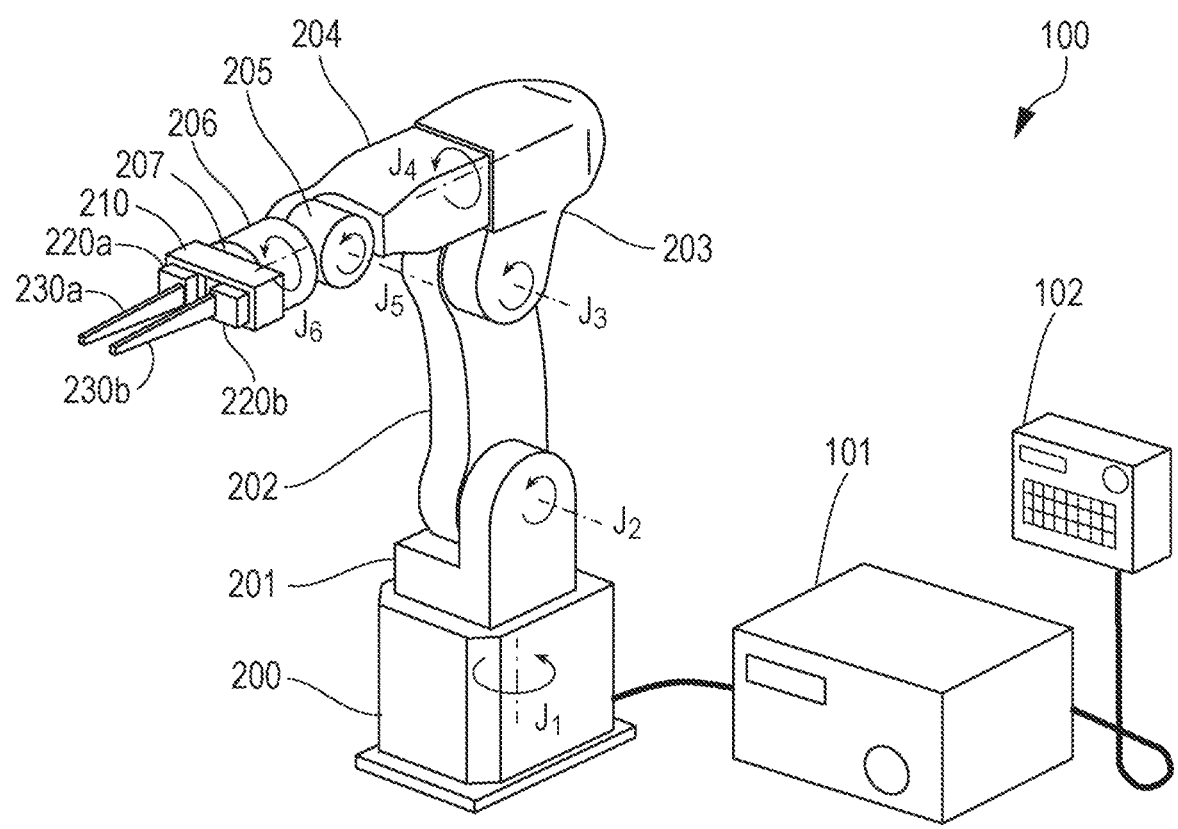
FIG. 1 is a perspective view of a six-axis articulated robot assembly apparatus.

FIG. 1 illustrates a six-axis articulated robot apparatus 100 including a force sensor according to a first embodiment of the present invention. The force sensor according to the present embodiment is attached to each of six rotary joints J1 to J6 that connect links 200 to 206 to each other and measures a torque that is transmitted via the joint. The force sensor according to the present embodiment may be referred to as a "torque sensor" in the following description.

Figure 2:
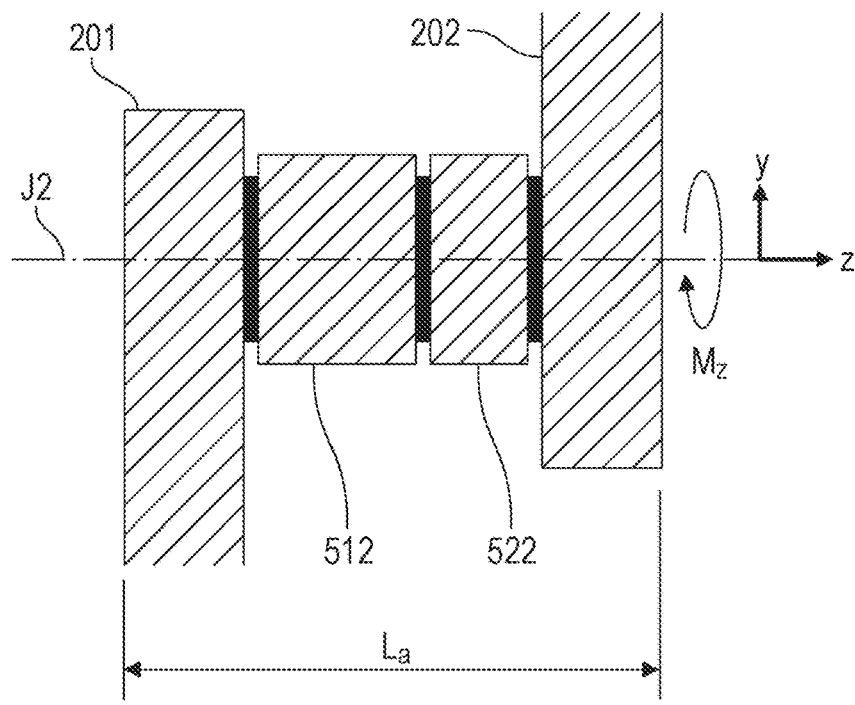
FIG. 2 illustrates an example of a joint structure according to a first embodiment.

Referring to FIG. 2, attachment of the torque sensor to a joint will be described. Here, the joint J2, which connects the links 201 and 202, will be described. The other joints of the six-axis articulated robot apparatus 100 are configured in a similar way. The joint connects the links to each other via a motor 512 and a torque sensor 522. With this configuration, because all torques transmitted through the joint pass through the torque sensor 522, it is possible to measure a correct joint torque Mz. However, bending torques Mx and My, which are unnecessary, are applied to the torque sensor. If rigidity in the bending direction is low, the characteristic frequency of the entirety of the robot is low, and an unfavorable influence occurs in the kinematic performance of the robot. Therefore, high rigidity in the bending direction is necessary. Accordingly, a torque sensor has a higher performance as the rigidity ratio $\alpha = Mx/Mz$ increases. Preferably, the thickness of the torque sensor is smaller, because the thickness La of the joint is determined by the motor 512 and the torque sensor 522.

Figure 3:
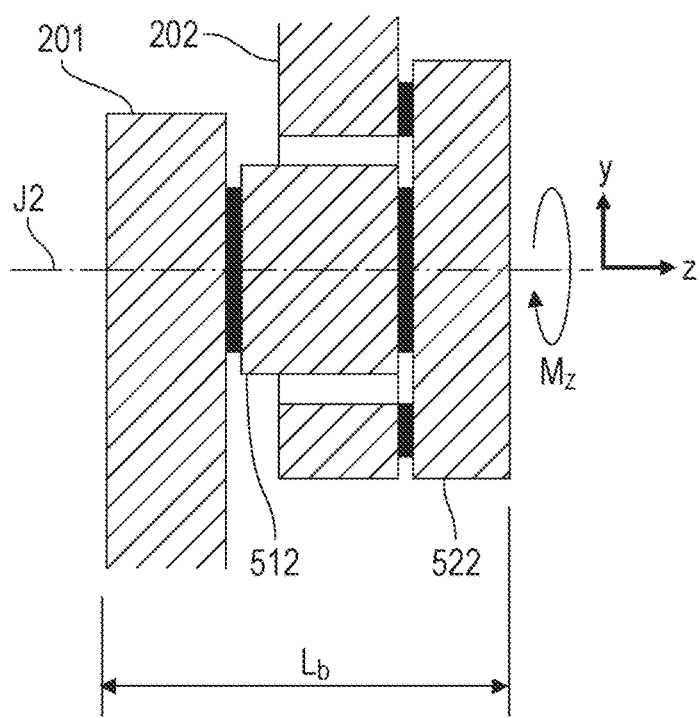
FIG. 3 illustrates another example of a joint structure according to the first embodiment.

FIG. 3 illustrates an example of a configuration in which a method of attaching the torque sensor is changed. In the example illustrated in FIG. 2, it is assumed that the torque sensor 522 is fixed by tightening bolts from both sides. In the example illustrated in FIG. 3, it is possible to tighten a bolt from one side. The sensor according to the present embodiment is more suitable for such a joint configuration. Also in this example, preferably, the thickness of the torque sensor is smaller, because the thickness Lb of the joint is determined by the motor 512 and the torque sensor 522.

Figure 4:
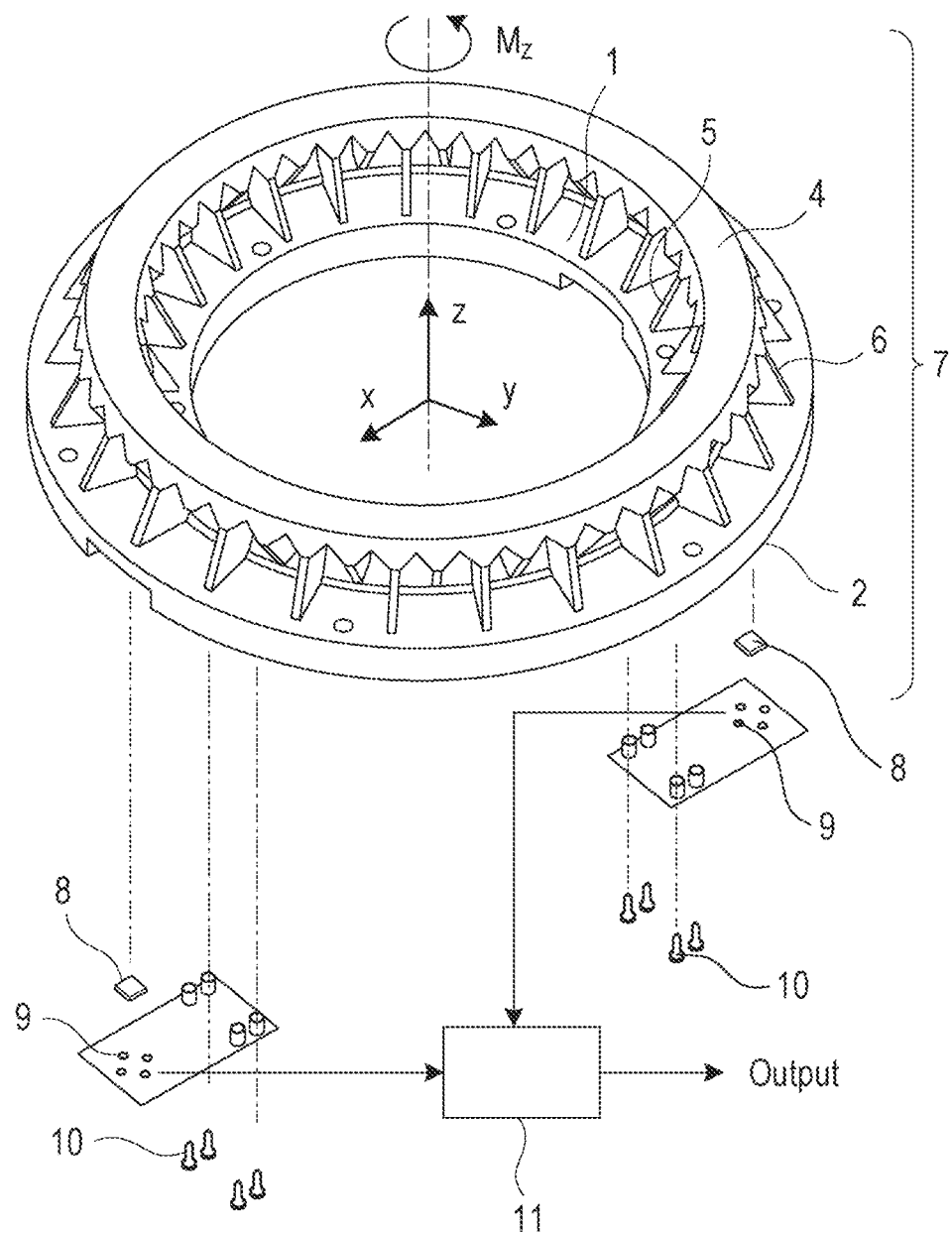
FIG. 4 is a configuration view of a torque sensor according to the first embodiment.
Figure 5:
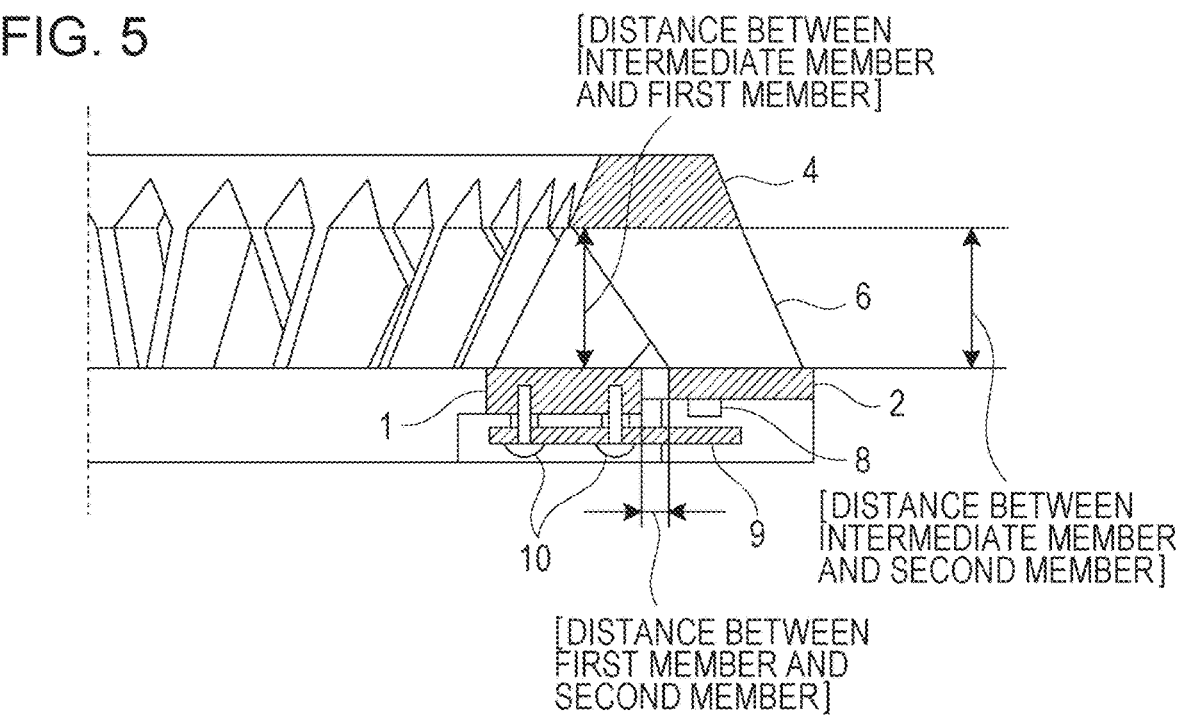
FIG. 5 is a partial sectional view of the torque sensor according to the first embodiment.

FIG. 4 is a schematic perspective view and FIG. 5 is a partial sectional view illustrating the configuration of the torque sensor according to the present embodiment. For convenience of description, XYZ coordinates are defined at the center of the sensor. A method of attaching the torque sensor will be described for the case of the joint J2 illustrated in FIG. 3. The torque sensor includes a first member 1 and a second member 2. The first member 1 is fixed to the motor 512, the second member 2 is fixed to the link 202.

An intermediate member 4 is provided, the first member 1 and the intermediate member 4 are coupled via a first elastic structure 5 such as a plate spring, the second member 2 and the intermediate member 4 are coupled via a second elastic structure 6 such as a plate spring. The elastic structure 5 and the elastic structure 6 are each provided in a plurality, and are alternately disposed.

The first member 1, the second member 2, the intermediate member 4, and the first elastic structures 5, and the second elastic structures 6 constitute an elastic body 7 of the torque sensor. The first member and the second member, which are disposed with the Z-axis as the central axis thereof, have annular portions that are concentric but have different radii.

At two portions that are positioned so as to face each other with the Z-axis therebetween, angle detectors for measuring displacements (relative angles) of the first member and the second member. Each of the angle detectors includes a scale 8 and a sensor board 9 and outputs a relative displacement between the scale 8 and the sensor board 9.

As illustrated in FIG. 5, in the torque sensor according to the present embodiment, the distance between the first member and the second member is smaller than each of the distance between the intermediate member and the first member and the distance between the intermediate member and the second member. The first member, the second member, and the intermediate member are disposed in such a way that an end portion of the first member coupled to the first elastic structure and an end portion of the second member coupled to the second elastic structure face an end portion of the intermediate member coupled to the first and second elastic structures.

As described above, in order to detect displacement, it is easier to realize a high sensitivity as the distance between detection targets (the distance between the first member and the second member) decreases.

That is, in the present embodiment, displacements of the first member and the second member, whose relative distance is the smallest among the three members, which are the first member, the second member, and the intermediate member, are measured. Therefore, it is possible to reduce the distance between the scale 8 and the sensor board 9, and the present embodiment has a configuration that is advantageous in realizing high sensitivity. Moreover, with this configuration, the size of a component to which the detector is to be attached may be small. It is important to reduce the size of the component, because change in the dimensions and vibrations of the component influence the precision of a measured value.

Preferably, the distance between the first member and the second member is specifically in the range of 10 μm to 10 mm. In the sensor according to the present invention, because the relative positions of the first member and the second member change due to deformation of the elastic body, in order to prevent contact, the distance between the first member and the second member needs to be larger than the maximum deformation amount of the elastic body. It may be preferable to increase the rigidity of the elastic body because, by doing so, the maximum deformation amount can be reduced and the distance can be reduced. However, if the distance is too small, the displacement detector needs to have an extremely high measurement sensitivity. Therefore, practically, the distance between the first member and the second member is preferably about 10 μm. Preferably, the lower limit is 10 μm also in consideration of the machining precision of a mechanical component.

The upper limit of the distance between the first member and the second member influences the size of the torque sensor. In consideration of mounting of the torque sensor in a robot arm or a robot hand, preferably, the upper limit is about 10 mm.

Here, a magnetic displacement detector will be described first. However, an optical displacement detector may be used, as described below. The sensor board 9 is fixed to the first member 1 with an attachment bolt 10, and the scale 8 is fixed to the second member 2 with an adhesive. Signal wires from the two sensor boards 9 are connected to a control circuit board 11 of the torque sensor. The control circuit board 11 performs signal processing as follows. That is, the relative angle between the first member and the second member is calculated by calculating the average of outputs of the two sensor boards 9 and by dividing the average by the attachment radius of the displacement detector. The relative angle is converted into a torque value by multiplying the relative angle by the torsional rigidity Kz of the elastic body 7, which is preset information, and the torque value is output.

In the above configuration, when a torsional torque Mz is applied to the torque sensor, the first elastic structure 5 and the second elastic structure 6 deform, and the first member 1 and the second member 2 become rotationally displaced relative to each other. The rotational displacement is detected by the displacement detectors disposed at two positions. Because displacements detected at two point-symmetric positions are averaged, an error component other than rotation, such as XY translation, is cancelled out, and a torque can be detected with high precision.

Here, it is important that the distance between the first member 1 and the second member 2 be small. This is because, as described above, it is possible to realize a higher sensitivity in measuring the relative distance between components that are separated by a small distance than in measuring the relative distance between components that are separated by a large distance.

In the present embodiment, the number of the first elastic structures and the number of the second elastic structures are each 24. However, an embodiment of the present invention is not limited to this example. It is possible to increase the rigidity ratio by increasing the number of elastic structures. For example, by increasing each of the number of the first elastic structures and the number of the second elastic structures to 192, it is expected that the rigidity ratio is increased by 4 times. The size and the number of the elastic structures can be designed, for example, by performing a simulation using a finite element method.

Next, a method of determining the size and the number of the elastic structures according to the present embodiment will be described. First, the idea behind the present embodiment will be described.

In the description of the present embodiment, the definitions of main symbols used in mathematical expressions are as follows.

L: length of elastic structure
H: thickness of elastic structure
B: width of elastic structure
E: Young's modulus of elastic structure
R: circumferential arrangement of elastic structures, radius
N: number of elastic structures
Mx: rotation moment around x-axis, bending torque
Mz: rotation moment around z-axis, torsional torque Because the torque sensor is constituted by the elastic body and the rotation angle measurement unit, the mechanical performance is determined by the elastic body. Therefore, first, from the viewpoint of the material mechanics, the characteristics of a structure in which elastic structures are arranged on a circumference will be explained. In particular, it will be clarified that the rigidity ratio between the torsional direction and the bending direction increases as the number of elastic structures increases and it is possible to configure a torque sensor having higher performance.

Figure 15:
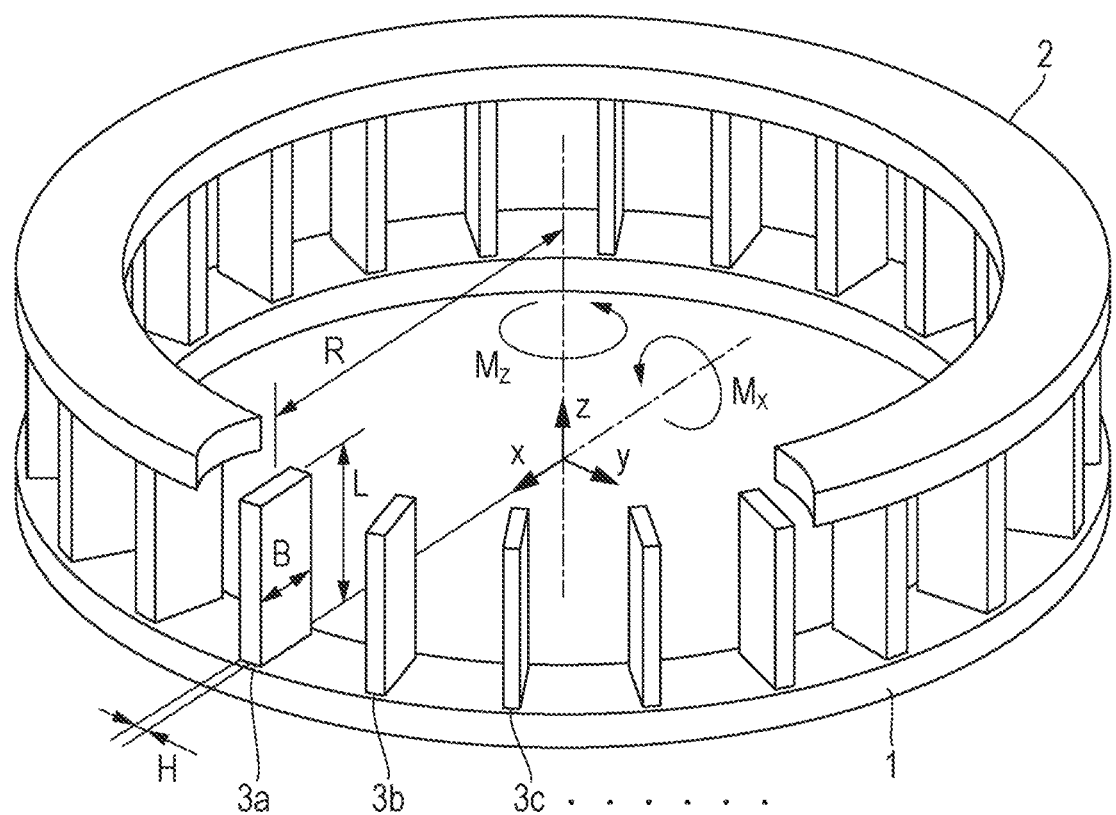
FIG. 15 is a schematic view of a model used to examine the number of elastic structures that are circumferentially arranged.

Referring to a model illustrated in FIG. 15, the number of elastic structures will be examined. For convenience of description, XYZ coordinates are set at the center of the torque sensor. To the torque sensor, in addition to a torsional torque Mz around the z-axis, which is to be measured, a bending torque Mx is also applied.

The torque sensor detects torsional deformation due to Mz, that is, a very small rotation angle, and converts the rotation angle into a torque value by using the rigidity Kz in the torsional direction. Accordingly, the rigidity Kz is a design value that is determined by the measurable range of the torque sensor, the resolution of the rotation angle detector, and the like.

On the other hand, it is desirable that the rigidities Kx and Ky in the bending directions perpendicular to the torsional direction be higher, because these rigidities influence the characteristic frequency of the entirety of an apparatus to which the torque sensor is attached. If these rigidities are not high, the joint of the robot arm illustrated in FIG. 1 is too flexible, so that the characteristic frequency is low and vibration occurs easily.

That is, it is important for a torque sensor to have high rigidities Kx and Ky in the bending directions relative to the rigidity Kz in the torsional direction.

Hereafter, only Kx will be considered, because Kx and Ky are the same due to symmetry.

The model illustrated in FIG. 15 differs from the embodiment in that, as with existing torque sensors, the first member 1 and the second member 2 face each other and the first member 1 and the second member 2 are coupled to each other via a plurality of elastic structure 3a, 3b, 3c, . . . .

The rotational rigidity Kz around the Z-axis can be represented as follows, where Ks is the bending rigidity of N elastic structures that are arranged on a circumference having a radius R, $$K_z = NR^2 K_s \qquad (2).$$

When Ks is further expanded, assuming that the elastic structures each have a rectangular cross section, $$K_z = \frac{ENR^2 BH^3}{L^3}. \qquad (3)$$

The rotational rigidity Kx around the X axis can be represented as follows, where Kp is the rigidity of N elastic structures in the compression direction, $$K_x = K_p \sum_n R^2 \cos^2\left(2\pi \frac{n}{N}\right). \qquad (4)$$

When Kp is further expanded assuming that the elastic structures each have a rectangular cross section, $$K_x = \frac{ENR^2 BH}{2L}. \qquad (5)$$

Preferably, the rigidity Kx of the torque sensor in the bending direction is high relative to the rigidity Kz in the measurement direction. When α denotes the rigidity ratio between the two rigidities, $$\alpha = \frac{K_x}{K_z} = \frac{1}{2}\left(\frac{L}{H}\right)^2. \qquad (6)$$

That is, as the ratio L/H between the length and the thickness of the elastic structure increases, the rigidity ratio increases, and therefore a better torque sensor can be configured. Moreover, by substitution of Expression (3), the following equation is obtained.

$$\alpha = \frac{1}{2}\left(\frac{ENR^2 B}{K_z}\right)^{2/3} \qquad (7)$$

Because the rigidity Kz of the torque sensor in the torsional direction is given as a design condition as described above, it can be seen that the rigidity ratio α can be increased by increasing the term shown below.

$$ENR^2 B \qquad (8)$$

For example, it becomes more advantageous as the number N of elastic structures increases.

Next, the effect of the number of elastic structures will be described by substitution of the following specific values.
for an ion-based material, E=200 Gpa
radius of sensor: R=100 mm
thickness of sensor: L=10 mm
width of elastic structure: B=10 mm
thickness of elastic structure: H=2 mm
number of elastic structures: N=24
torsional direction rigidity: Kz=120 kNm/rad (from Expression (3))
bending direction rigidity: Kx=6000 kNm/rad (from Expression (4))
rigidity ratio: α=50 (from Expression (6))

The thickness H needs to be changed inversely proportional to the cube root of N so that the rigidity Kz, which is a design condition, would not change even if the number N of elastic structures is increased.

Figure 16:
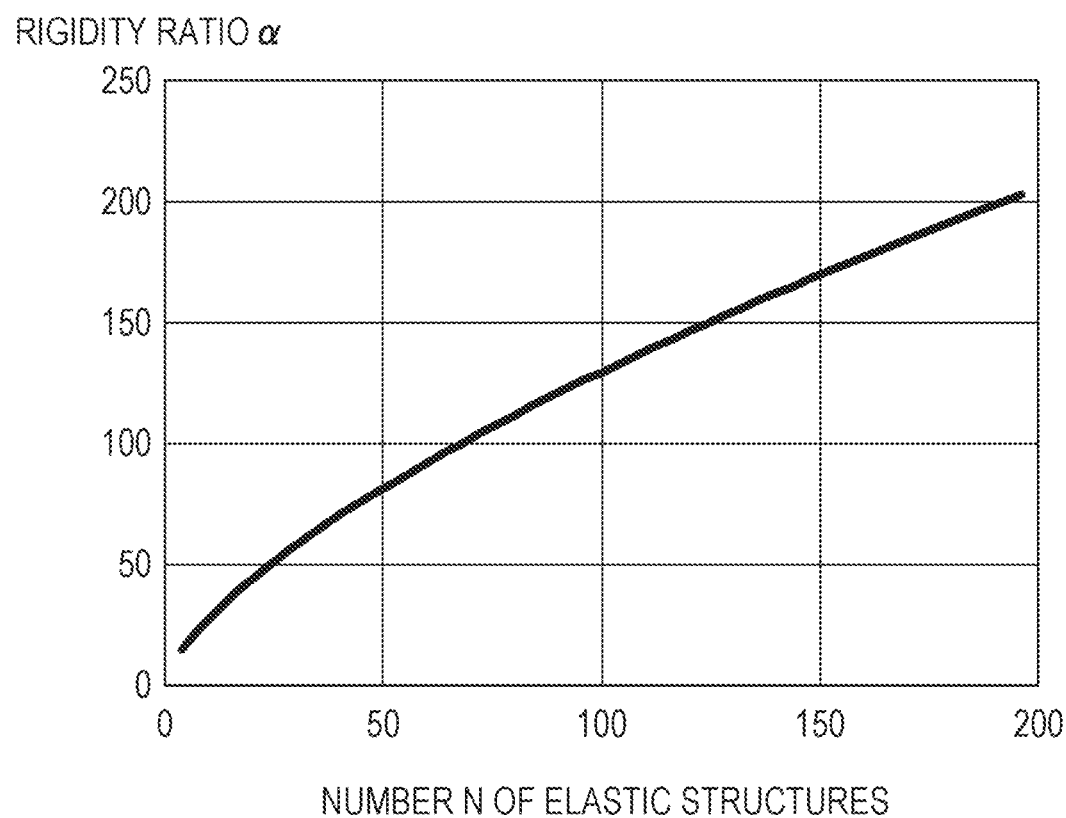
FIG. 16 is a graph of the number of elastic structures and the rigidity ratio.

FIG. 16 is a graph in which the rigidity ratio α is plotted against the number N of elastic structures. As can be clearly seen from the figure, as the number of elastic structures increases, it is possible to configure a torque sensor having a higher rigidity ratio.

In Expression (6), it has been described that it becomes more advantageous as the ratio L/H increases. However, L determines the thickness of the torque sensor. That is, there is a trade-off between reduction of the thickness of the torque sensor and increase of the rigidity ratio, and reduction in the thickness is limited with this configuration. Thus, division of the elastic structure into two will be considered next.

Figure 17A:
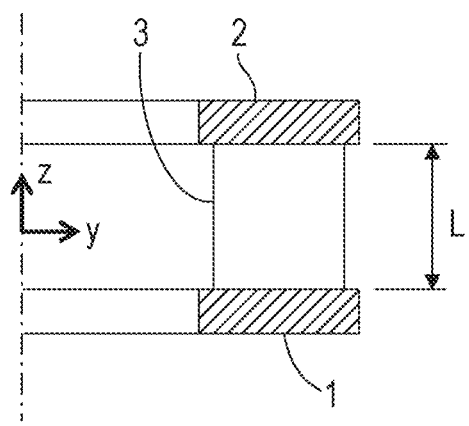
FIG. 17A is a sectional view of the model illustrated in FIG. 15.

FIG. 17A is a sectional view of an existing torque sensor elastic body illustrated in FIG. 15. The first member 1 and the second member 2 are coupled to each other via the elastic structure 3.

Figure 17B:
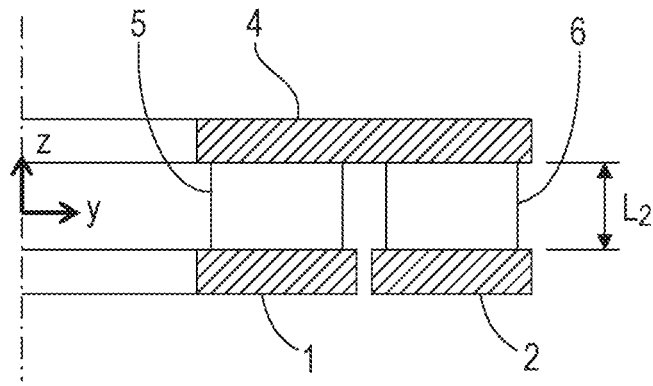
FIG. 17B is a sectional view of a torque sensor according to an embodiment.

In the embodiment of the present invention, the intermediate member 4 is provided as illustrated in FIG. 17B, the first member 1 and the intermediate member 4 are coupled via the first elastic structure 5, and the second member 2 and the intermediate member 4 are coupled via the second elastic structure 6.

Because there are two-stage elastic structures in series, each elastic structure needs to have twice the rigidity per stage. On the other hand, because the rigidity is inversely proportional to the cube of L as shown in Expression (3), the length L becomes about 0.8 times, and the thickness of the torque sensor can be reduced by about 20%.

As described above, with the present embodiment having a two-stage elastic structure, a thin torque sensor can be realized.

Figure 17C:
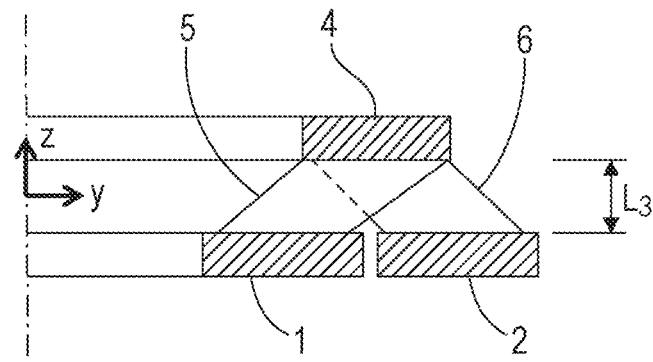
FIG. 17C is a sectional view of a torque sensor according to an embodiment.

Moreover, in the embodiment of the present invention, as illustrated in FIG. 17C, by arranging the two sets of elastic structures 5 and elastic structure 6 so as to be inclined and displaced in the front-back direction with respect to the plane of the figure, the thickness can be further reduced. For example, by inclining the elastic structures by 45 degrees, the thickness becomes sin(45 degrees), and therefore the thickness can be reduced by about 30%.

This configuration has another advantage, in addition to reduction in the thickness of the torque sensor. With the configuration illustrated in FIG. 17B, the intermediate member 4 deforms due to the bending torque Mx, and the bending rigidity decreases. With the configuration illustrated in FIG. 17C, deformation of the intermediate member is suppressed because the size of the intermediate member 4 can be reduced by half or more, and the bending rigidity increases. As a result, it is possible to configure a torque sensor having a high rigidity ratio.

As described above, by using a structure in which two-stage elastic structures are alternately combined, a thinner torque sensor having a higher rigidity ratio can be realized.

Figure 7:
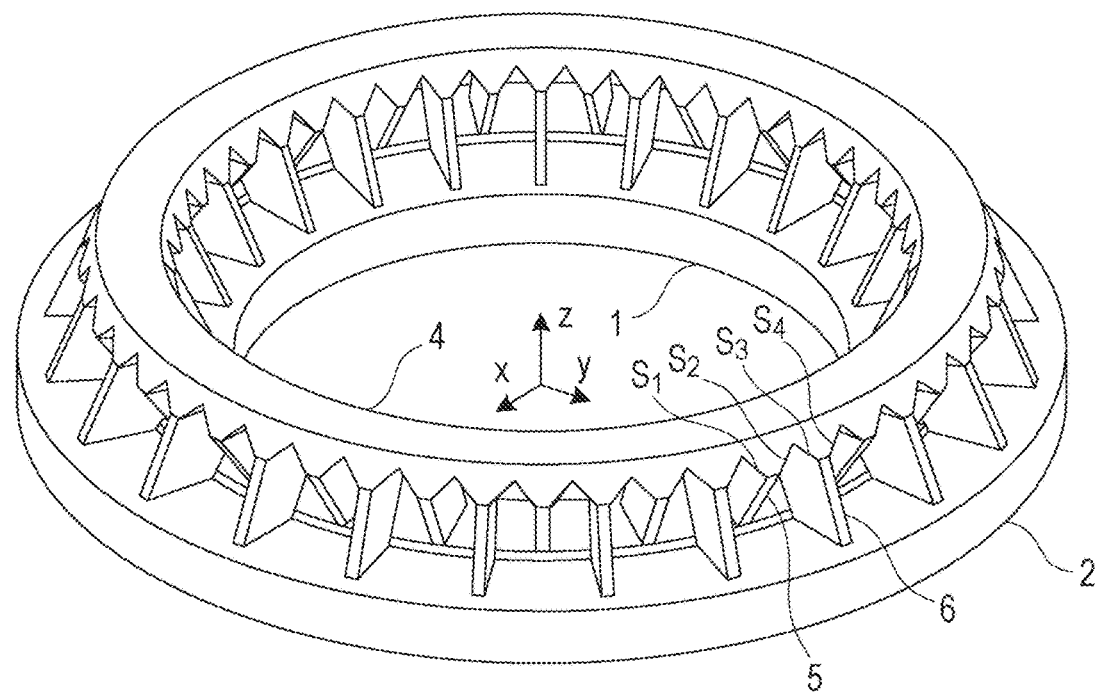
FIG. 7 is a perspective view of a torque sensor illustrating the first embodiment.

FIG. 7 is perspective view illustrating an example of the three-dimensional configuration of the torque sensor according to the present embodiment. The first member and the second member are disposed along the same plane, and the intermediate member is disposed to be separated from the plane in such a way that, when the intermediate member is projected onto the plane, at least a part of a projection of the intermediate member overlaps a gap between the first member and the second member.

A plurality of first elastic structures are disposed so that the inclination thereof when seen from the first member toward the intermediate member is in a direction away from the center of the annular portion. A plurality of second elastic structures are disposed so that the inclination thereof when seen from the second member toward the intermediate member is in a direction toward the center of the annular portion.

The elastic body according to the present embodiment can be manufactured by using an additive forming apparatus or an additive forming method. With a general additive forming method, the overhang angle has a limitation, and, in particular, it is difficult to form a horizontal top surface. However, with the present embodiment, by increasing the number of elastic structures and by connecting the elastic structures to each other via an inclined surface S, the overhang angle can be made smaller than the limitation, and it is possible to form a horizontal top surface.

Figure 6A:
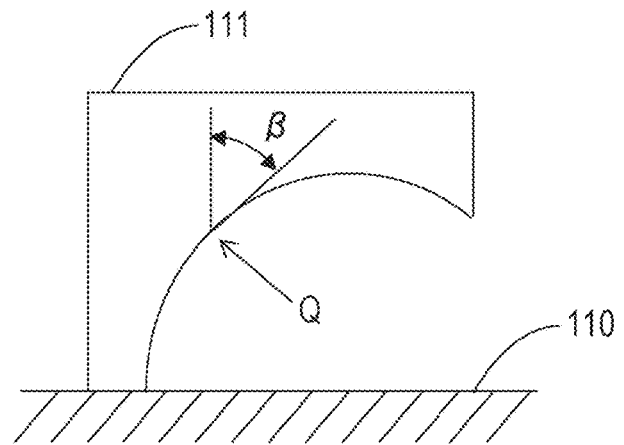
FIG. 6A illustrates a constraint on an additive forming method.
Figure 6B:
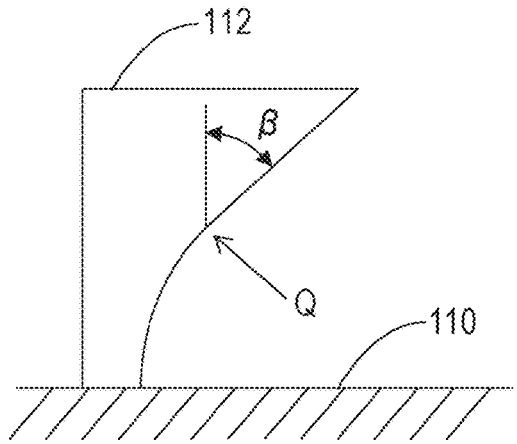
FIG. 6B illustrates a shape that can be additively formed by using the additive forming method.

FIG. 6A illustrates a constraint on the additive forming method. A target formed object 111, which has an arch-shape, is to be formed on a base 110. This formed object overhangs, and the overhang angle at a point Q in the figure is β. In general, with an additive forming method, the overhang angle has a limitation, and a portion exceeding the angle cannot be formed. The angle is, for example, 60 degrees. A horizontal top surface, whose overhang angle is 90 degrees, cannot be generally formed. FIG. 6B illustrates a shape 112 that can be can be additively formed. This is a shape such that a portion whose overhang limitation angle is β or more is omitted.

Figure 8:
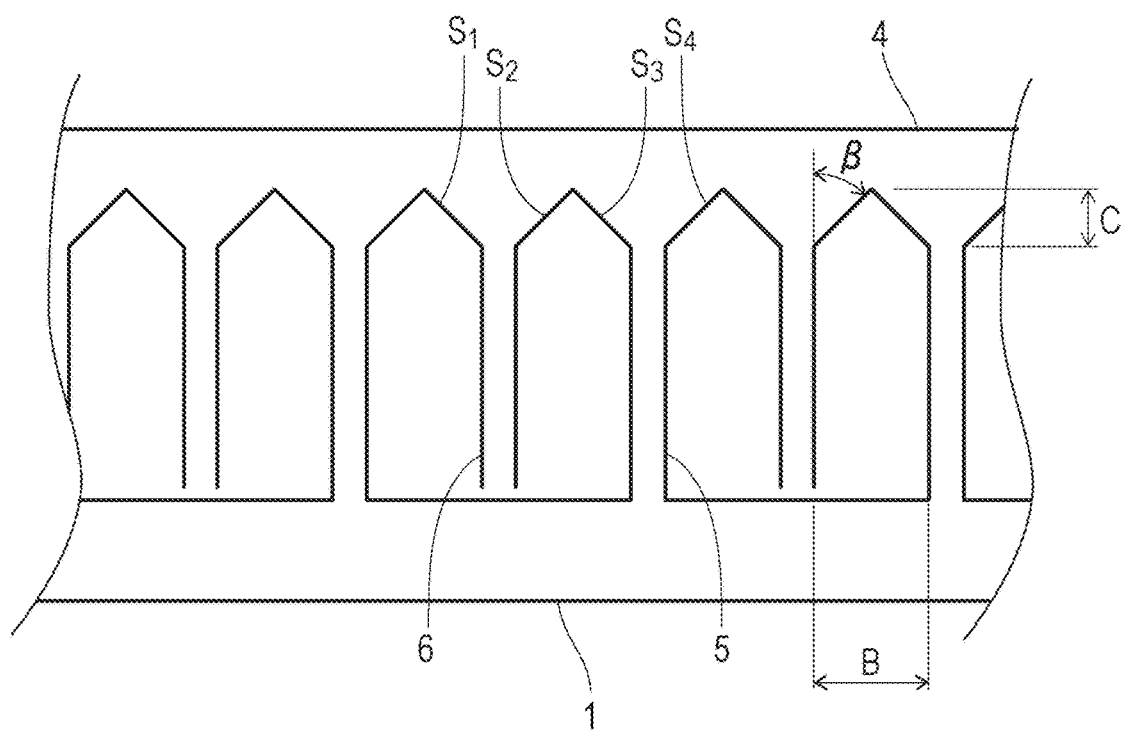
FIG. 8 is a schematic view of an elastic body according to the first embodiment.

FIG. 8 is a schematic view illustrating an elastic body with a focus on the overhang angle. Portions of the first member 1, the intermediate member 4, and the first elastic structure 5 and the second elastic structure 6 connecting these members to each other, for which overhang is concerned are portions S1 to S4 shown in FIGS. 7 and 8. It is necessary to design the pitch B and the dimension C of the elastic structures in the vertical direction so that the overhang becomes smaller than or equal to the aforementioned limitation value. As can be seen from the schematic view of FIG. 8, the condition is represented as follows.

$$\beta = \arctan\left(\frac{B}{2C}\right) \quad (9)$$

In order to reduce the dimension C and to reduce the thickness of the torque sensor, it is preferable that the pitch B of the elastic structure be smaller, that is, the number of elastic structures be larger. As described below, increasing the number of elastic structures serves to increase the rigidity ratio of the torque sensor.

With the elastic body according to the present embodiment, by increasing the number of elastic structures, the rigidity ratio can be improved, the overhang angle can be reduced, and the elastic body can be additively formed.

On the basis of this fact, an example of a method of obtaining the size and the number of elastic structures by simulation will be described.

Figure 9A:
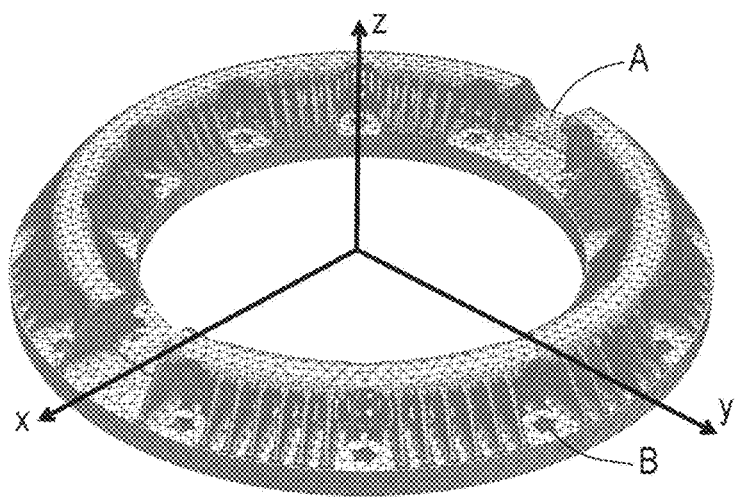
FIG. 9A is a deformation simulation model according to the first embodiment.

FIG. 9A is an FEM model of the elastic body used in simulation. Differences from the schematic view of FIG. 4 are as follows.

A: In order to attach the displacement detectors to an upper side, regions in which the elastic structures are not provided are disposed at two positions.

B: In order to attach the torque sensor, bolt holes are formed.

C: In order to reduce the volume of the elastic body, corners of the upper surface of the intermediate member are rounded.

Figure 9B:
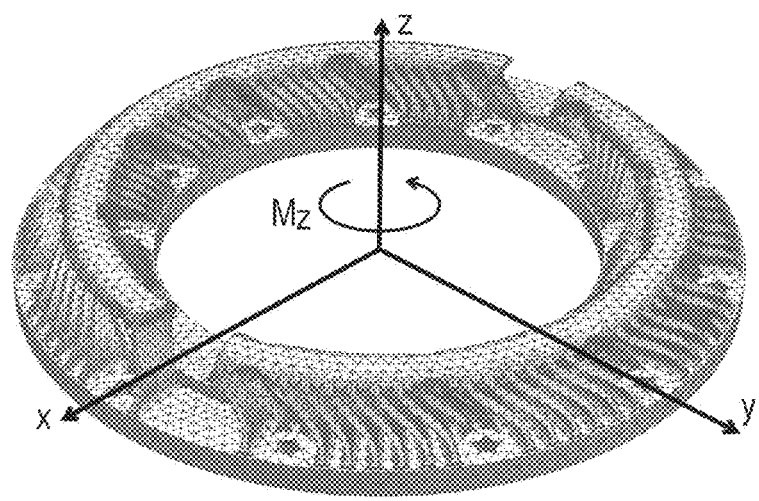
FIG. 9B is a deformation simulation result.

FIG. 9B illustrates deformation when a moment force Mz=1 Nm in the Z direction is applied to an outer member.

Mx is calculated in the same way. The calculation results of the FEM simulation are shown in the following table.

TABLE 1

| Rotational Moment | Angular Displacement (μrad) | Rigidity (kNm/rad) |
| --- | --- | --- |
| Mz | 13.11 | 76.3 |
| Mx | 0.78 | 1274.7 |

From this table, the rigidity ratio Mz/Mx is 16.7.

Figure 10:
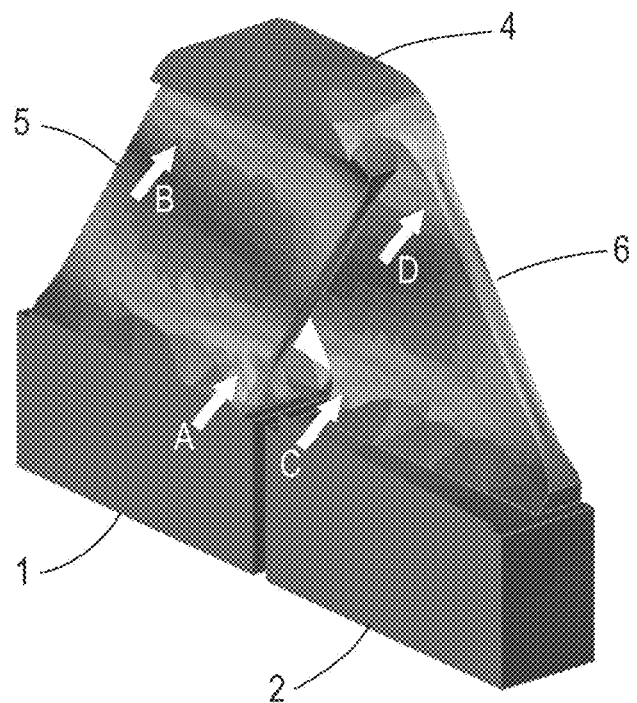
FIG. 10 is a stress analysis result according to the first embodiment.

FIG. 10 illustrates the stress distribution of the elastic structure when the torsional torque Mz is applied. FIG. 10 illustrates the first member 1, the second member 2, the intermediate member 4, the first elastic structure 5, and the second elastic structure 6. The magnitude of stress is represented by the darkness of shading. Brighter shading represents larger stress, and darker shading represents smaller stress.

In the first elastic structure 5, stress concentrates most on a lower and outer portion A, and stress concentrates second most on an upper and inner portion B. In the second elastic structure 6, stress concentrates most in a lower and inner portion C, and stress concentrates second most in an upper and outer portion D.

It is desirable to reduce stress concentration because breakage occurs from a portion where stress is high. Stress can be reduced by reducing strain.

On method for achieving this is reduction of the thickness of the elastic structure. Thus, the distance from a neutral plane of the elastic structure where stress is small, and stress can be reduced. In the figure, by reducing the thicknesses of the portions A to D where stress concentrates, the maximum value of the stress can be reduced.

Figure 11:
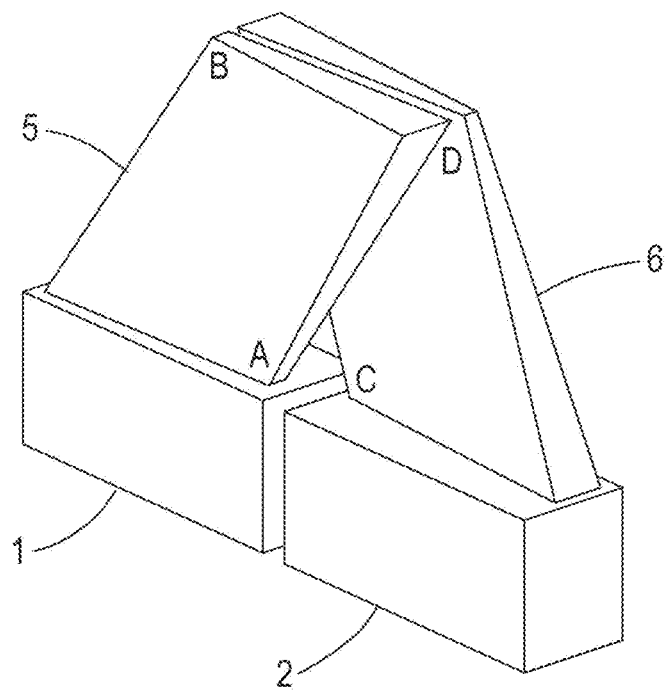
FIG. 11 is a schematic view of an elastic structure according to the first embodiment.

FIG. 11 illustrates the elastic structure. For convenience of description, thickness is exaggerated in an unequal scale. This is a configuration such that the thicknesses of the portions A to D, where the stress is large in the aforementioned simulation, are reduced. Examples of another method for reducing stress include a method of smoothing corners by curving the corners. A combination with such a method is also effective.

Next, a method of manufacturing the sensor designed in this way will be described. As described above, because the sensor according to the present embodiment has a small overhang angle, the sensor can be manufactured by using an additive forming method.

Figure 12A:
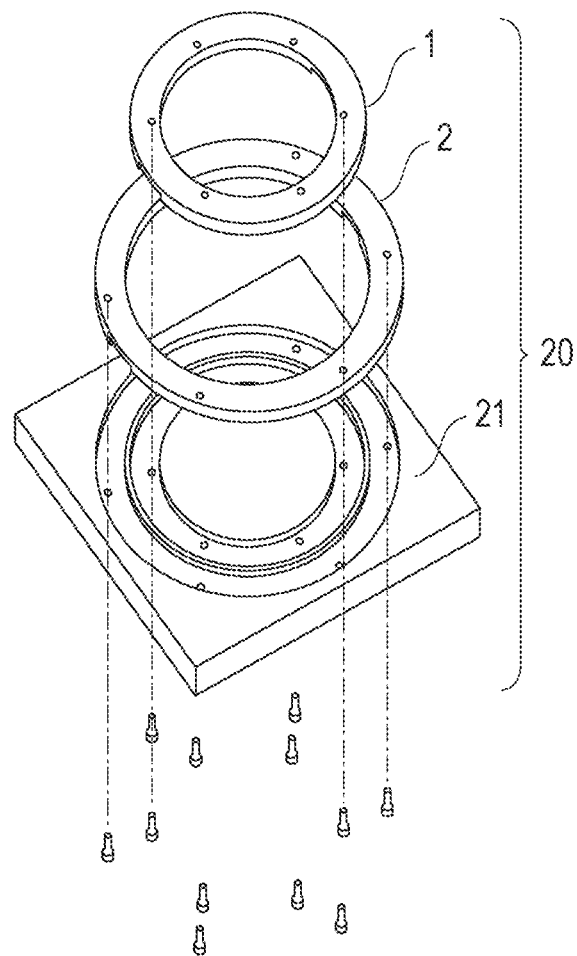
FIG. 12A is an exploded view of a forming unit according to the first embodiment.
Figure 12B:
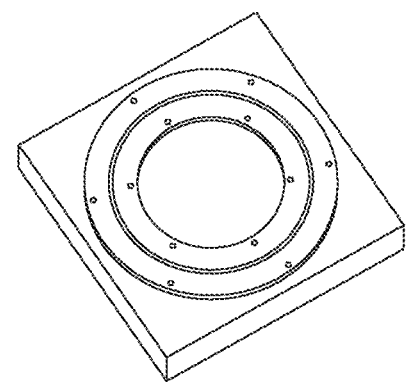
FIG. 12B is an assembly view of the forming unit.

Referring to FIGS. 12A and 12B, a forming unit 20 to be attached to the additive forming apparatus will be described. FIG. 12A is an exploded view of the forming unit 20, and FIG. 12B is an assembly view of the forming unit 20.

The first member 1 and the second member 2 are ring-shaped components. The shapes are formed beforehand by using a lathe or the like and fixed to the forming plate 21 with screws, thereby completing the forming unit 20. At this time, it is important that the uppermost surface of the forming unit 20 is designed so as to become the upper surfaces of the first member 1 and the second member 2. That is, one of outer surfaces of the first member that is coupled to the first elastic structure and one of outer surfaces of the second member coupled to the second elastic structure are made to be parallel. This is because the additive forming apparatus starts forming from the uppermost surfaces of the first and second members. The first elastic structure, the second elastic structure, and the intermediate member are formed by stacking layers of powder of the forming material and performing laser irradiation in accordance with the shapes of the first elastic structure, the second elastic structure, and the intermediate member.

Figure 13A:
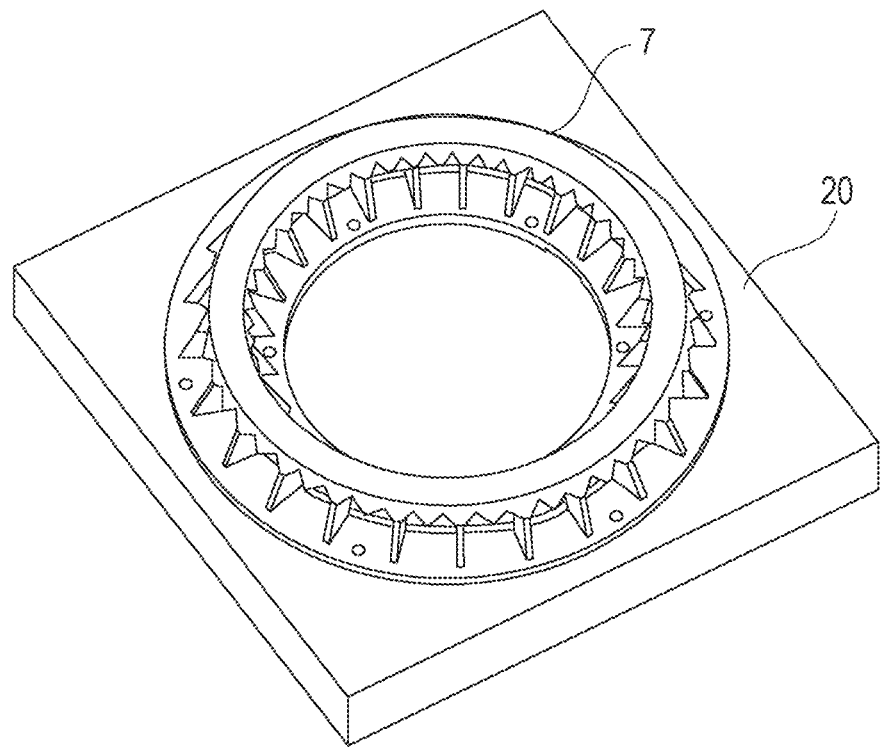
FIG. 13A illustrates an elastic body that is additively formed on a forming plate.
Figure 13B:
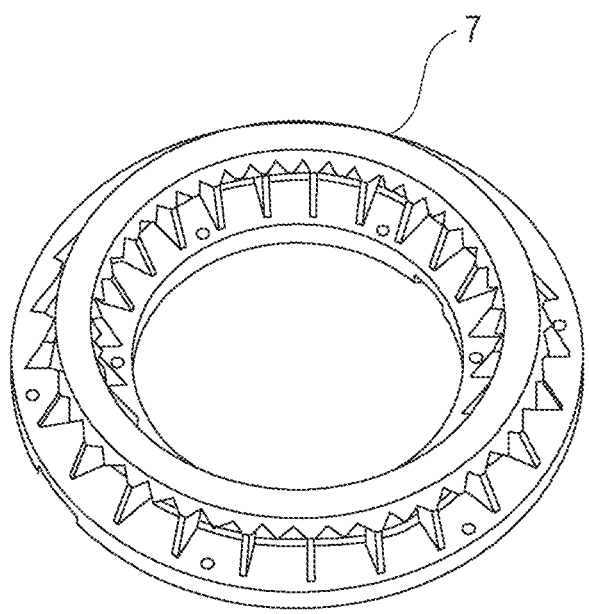
FIG. 13B is a perspective view of a completed elastic body.

FIG. 13A illustrates the elastic body 7 that is formed by forming the first elastic structure, the second elastic structure, and the intermediate member on the forming unit 20 by using an additive forming apparatus. As already described, this shape can be made by using an additive forming method. By removing fixing screws of the forming plate, it is possible to remove the elastic body 7, which has been completed as illustrated in FIG. 13B.

That is, the first member and the second member are positioned and fixed to the forming plate so as to be removable; and, the first elastic structure, the second elastic structure, and the intermediate member are formed on the upper surfaces of the first member and the second member by stacking layers of a forming material. Then, after forming a three-dimensional formed object in which the first member, the second member, the first elastic structure, the second elastic structure, and the intermediate member are integrated, the three-dimensional formed object is removed from the forming plate.

This manufacturing method can reduce manufacturing cost compared with existing additive forming methods in the following respects.

First, it is not necessary to cut out a formed object. With existing methods, a formed object is cut out by performing machining such as wire cutting. However, because the formed object can be removed by only removing screws, the process is simplified and the cost can be reduced.

Second, machining after forming can be reduced to the minimum. With existing technologies, it is necessary to perform machining after forming a portion of a three-dimensional formed object where high precision is required. Machining after forming increases cost, because the workpiece has a complex shape and therefore a dedicated jig for machining is necessary. With the present embodiment, the first member and the second member, for which high precision is required, are prepared beforehand. Because these members are not additively formed, additional machining is not necessary, and the cost can be reduced.

Third, the amount of the forming material can be reduced. Forming materials used in an additive forming method are generally expensive. With the present embodiment, only a part, not the entirety, of the elastic body 7 is additively formed. Therefore, the forming material can be reduced, and the cost can be reduced. To be more specific, because the first member 1 and the second member 2 of the elastic body 7 are not additively formed, the forming material, which is expensive, can be saved.

Fourth, with the present embodiment, the forming plate can be repeatedly used. In an additive forming method including a step of laser-sintering a forming material stacked on a forming plate, because the surface of the forming plate melts after forming due to laser irradiation, the forming plate cannot be used in the next forming process. With the present embodiment, because the forming plate is not irradiated with laser light, the forming plate can be used multiple times, and the manufacturing cost of the elastic structure can be reduced.

As described above, the torque sensor according to the present embodiment can be manufactured by using an additive forming method, and the manufacturing cost can be reduced. Even if a manufacturing error occurs, because the number of elastic structures is large, the manufacturing error of each elastic structure is averaged out, and influence on function is small.

Moreover, because the additive forming method can form complex shapes in contrast to existing machining, it is easy to increase the number of elastic structures and to further improve the rigidity ratio between the torsional direction and the bending direction. In the present embodiment, a case where manufacturing is performed by using an additive forming method has been described. However, this is not a limitation. As the case may be, manufacturing may be performed only by machining.

In the present embodiment, it has been described that the cross-sectional shape of the elastic structure is a rectangular shape. However, the cross-sectional shape is not limited to a rectangular shape. For example, the cross-sectional shape may be a rectangular shape with rounded corners or an elliptical shape.

As described above, with the present embodiment, it is possible to realize a sensor that is thin and that has a high rigidity ratio. Moreover, it is possible to realize a sensor that can be manufactured by using an additive forming method, because a structure without a horizontal top surface can be used. Furthermore, it is possible to alleviate stress concentration on the elastic structure, to prevent fatigue breakage of the elastic structure, to increase the life of the torque sensor, and to improve the reliability.

First Modification of First Embodiment

Figure 14:
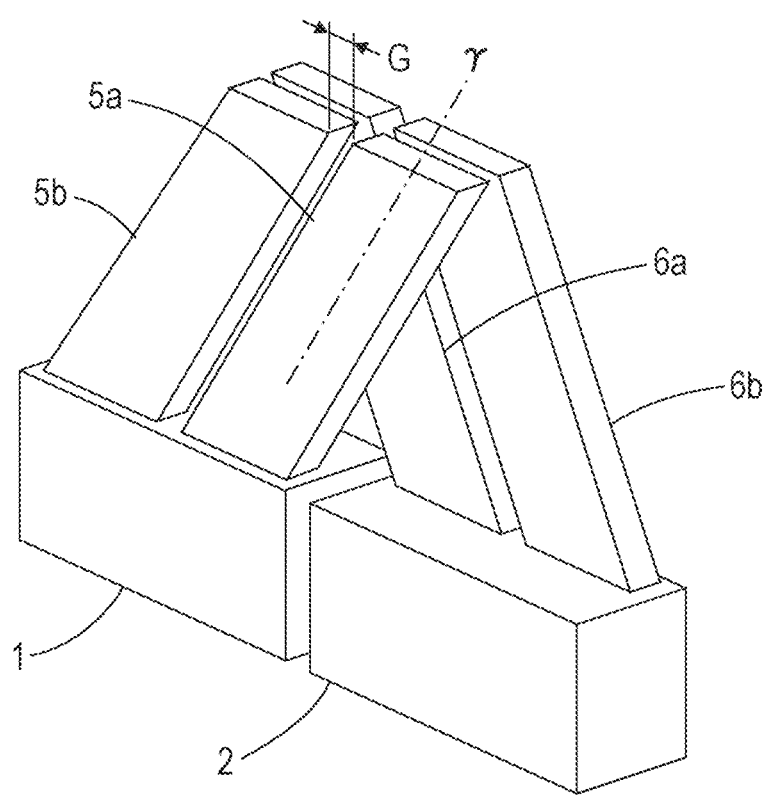
FIG. 14 is a schematic view of an elastic structure according to the first embodiment.

FIG. 14 is a partial perspective view of a modification of the first embodiment. This modification differs from the first embodiment in that a slit is formed in the elastic structure to divide the elastic structure. In the figure, a slit of a gap G is formed at the center of the first elastic structure, so that the first elastic structure is composed of two pieces 5a and 5b. Likewise, the second elastic structure is composed of two pieces 6a and 6b. That is, the first elastic structure and/or second elastic structure includes a plurality of elastic bodies that are separated by a slit.

The torsional rigidity of the elastic structure, that is, the torsional rigidity around the γ axis in FIG. 14 is proportional to the polar moment of inertia of area. The polar moment of inertia of area $Ip_1$ of an elastic structure having a cross-section of a×b can be calculated by using the following equation.

$$Ip_1 = \frac{a^3b + ab^3}{12} \tag{10}$$

Dividing an elastic structure into two pieces will be considered. Here, the term "divide" does not mean that one object is physically cut into pieces but means that an elastic structure is formed so as to include two independent portions. Accordingly, two portions that are separated from each other with a slit therebetween may be formed by using an additive forming method.

When the dimension a is halved, the above equation is more than halved. That is, when the elastic structure is divided into two pieces, because polar moment of inertia of area is more than halved, the torsional rigidity of the entirety decreases. The rigidity in the γ-axis direction is proportional to the cross-sectional area of the elastic structure. By making the gap G, which divides the elastic structure, sufficiently small, a rigidity that is the same as that before division can be obtained. Because the rigidity in the γ-axis direction does not change, the rigidity of the torque sensor in the bending direction does not change.

In summary, when the elastic structure is divided into a plurality of pieces without changing the total volume of the elastic structure, the torsional rigidity decreases while the bending rigidity does not change. Accordingly, the ratio between the rigidity in the bending direction and the rigidity in the torsional direction can be further increased.

In the present modification, it has been described on the assumption that the gap G, which divides the elastic structure, is sufficiently small. By using a design that satisfies this assumption, the rigidity ratio can be further improved as the division number is increased.

Moreover, the stress distribution described above with reference to FIG. 10 also applies to the divided elastic structure. Therefore, by changing the thickness of the elastic structure as illustrated in FIG. 11, it is possible to prevent stress concentration and to improve durability.

Second Modification of First Embodiment

Referring to FIGS. 53 to 56, as a second modification of the first embodiment, an embodiment in which an optical sensor, instead of a magnetic sensor, is used as a displacement detector will be described.

Figure 53:
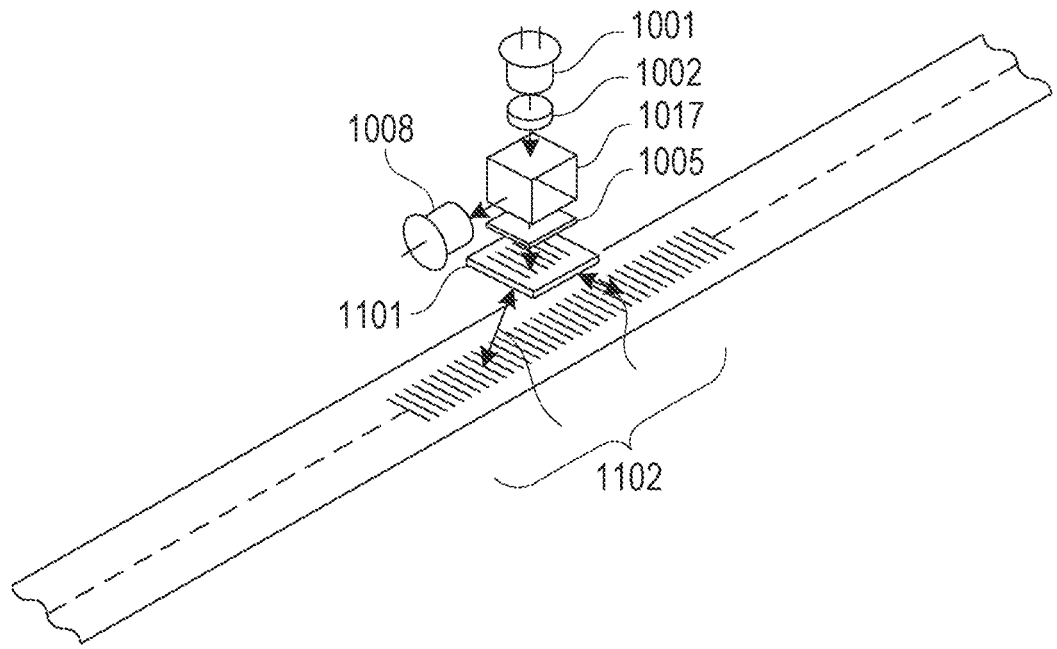
FIG. 53 is a first view illustrating a known technology of an optical displacement sensor.
Figure 54:
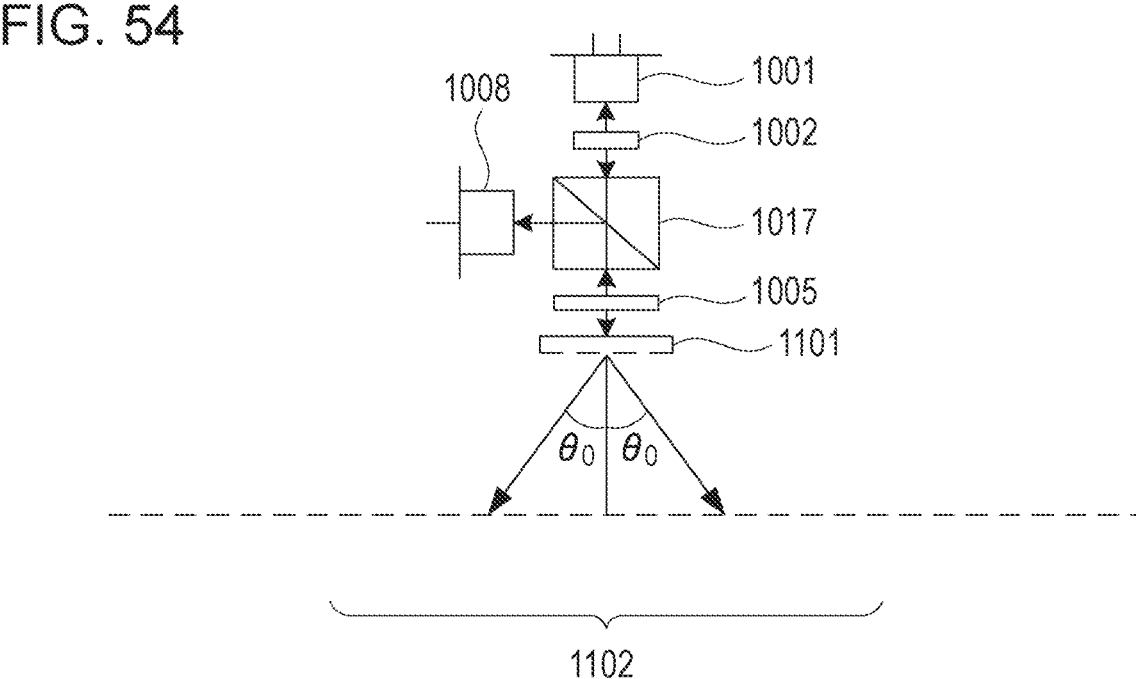
FIG. 54 is a first view illustrating the known technology of the optical displacement sensor.

FIGS. 53 and 54 illustrate an example of an optical sensor. This is similar to a sensor described in, for example, Japanese Patent Laid-Open No. 4-130220. A light beam is emitted from a laser light source 1001, becomes a collimated beam in a collimator lens 1002, passes through a polarization beam splitter 1017 and a wave plate 1005, is incident on a first diffraction grating 1101, and is split into two first-order diffracted beams. The diffracted beams are incident on a second reflection grating 1102, and reflected diffracted beams pass through the diffraction grating 1101 again and cause interference. The brightness of the interfering light is detected by a light receiver 1008. Although not illustrated in the figures, a technology for detecting a movement direction by measuring the phase of interfering light by using two light receivers 1008 is also known from, for example, Japanese Patent Laid-Open No. 63-311121.

Figure 55:
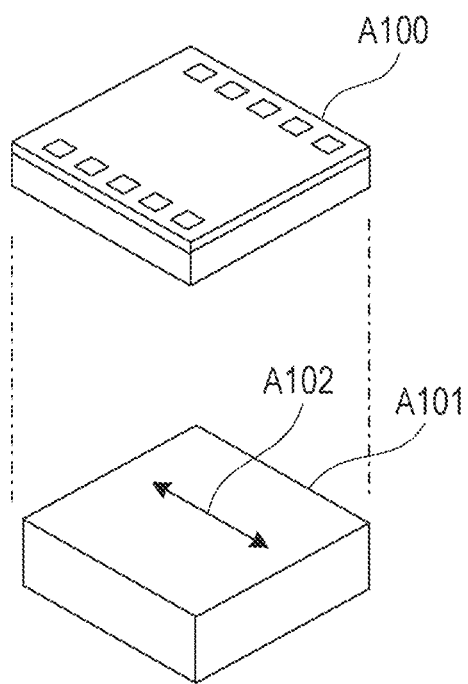
FIG. 55 illustrates a configuration of an optical displacement sensor.

FIG. 55 is a schematic view of an optical sensor having such a configuration. In the figure, A100 is a circuit unit in which an optical unit and an electric circuit are integrated. The circuit unit A100 has electrodes for outputting electric signals. A scale A101, which has a diffraction grating, is held with a uniform gap between the scale A101 and the circuit unit A100 and can measure relative displacement in a direction A102 in which diffraction grating is grooved.

Figure 56:
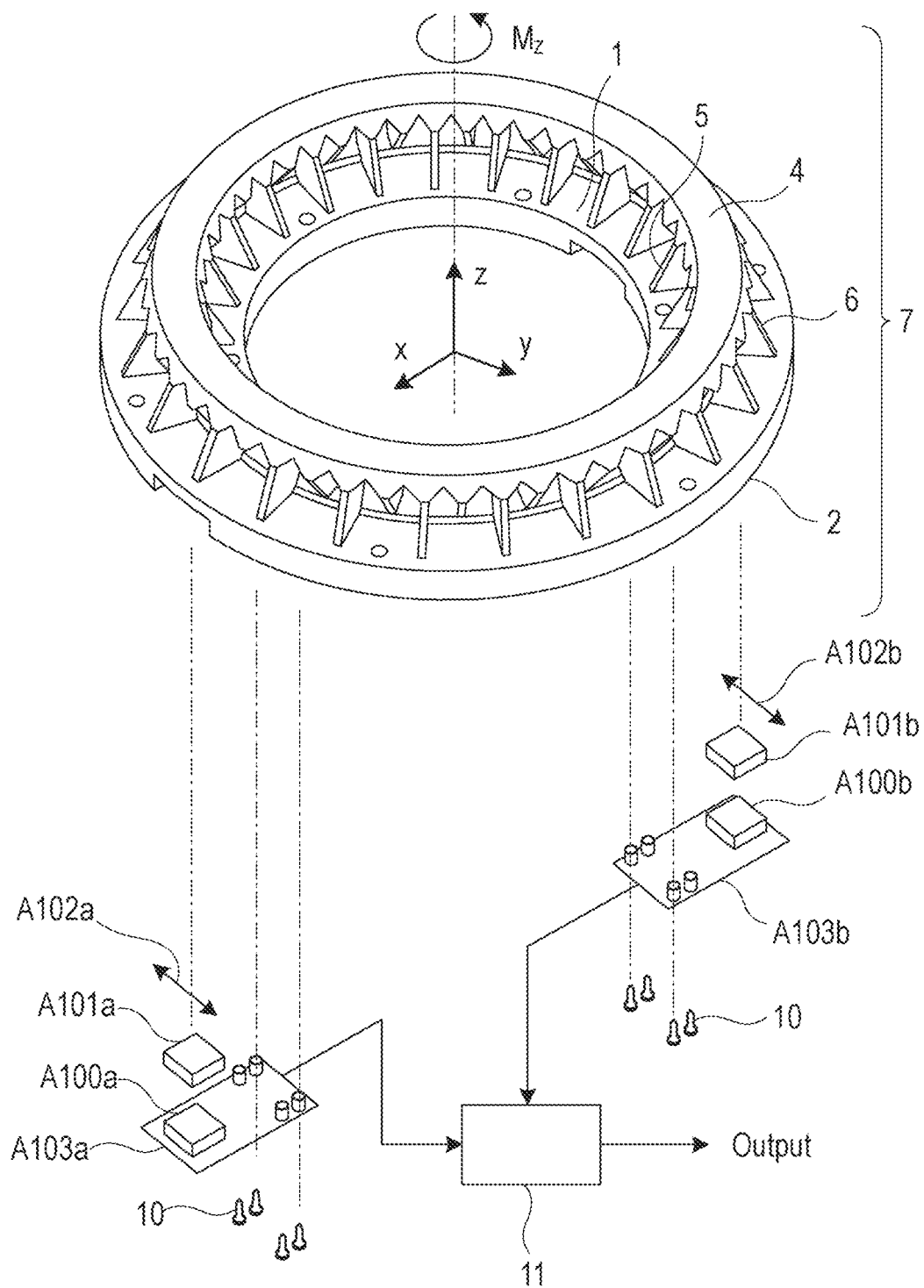
FIG. 56 is a schematic view of a torque sensor according to another embodiment of the third embodiment.

FIG. 56 illustrates a torque sensor including the optical sensor. This torque sensor differs from the embodiment described above in that the magnetic sensor is replaced with the optical sensor.

A scale A101a is provided so as to be fixed to the second member 2. The scale A101a has a diffraction grating in a direction A102a. As illustrated in the figure, a rotation direction around the Z-axis is made to coincide with the direction A102a of the scale. A circuit unit A100a is provided so as to be fixed to an electric board A103a and so as to face the scale A101a. The electric board A103a for the optical sensor is fixed to the first member with screws 10. Another set A100a to A103a is provided at a position symmetric with respect to the Z-axis in the same way as A100b to A103b. Signals from the electric boards A103a and A103b for the optical sensor are connected to the control circuit board 11, and relative rotational displacement between the first member 1 and the second member 2 is output. Description of the configuration of the remaining portion, which is the same as that in the embodiment described above, will be omitted.

As described above, with the first embodiment and the modifications thereof, it is possible to provide a torque sensor that has high detection precision, that is compact, and that can be manufactured at low cost.

Second Embodiment

In the first embodiment, an example of a torque sensor that is attached to the rotary joints J1 to J6 of the robot system illustrated in FIG. 1 has been described. In the second embodiment, a force sensor that is used in a wrist portion between a robot arm and a robot hand 210 will be described. The force sensor according to the present embodiment may be referred to as a "force-sense sensor" in the present description.

A force-sense sensor 207 detects a force in six directions and a rotation moment force applied to the distal end of a hand during an assembly operation or the like, and a controller 102 controls the robot in accordance with the measurement value.

Figure 25A:
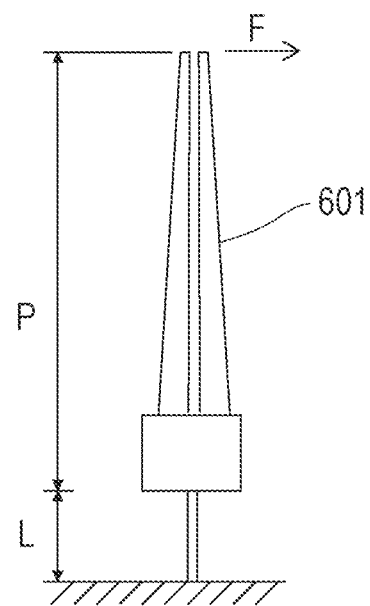
FIG. 25A is a schematic view of a cantilever elastic structure according to the second embodiment.

Here, as can be seen from FIG. 25A, the distance P from the force-sense sensor 207 to the distal end of the hand is not generally small. The distance is, for example, 100 mm or larger. If the position of the distal end of the hand becomes displaced due to a force applied to the distal end, high-precision assembly cannot be performed. Therefore, the force-sense sensor 207 needs to have high moment rigidity.

Figure 18:
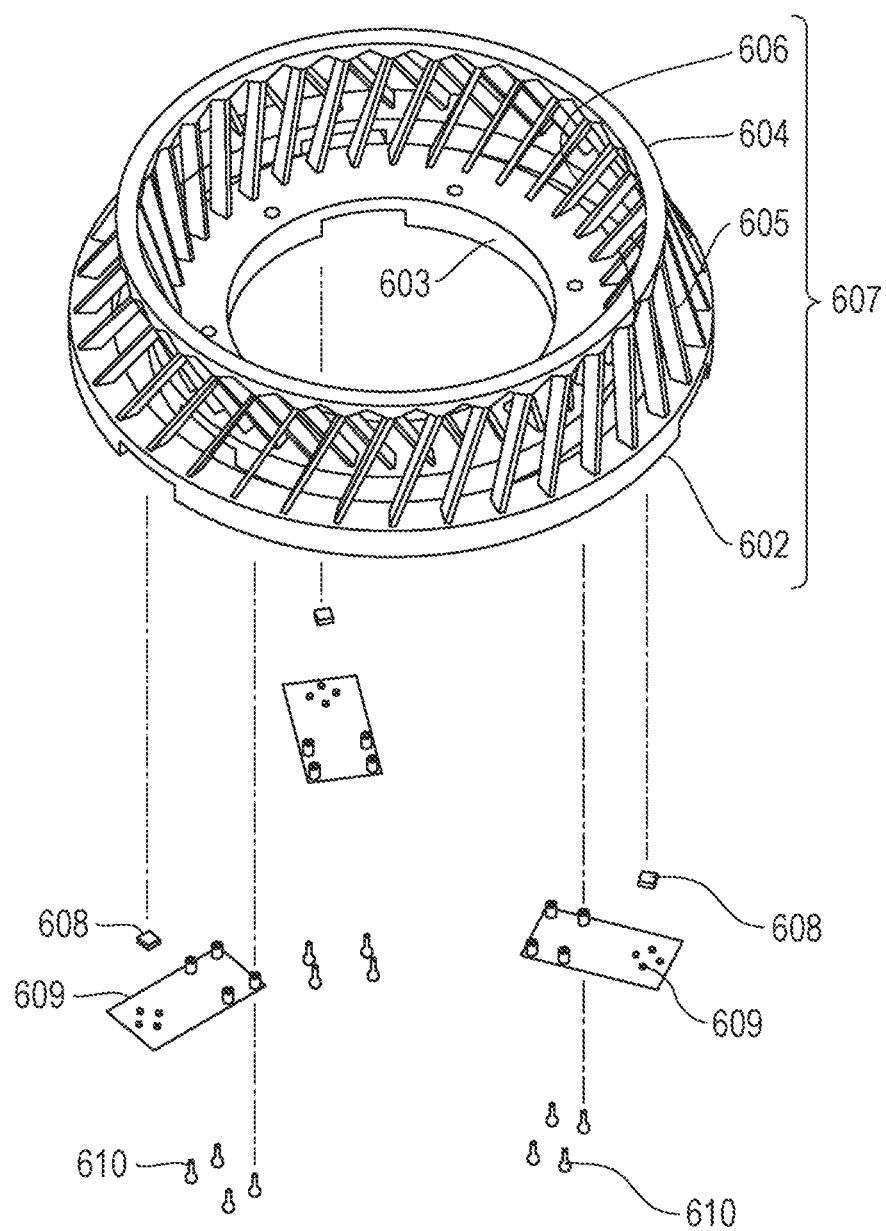
FIG. 18 is a configuration view of a force-sense sensor according to a second embodiment.
Figure 19:
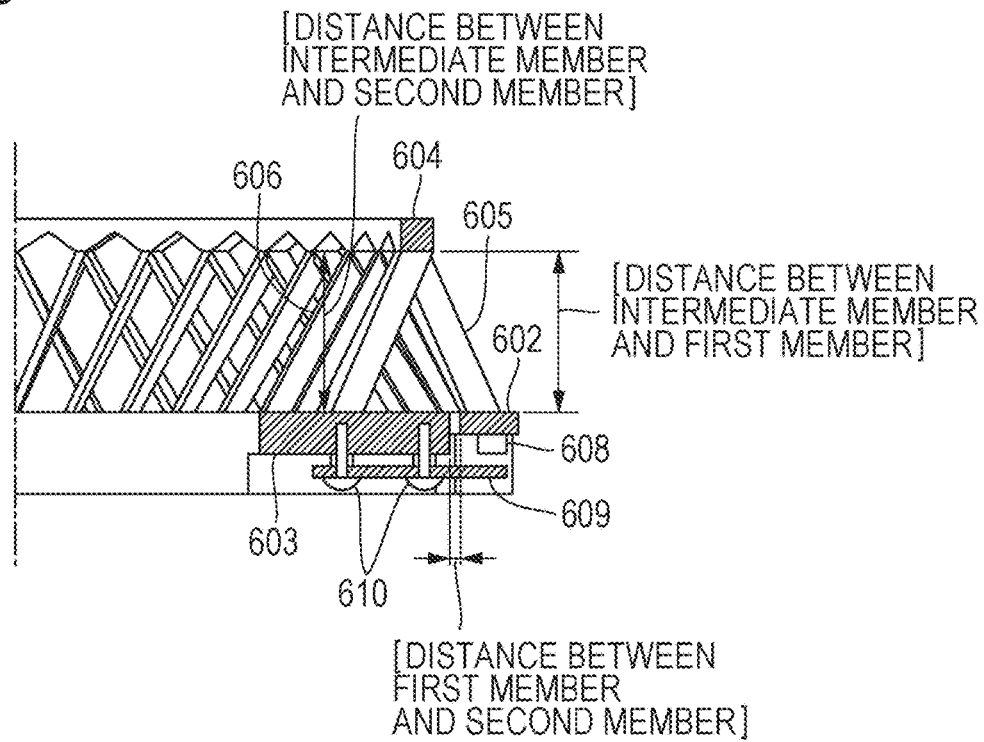
FIG. 19 is a sectional view of force-sense sensor according to the second embodiment.
Figure 20:
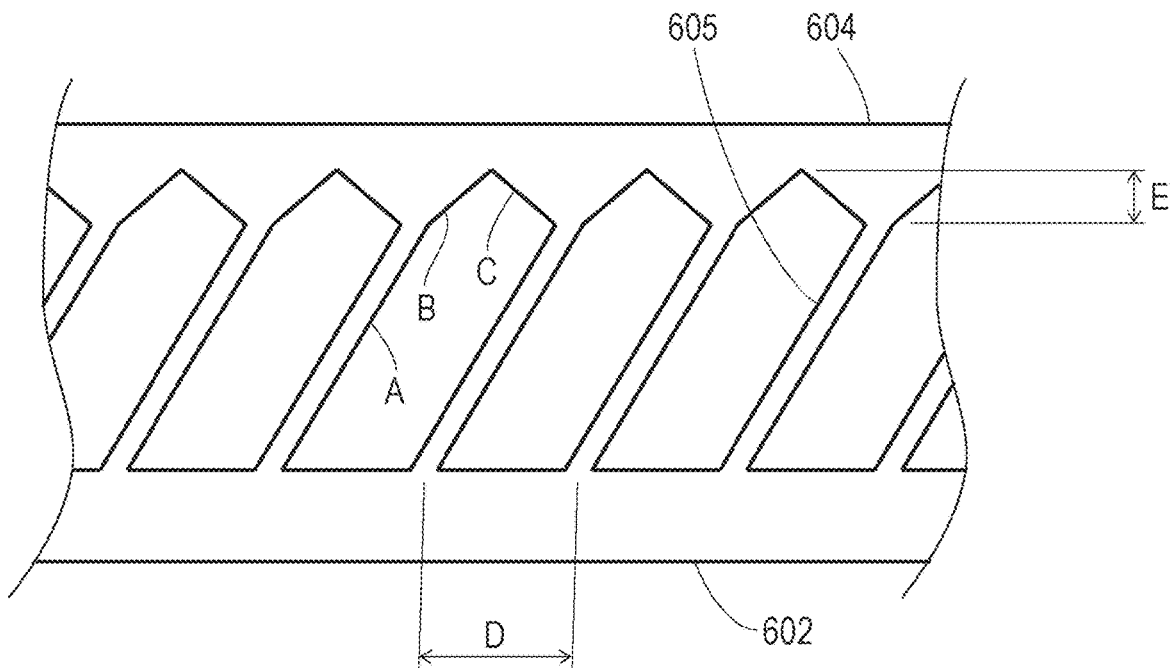
FIG. 20 is a schematic view of an elastic body according to the second embodiment.

FIG. 18 is a perspective view, FIG. 19 is a partial sectional view, and FIG. 20 is partial enlarged view illustrating the configuration of a force-sense sensor according to the second embodiment. As illustrated in the figure, an elastic body 607 of the force-sense sensor includes a first member 602 to be fixed to the robot arm, a second member 603 to be fixed to the robot hand, and an intermediate member 604. The first member 602 and the intermediate member 604 are coupled to each other via a first elastic structure 605 such as a plate spring, and the second member 603 and the intermediate member 604 are coupled to each other via a second elastic structure 606 such as a plate spring.

As illustrated in FIG. 18, the first elastic structure 605 is disposed so as to be inclined with respect to the normal-line direction from one of the outer surfaces of the first member 602 coupled to the first elastic structure. The second elastic structure 606 is disposed so as to be inclined with respect to the normal-line direction from one of the outer surfaces of the second member 603 coupled to the second elastic structure. The first member and the second member include annular portions that are concentric and have different radii.

A plurality of first elastic structures 605 are arranged in such a way that the inclinations thereof when seen from the first member toward the intermediate member are aligned counterclockwise. A plurality of second elastic structures 606 are arranged in such a way that the inclinations thereof when seen from the second member toward the intermediate member are aligned clockwise. As long as the first elastic structures and the second elastic structures are arranged in directions opposite to each other, the relationship between clockwise and counterclockwise may be opposite.

The plurality of first elastic structures are arranged in such a way that the inclinations thereof when seen from the first member toward the intermediate member are in a direction toward the center of the annular portion. The plurality of second elastic structures are arranged in such a way that the inclinations thereof when seen from the second member toward the intermediate member are in a direction away from the center of the annular portion. Thus, the first elastic structures and the second elastic structures are arranged at predetermined torsional inclination angles.

Here, the first member 602, the second member 603, and the intermediate member 604 are designed so as to have dimensions such that these members are sufficiently rigid compared with the first elastic structure 605 and the second elastic structure 606 and do not easily deform. To be specific, these members are designed by using deformation simulation described below.

In the present embodiment, the number of elastic structures is 36. By increasing the number of elastic structures, the moment rigidity can be further increased. The size and the number of the elastic structures are designed by using deformation simulation described below or the like.

Magnetic displacement detectors, which will be described below, are provided at three positions in the elastic body 607. A magnet 608 of each of the displacement detectors is fixed to the first member 602 with an adhesive. The position of the magnet in three directions is detected by using a magnetoresistive element or a Hall element that is disposed around the magnet. A detection board 609 of the displacement detector is fixed to the second member 603 with screws 610. The board is fixed with screws so that the position thereof relative to the fixed magnet can be adjusted and fixed. The detection board 609 outputs three types of signals in accordance with the position of the magnet 608 in three directions. Because there are three sets of the detection boards, nine signals in total are obtained.

As illustrated in the partial sectional view in FIG. 19, in the sensor according to the present embodiment, the distance between the first member and the second member is smaller than each of the distance between the intermediate member and the first member and the distance between the intermediate member and the second member. The first member, the second member, and the intermediate member are arranged in a similar way to the first embodiment. As described above, because displacement detection with higher precision can be realized as the distance between detection targets (the distance between the first member and the second member) decreases, the configuration according to the present embodiment is advantageous.

Preferably, the distance between the first member and the second member is in the range of 10 μm to 10 mm for the reasons similar to those of the first embodiment.

Nine signals from three sets of detection boards will be denoted by a vector a. The signal, that is, the vector a is sent to the controller 102 shown in FIG. 1 and converted into a six-axis force-sense-value vector F by using the following equation.

$$F_i = \sum_{j=1}^{9} A_{i,j} a_j \quad i = 1 \sim 6 \qquad (11)$$

Here, $A_{i,j}$ is a 6×9 constant matrix that is obtained beforehand by experiment or by performing deformation simulation described below. To be specific, a large number of combinations of the signal a that are obtained for the force F applied to the force-sense sensor are collected by experiment or by performing simulation, and the coefficient matrix $A_{i,j}$ is obtained by using a method of least squares.

The linear transformation represented by the above equation is sufficient for deformation of the elastic body, which is very small. However, in order to perform transformation with higher precision, a more generalized function $f_i(a)$ is used instead of the above equation.

$$F_i = f_i(a) \qquad (12)$$

The elastic body according to the present embodiment can be manufactured by using an additive forming method in consideration of the overhang angle, as with the first embodiment.

FIG. 20 is a conceptual view illustrating the elastic body according to the present embodiment with a focus on the overhang angle. Portions of the first member 602, the intermediate member 604, and the first elastic structure 605 connecting these members to each other, for which overhang is concerned are three portions A, B, and C shown in the figure.

A is a lower surface of the elastic structure, and it is possible to reduce the inclination angle of the elastic structure to the overhang angle or smaller, for example, 60 degrees or smaller.

B and C are lower surfaces of the intermediate member. In FIG. 20, it is possible to reduce the angles of the surfaces B and C, which are determined by the distance D between the elastic structures 605 and the cutout distance E of the intermediate member 604, to the overhang angle or smaller, for example, 60 degrees or smaller.

Here, the cutout distance E, which is related to the size of the entirety of the sensor in the vertical direction, is preferably small. Accordingly, it is preferable that the distance D between the elastic structures 605 be small. In other words, a configuration in which the number of elastic structures is large is preferable.

As described above, the elastic body according to the present embodiment can reduce the overhang angle and can be manufactured by using an additive forming method.

Next, an example of a method for obtaining the size and the number of the first elastic structures 605 and the second elastic structures 606 of the elastic body 607 according to the present embodiment illustrated in FIG. 18 will be described.

First, the idea behind the present embodiment will be described.

In the description of the present embodiment, the meanings of main symbols in mathematical formulas are as follows.

L: length of elastic structure
h: thickness of elastic structure
b: width of elastic structure
I: geometrical moment of inertia of elastic structure in a case of rectangular cross section having thickness h and width b, $I = bh^3/12$
A: cross-sectional area of elastic structure, in a case of rectangular cross section, $A = bh$
E: Young's modulus
F: external force
P: distal end position to which external force is applied
δ: displacement
D: distance between elastic structures
N: number of elastic structures First, from the viewpoint of the material mechanics, an idea about a rotation moment that a force-sense sensor should have will be described.

As illustrated in FIG. 1, the force-sense sensor 207 is a device that is attached to a wrist portion between the robot arm and the hand and that detects a force and a moment applied to the hand. When an external force F is applied to a position that is at a distance P from the force-sense sensor 207, the displacement δ of the force-sense sensor is preferably as small as possible. This is because, if the displacement is large, the position of the distal end of the hand becomes displaced, which may hinder a precise operation such as assembly.

Figure 25B:
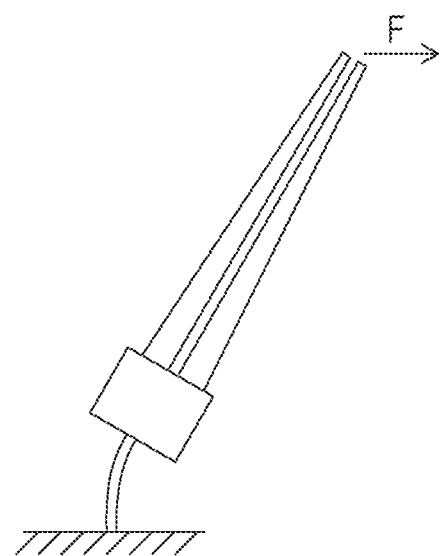
FIG. 25B illustrates deformation of the cantilever elastic structure.

As illustrated in FIG. 25A, a case where a hand 601 is connected to the distal end of a cantilever elastic structure and an external force F in a horizontal direction is applied to the distal end of the hand will be considered. In this case, due to the external force F, deformation occurs as illustrated in FIG. 25B.

The displacement δ of the distal end at this time is decomposed into an influence $\delta_F$ of horizontal movement and an influence $\delta_M$ of inclination.

$$\delta = \delta_F + \delta_M \tag{13}$$

From the formula of the cantilever elastic structure, the respective displacement amounts are obtained as follows.

$$\delta_F = \frac{FL^3}{3EI} \tag{14}$$

$$\delta_M = \frac{FPL^2}{2EI} \tag{15}$$

In order to compare these with each other, the ratio α between the influence $\delta_F$ of horizontal movement and the influence $\delta_M$ of inclination is as follows.

$$\alpha = \frac{\delta_M}{\delta_F} = \frac{3}{2}\frac{P}{L} \tag{16}$$

In general, the distance P to a position to which an external force is applied is far larger than the size L of an elastic body in a force-sense sensor. For example, when specific values, such as L=10 mm and P=100 mm, are assigned, the ratio α=15.

That is, the influence of inclination is 15 times larger than the influence of horizontal movement. Accordingly, in order to suppress positional displacement of the distal end, it is more important to increase the moment rigidity than to increase the rigidity in the translation direction.

Figure 26A:
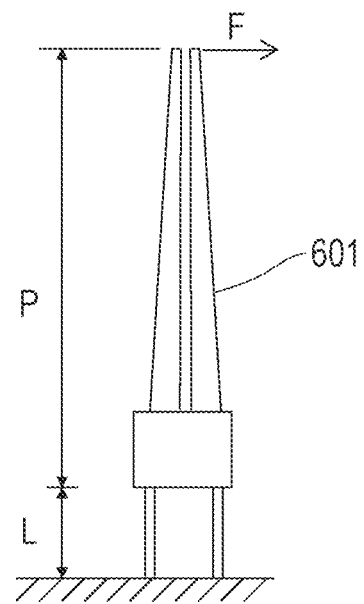
FIG. 26A is a schematic view of two cantilever elastic structures according to the second embodiment.
Figure 26B:
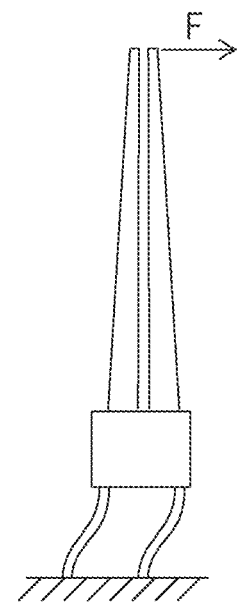
FIG. 26B illustrates deformation of the cantilever elastic structures.

A simple method of increasing moment rigidity is improving the structure of the elastic structure. As illustrated in FIG. 26A, a case where the hand 601 is connected to the distal ends of two elastic structures and an external force F in a horizontal direction is applied to the distal end of the hand will be considered. In this case, due to the external force F, deformation occurs as illustrated in FIG. 26B. In the same way as in the aforementioned case, the displacement δ of the distal end is decomposed into an influence $\delta_F$ of horizontal movement and an influence $\delta_M$ of inclination.

Because the force is evenly applied to the two elastic structures, by using the formula for the both-end-fixed elastic structure, $\delta_F$ can be calculated from the following equation.

$$\delta_F = \frac{L^3 F}{24EI} \tag{17}$$

When it is assumed that the cross-sectional shape of the elastic structure is rectangular, and the geometrical moment of inertia I is decomposed, $$\delta_F = \frac{L^3 F}{2Ebh^3}. \tag{18}$$

The influence of inclination can be calculated as follows, where $F_1$ is a force in the compression direction applied to the elastic structure, and $\delta_1$ is the displacement.

Because the inclination of the elastic structure is $\delta_M/P$, the displacement of the elastic structure is, $$\delta_1 = \frac{D\delta_M}{P}. \tag{19}$$

From the formula of compression of the elastic structure, $$\delta_1 = \frac{L}{EA}F_1 = \frac{L}{Ebh}F_1. \tag{20}$$

From these two equations, the force $F_1$ is obtained as follows.

$$F_1 = \frac{EbhD}{L}\frac{\delta_M}{P} \tag{21}$$

Because a moment of FP is applied to the elastic structure, from equilibrium of force, $$FP = F_1 D \tag{22}.$$

By performing substitution with $F_1$ above and deformation on this equation, $$\delta_M = \frac{FLP^2}{EbhD^2}. \tag{23}$$

In the same way as above, when the ratio between the influence $\delta_F$ of horizontal movement and the influence $\delta_M$ of inclination is denoted by α, $$\alpha = \frac{\delta_M}{\delta_F} = \frac{2P^2 h^2}{D^2 L^2} \tag{24}$$

is obtained.

Specific values will be assigned and considered. α=0.08, when it is assumed that L=10 mm, P=100 mm, the width of the elastic structure D=50 mm, and the thickness h=1 mm.

This is about 1/1800 of the aforementioned case, where α=15, and is incomparably small. That is, it can be seen that the influence of inclination is suppressed, and the moment rigidity is high.

As described above, the present embodiment uses the fact that the moment rigidity of the elastic structure is high compared with the rigidity of the elastic structure in the translation direction.

Next, it will be shown that, by increasing the number of elastic structures, the moment rigidity can be further improved, and the performance can be improved.

Figure 27:
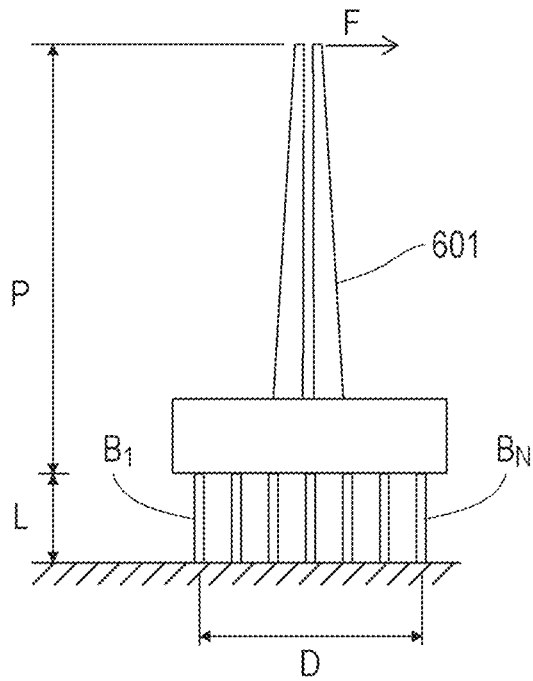
FIG. 27 is a schematic view of N elastic structures illustrating the second embodiment.

As illustrated in FIG. 27, regarding N elastic structures $B_1$ to $B_N$ that are provided within a distance D, the displacement of the distal end due to an external force F will be considered.

In the same way as in the aforementioned cases, the displacement is decomposed into an influence $\delta_F$ of horizontal movement and an influence $\delta_M$ of inclination.

Because the force is evenly applied to the N elastic structures, by using the formula of a both-end-fixed elastic structure, $\delta_F$ can be calculated from the following equation.

$$\delta_F = \frac{L^3}{12EI}\frac{F}{N} \quad (25)$$

When the geometrical moment of inertia I is decomposed, assuming that the cross-sectional shape of the elastic structure is rectangular, $$\delta_F = \frac{L^3}{Ebh^3}\frac{F}{N}. \quad (26)$$

The influence of inclination can be calculated as follows, where $F_i$ is a force in the compression direction applied to the i-th elastic structure, and $\delta_i$ is the displacement of the elastic structure.

Because the inclination of the elastic structure is $\delta_M/P$, the displacement of each elastic structure is, $$\delta_i = \frac{Di}{N-1}\frac{\delta_M}{P}. \quad (27)$$

From the formula of compression of the elastic structure, $$\delta_i = \frac{L}{Ebh}F_i. \quad (28)$$

Accordingly, the compression direction force $F_i$ applied to the i-th elastic structure is obtained as follows.

$$F_i = \frac{Ebh}{L}\frac{Di}{N-1}\frac{\delta_M}{P} \quad (29)$$

Because a moment FP is applied to the elastic structure due to the external force, from equilibrium of force, $$FP = \sum_{i=1}^{N-1} F_i \frac{Di}{N-1}. \quad (30)$$

By substation of the aforementioned $F_i$, $$FP = \sum_{i=1}^{N-1} \frac{Ebh}{L}\frac{\delta_M}{P}\left(\frac{Di}{N-1}\right)^2 = \quad (31)$$

$$\frac{Ebh}{L}\frac{\delta_M}{P}\frac{D^2}{(N-1)^2}\sum_{i=1}^{N-1} i^2 = \frac{Ebh}{L}\frac{\delta_M D^2}{P}\frac{N(2N-1)}{6(N-1)}$$

$$\delta_M = \frac{6LP^2 F(N-1)}{EbhD^2(2N-1)} \quad (32)$$

are obtained.

Thus, regarding displacement, the influence $\delta_F$ of horizontal movement and the influence $\delta_M$ of inclination have been obtained. Next, under a condition that $\delta_F$ is constant, the ratio between $\delta_F$ and $\delta_M$ will be calculated and evaluated.

As is well known, regarding the horizontal movement $\delta_F$, displacement increases inversely proportionally to the cube of the thickness h of the elastic structure.

Therefore, assuming that H is constant, the plate-thickness h will be defined by the following equation.

$$h=H/N^{1/3} \quad (33)$$

By calculating the ratio $\alpha(N)=\delta_M/\delta_F$, which is the ratio between these when the number of elastic structures is N, $$\alpha(N) = \frac{\delta_M}{\delta_F} = \frac{6H^2 P^2}{D^2 L^2}\frac{N-1}{N^{2/3}(2N-1)} \quad (34)$$

is obtained.

Figure 28:
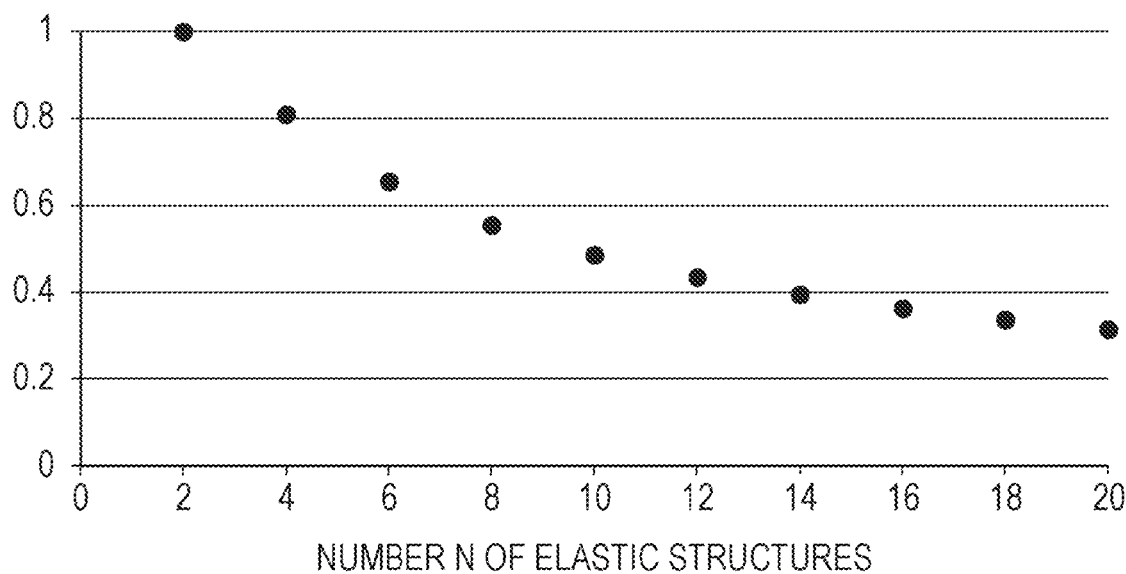
FIG. 28 is graph of the number of elastic structures and the displacement ratio illustrating the second embodiment.

FIG. 28 is graph of Expression (34). The horizontal axis represents the number N of elastic structures. The vertical axis represents the ratio that is normalized so that the ratio is 1 when the number of elastic structures is two, that is, $\alpha(N)/\alpha(2)$.

As the number of elastic structures increases, $\alpha(N)$ decreases. That is, the influence $\delta_M$ of inclination is smaller relative to the influence $\delta_F$ of horizontal movement, and the moment rigidity is higher. Heretofore, it has been described that the moment rigidity can be increased by increasing the number of elastic structures.

Moreover, when the number of elastic structures is large, it expected that the manufacturing error of each elastic structure can be averaged out, and an advantage that the manufacturing cost per elastic structure can be obtained.

Although a force in the horizontal direction has been described, the same idea can be applied to the vertical direction.

Figure 29A:
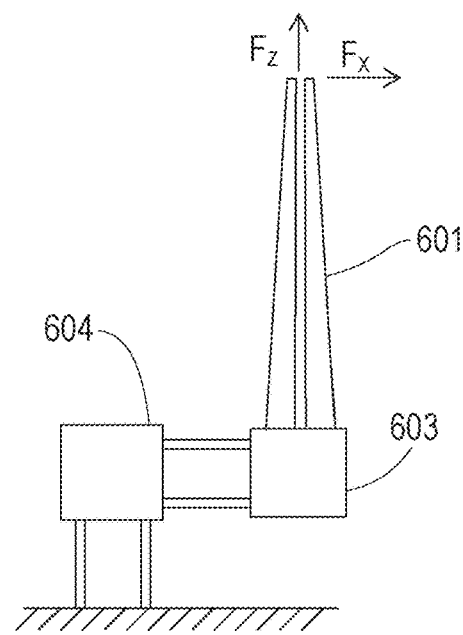
FIG. 29A is a schematic view of a two-stage elastic structure according to the second embodiment.

As illustrated in FIG. 29A, a case where the hand 601 is connected to the distal end of a two-stage elastic structure and a force in the horizontal direction and a force in the vertical direction are applied to the distal end of the robot hand will be considered. Here, a member that couples the first elastic structure will be referred to as the intermediate member 604, and a member that couples the second elastic structure will be referred to as the second member (action member) 603.

Figure 29B:
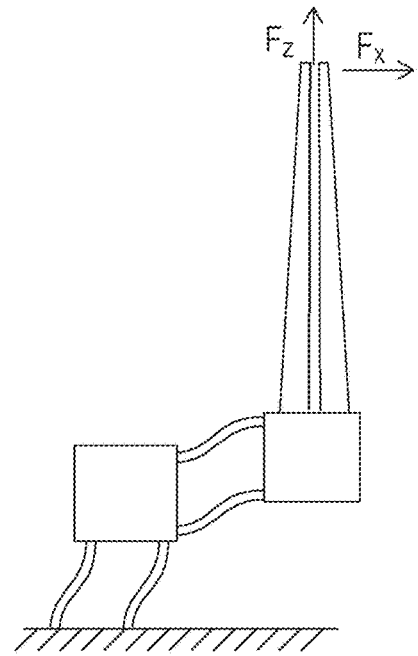
FIG. 29B illustrates deformation of the two-stage elastic structure.

Although deformation occurs as illustrated in FIG. 29B when an external force in the horizontal direction is applied, for the same reasons as described above, the influence of inclination is suppressed by the elastic structure.

It is necessary that the two-stage elastic structures be disposed in different directions. This is because, if the two-stage elastic structures were disposed in the same direction, these are the same as a single elastic structure and the advantage of the two-stage structure cannot be sufficiently obtained.

Figure 30:
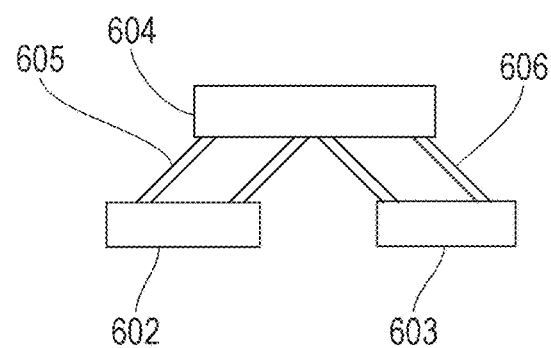
FIG. 30 is a schematic view of an inclined two-stage elastic structure according to the second embodiment.

FIG. 30 schematically illustrates the structure of the elastic body according to the present embodiment. The first member (base member) 602 fixed to the robot arm, the second member (action member) 603 fixed to the robot hand, and the intermediate member 604 are provided, and the first elastic structure 605 and the second elastic structure 606 couple these members to each other. The first elastic structure 605 is disposed so as to be inclined with respect to the normal-line direction from one of the outer surfaces of the first member 602 coupled to the first elastic structure. The second elastic structure 606 is disposed so as to be inclined with respect to the normal-line direction from one of the outer surfaces of the second member 603 coupled to the second elastic structure.

The first member (base member) 602, the second member (action member) 603, and the intermediate member 604 need to be harder than the elastic structures 605 and 606. This is because, if not so, the effect of the elastic structure is cancelled out, and the moment rigidity is decreased. That is, the first member (base member) 602, the second member (action member) 603, and the intermediate member 604 are each designed to have a sufficiently large thickness and a sufficiently large width so as to be sufficiently harder than the elastic structures 605 and 606.

With the inclined two-stage elastic structure described above, it is possible to realize a force-sense sensor that can be additively formed and that has high moment rigidity.

In FIG. 30, which is drawn with unequal scales for convenience of illustration, the distance between the first member 602 and the second member 603 looks comparatively large. However, this distance is smaller than each of the distance between the first member and the intermediate member and the distance between the second member and the intermediate member.

Moreover, preferably, the rigidity of the elastic body of the force-sense sensor does not change in accordance with directions. This is to prevent the measurement sensitivity of the force-sense sensor from changing in accordance with directions. For this purpose, a structure in which elastic structures are circumferentially arranged and the rigidity is not dependent on directions is realized.

Figure 31A:
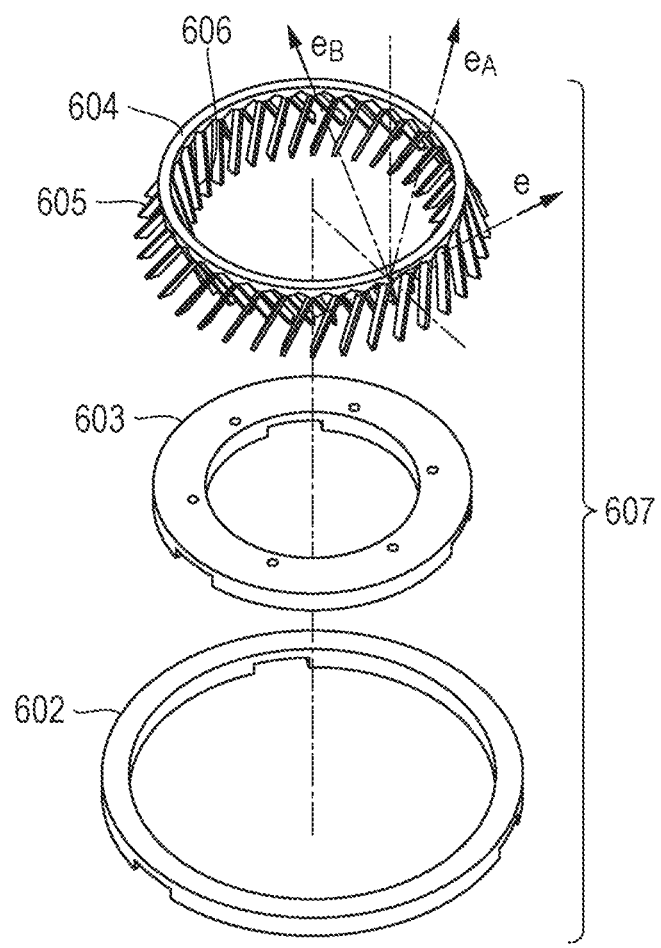
FIG. 31A is an exploded view of a circumferentially-arranged inclined two-stage elastic structure according to the second embodiment.
Figure 31B:
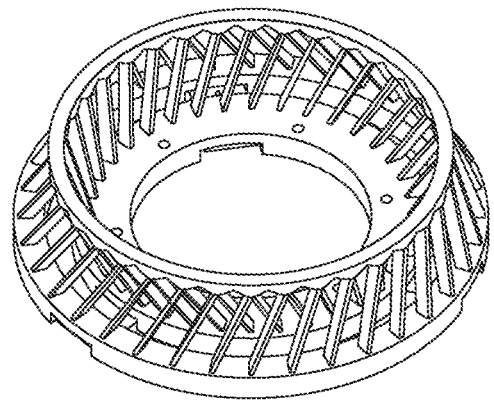
FIG. 31B is a completed view of the circumferentially-arranged inclined two-stage elastic structure.

FIG. 31A is an exploded view of the elastic body 607 including two-stage elastic structures that are arranged along a circumference. FIG. 31B is a completed view of the elastic body 607.

The first member (base member) 602 fixed to the robot arm, the second member (action member) 603 fixed to the robot hand, and the intermediate member 604 are provided, and the first elastic structure 605 and the second elastic structure 606 couple these members to each other.

With this configuration, due to symmetry around the vertical axis, a constant rigidity can be obtained irrespective of directions. At this time, it is important that the elastic body 607 have rotation symmetry of order 3 or larger. If not so, the rigidity changes in accordance with directions.

In FIG. 31A, the direction in which the first elastic structure 605 is set and the direction in which the second elastic structure 606 is set need to be different directions. This is because, if these directions are the same, a large difference in advantage compared with a case where a single elastic structure is used cannot be expected.

This condition can be represented by the following mathematical expression, because the direction vector $e_a$ of the first elastic structure 605 and the direction vector $e_b$ of the second elastic structure 606 differ from each other in the sign of the inner product thereof with the circumferential direction $e_r$ of the sensor.

$$\text{sign}(e_a \cdot e_r) \neq \text{sign}(e_b \cdot e_r) \tag{35}$$

As described above, with the present embodiment, by using the two-stage elastic structure, it is possible to realize high moment rigidity, which is important for a force-sense sensor. In doing so, by increasing the number of elastic structures, the moment rigidity can be increased. By inclining the elastic structure, the force-sense sensor can be manufactured by using an additive forming method. By arranging the elastic structures circumferentially, rigidity that is not dependent on directions can be realized.

Based on this fact, an example of a method of obtaining the size and the number of elastic structures by simulation will be described.

Figure 21A:
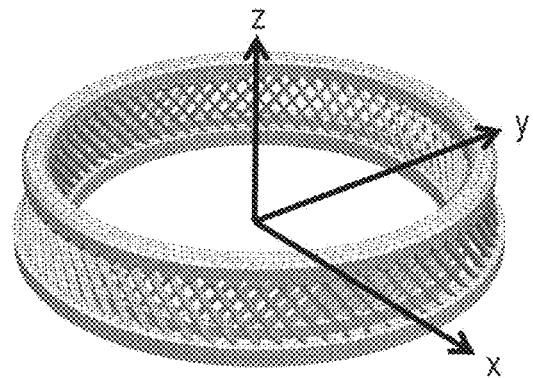
FIG. 21A is a deformation simulation model according to the second embodiment.

FIG. 21A illustrates an FEM model of the elastic body. An overview of this model is as follows.

first Member: external shape Φ56.0 mm, width 2.0 mm, thickness 2.0 mm intermediate member: external shape Φ47.0 mm, width 3.0 mm, thickness 1.5 mm second member: external shape Φ48.0 mm, width 2.0 mm, thickness 2.0 mm elastic structure: 72 pieces, width 1.0 mm, thickness 0.5 mm, inclination angle 39 degrees material: stainless steel Next, the displacement of the second member when the first member is fixed and a force and a moment are applied to the second member will be calculated.

Figure 21B:
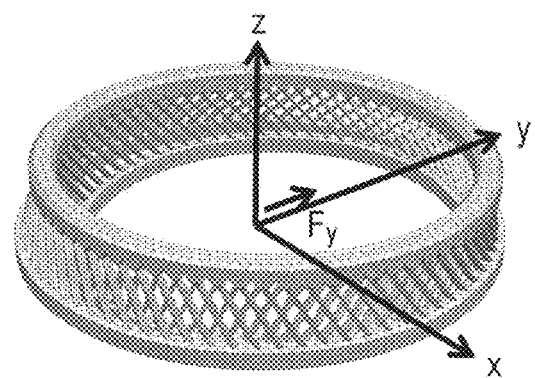
FIG. 21B illustrates deformation when an external force Fy in the Y direction is applied.
Figure 21C:
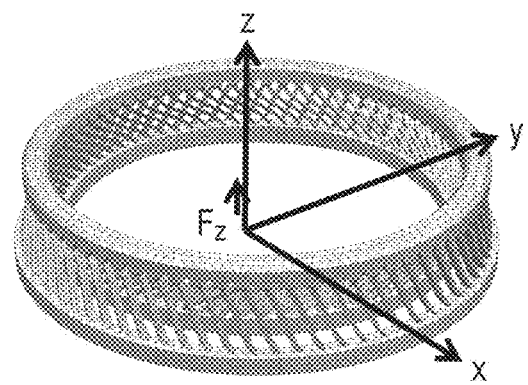
FIG. 21C illustrates deformation when an external force Fz in the Z direction is applied.
Figure 21D:
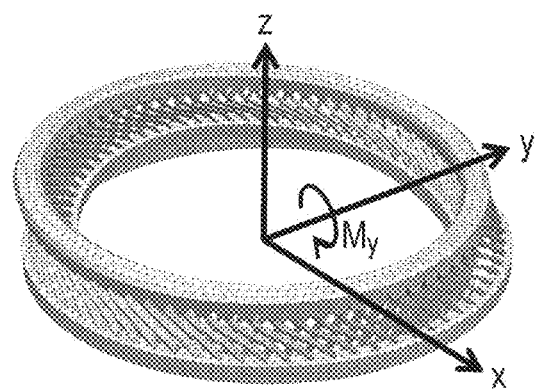
FIG. 21D illustrates deformation when a moment force My in the Y direction is applied.
Figure 21E:
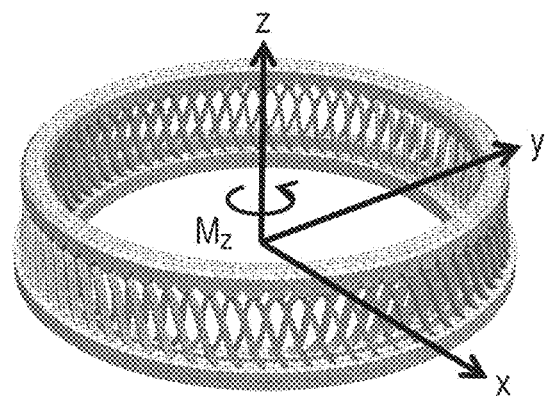
FIG. 21E illustrates deformation when a moment force Mz in the Z direction is applied.

FIG. 21B illustrates deformation when an external force Fy in the Y direction is applied. FIG. 21C illustrates deformation when an external force Fz in the Z direction is applied. FIG. 21D illustrates deformation when a moment force My in the Y direction is applied. FIG. 21E illustrates deformation when a moment force Mz in the Z direction is applied.

Because the X direction provides the same result as that of the Y direction due to symmetry, description will be omitted. The calculation results of the deformation simulation are as follows, where F is a six-dimensional force vector, δ is a deformation vector, and C is a compliance matrix.

$$[\delta] = [C][F] \quad (36)$$

$$[C] = \begin{bmatrix} 3.68E-7 & 0 & 0 & 0 & 0 & 0 \\ 0 & 3.68E-7 & 0 & 0 & 0 & 0 \\ 0 & 0 & 4.97E-7 & 0 & 0 & -5.43E-6 \\ 0 & 0 & 0 & 90.66E-6 & 0 & 0 \\ 0 & 0 & 0 & 0 & 9.66E-6 & 0 \\ 0 & 0 & -5.4eE-6 & 0 & 0 & 1.24E-3 \end{bmatrix} \quad (37)$$

Here, the unit of F is N and Nm. The unit of δ is m and rad.

A case where a force of 1 N is applied to a position separated by 100 mm will be considered. At this time, a rotation moment applied to the force-sense sensor is 0.1 Nm. From the compliance matrix, the influence $\delta_F$ of horizontal movement, the influence $\delta_M$ of inclination, and the ratio α between these are as follows.

$$\delta_F = 3.68E-7 \quad (38)$$
$$\delta_M = 9.66E-6 \times 0.1 \times 0.1 = 9.66E-8$$
$$\alpha = \frac{\delta_M}{\delta_F} = 0.26$$

α is 0.26 and small. From this result, it can be seen that the influence of inclination is small and high moment rigidity is realized. The reason for α being small is due to the effect of the elastic structure.

Next, a method of manufacturing the force-sense sensor according to the present embodiment will be described. As described above, because the force-sense sensor according to the present embodiment has a small overhang angle, the sensor can be manufactured by using an additive forming method.

Figure 22A:
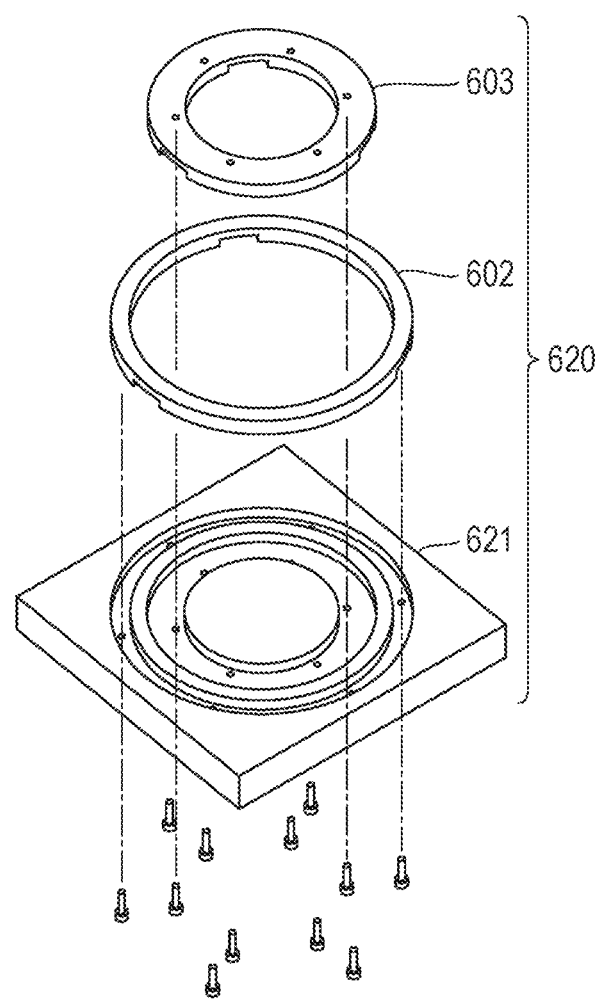
FIG. 22A is an exploded view of a forming unit according to the second embodiment.
Figure 22B:
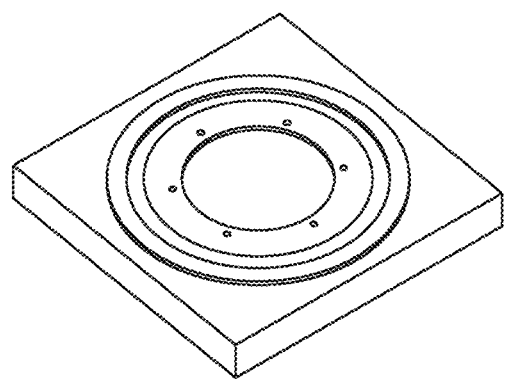
FIG. 22B is an assembly view of the forming unit.

FIG. 22A is an exploded view illustrating a forming unit 620 to be attached to the additive forming apparatus. FIG. 22B is an assembly view of the forming unit 620.

The first member 602 fixed to the robot arm and the second member 603 fixed to the robot hand are ring-shaped components. Detailed descriptions of forming of shapes by using a lathe or the like, screwing of these members to a forming plate 621 shown in FIG. 22A, and irradiation of these members with a laser beam, which are the same as those in the first embodiment, will be omitted.

Figure 23A:
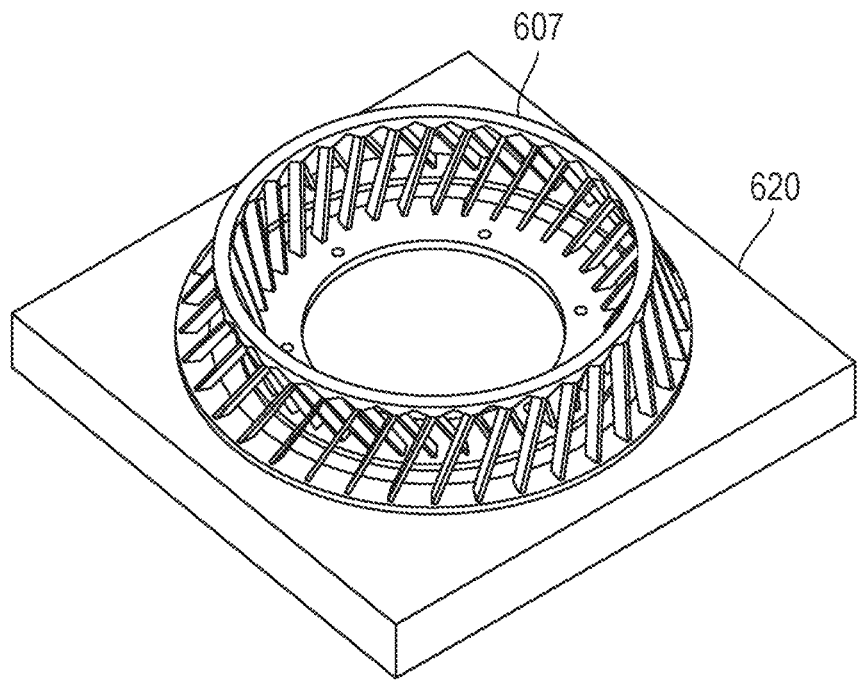
FIG. 23A illustrates an elastic body that is additively formed on a forming plate.
Figure 23B:
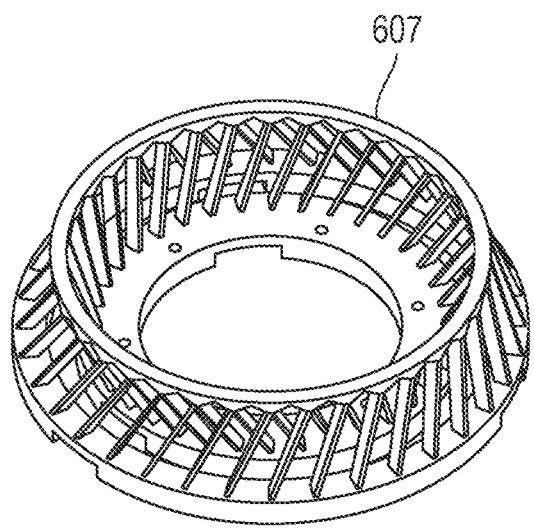
FIG. 23B is a perspective view of a completed elastic body.

FIG. 23A illustrates an elastic structure immediately after being formed on the forming unit 620. As illustrated in FIG. 23B, the elastic body 607 can be removed from the forming plate by removing fixing screws of the forming plate.

As described above, the force-sense sensor according to the present embodiment can be manufactured by using an additive forming method, and the manufacturing cost can be reduced. Moreover, compared with existing additive forming methods, the manufacturing cost can be reduced in the first to fourth respects described in the first embodiment.

Moreover, because the additive forming method can form complex shapes in contrast to existing machining, it is easy to increase the number of elastic structures and to further improve the moment rigidity. Even if a manufacturing error occurs, because the number of elastic structures is large, the manufacturing error of each elastic structure is averaged out, and influence is small.

In the present embodiment, a case where manufacturing is performed by using an additive forming method has been described. However, this is not a limitation. As the case may be, manufacturing may be performed only by machining.

In the present embodiment, it has been described that the cross-sectional shape of the elastic structure is a rectangular shape. However, the cross-sectional shape is not limited to a rectangular shape. For example, the cross-sectional shape may be a rectangular shape with rounded corners or an elliptical shape.

First Modification of Second Embodiment

Next, a modification of the second embodiment will be described. To be specific, the modification differs in that the elastic structure is curved.

Figure 24:
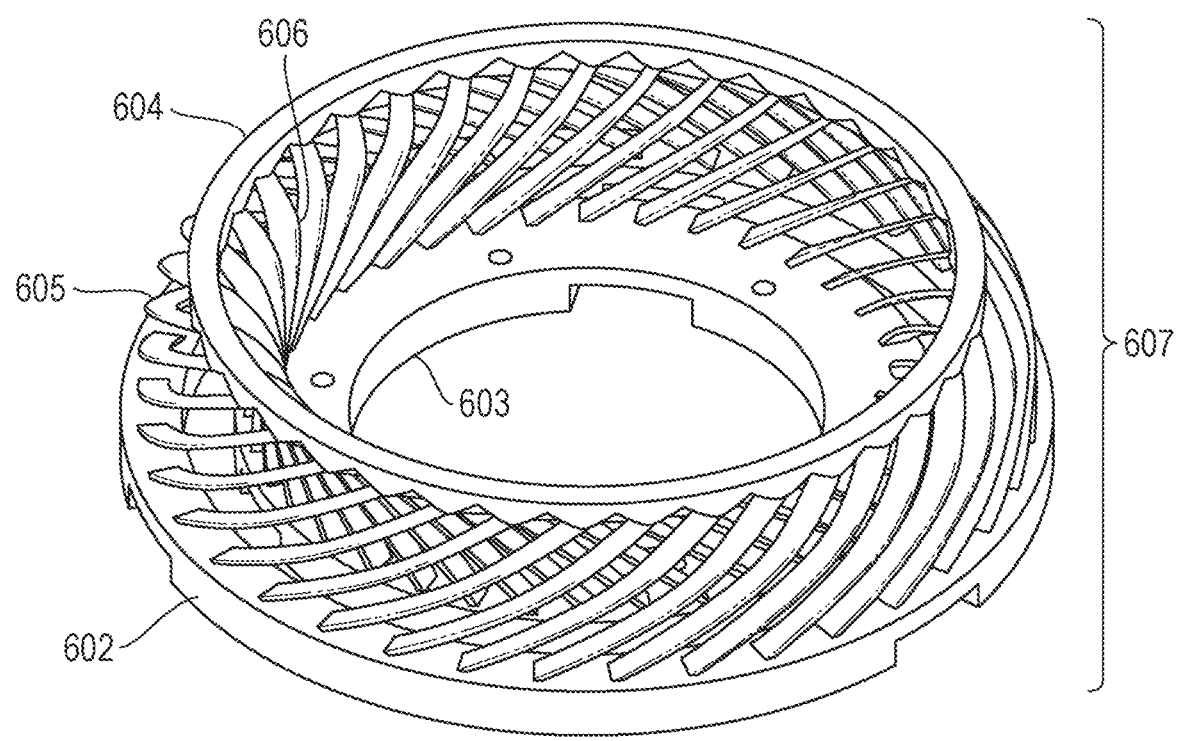
FIG. 24 is a configuration view of a force-sense sensor according to a modification of the second embodiment.

In FIG. 24, the elastic body 607 of the force-sense sensor includes the first member 602 to be fixed to the robot arm, the second member 603 to be fixed to the robot hand, and the intermediate member 604. The first member 602 and the intermediate member 604 are coupled to each other via the first elastic structure 605, and the second member 603 and the intermediate member 604 are coupled to each other via the second elastic structure 606.

The first member and the second member are disposed along the same plane, and the intermediate member is disposed to be separated from the plane in such a way that, when the intermediate member is projected onto the plane, at least a part of a projection overlaps a gap between the first member and the second member.

The first elastic structure 605 is curved outward, and the second elastic structure 606 is curved inward. That is, the second member is disposed so as to be coaxial with the first member and has an annular shape whose radius is smaller than the first member. The first elastic structure has a shape that is curved so as to be convex in a direction away from the center, and the second elastic structure has a curved shape that is curved so as to be convex in a direction toward the center.

If these elastic structures are not curved but linear, when the number of elastic structures is increased, the first elastic structure and the second elastic structure overlap. That is, because the beam of one of the first elastic structure and the second elastic structure extends from the outside toward the inside, and the beam of the other of the first and second structures extends from the inside toward the outside, when the number of beams is increased and the density of the beams is increased, the beams of these two structures contact each other near the midpoints thereof. Accordingly, the number of beams has an upper limit.

However, when the elastic structures are curved as in the present embodiment, overlapping can be avoided, and the number of elastic structures can be further increased. With the present embodiment, it is possible to realize higher moment rigidity because the number of elastic structures can be increased.

Second Modification of Second Embodiment

As a second modification of the second embodiment, an optical sensor, instead of a magnetic sensor, may be used as a displacement detector. Detailed description of the configuration, which is similar to the first embodiment, will be omitted. By using an optical sensor, it is possible to provide a force-sense sensor that is compact and that can be manufactured at low cost.

Third Embodiment

A third embodiment will be described with reference to the drawings. Regarding the robot system illustrated in FIG. 1, in the first embodiment, an example of a torque sensor attached to the rotary joints J1 to J6 has been described; and in the second embodiment, the force-sense sensor 207 disposed at a wrist portion between the robot arm and the robot hand 210 has been described. In the present embodiment, a fingertip-force sensor 220a and a fingertip-force sensor 220b for detecting a force applied to a grasped object will be described. The force sensor according to the present embodiment may be referred to as a "fingertip-force sensor" in the present description.

The robot hand 210 of the six-axis articulated robot apparatus 100 illustrated in FIG. 1 has a plurality of movable fingers. Although the hand illustrated in the figure has two fingers, a fingertip-force sensor according to the present embodiment can be also used in a hand having three or more fingers. To respective fingers, a finger 230a and a finger 230b are attached via the fingertip-force sensor 220a and the fingertip-force sensor 220b according to the present embodiment When a component is grasped with the robot hand 210 and an assembly operation is performed, a force applied to the grasped object is detected by the fingertip-force sensor 220a and the fingertip-force sensor 220b. Based on the measurement value, a control device 101 controls the joints J1 to J6.

For example, in an operation step of abutting a component against a flat plate, the robot joints are controlled so as to move the component closer to the flat plate until the measurement value of the fingertip-force sensor becomes a predetermined force. This is an essential function for controlling the operation of the assembly robot in accordance with a force applied to the fingertip. A method of performing a similar function by using a force-sense sensor attached to a wrist of a robot is also known. However, the fingertip-force sensor has an advantage of quick response because inertia is small.

Another example of use of the fingertip-force sensor is an operation step of grasping a component. In the grasping step, a finger is moved closer until the measurement value of the fingertip-force sensor becomes a predetermined force. This is an essential function for the assembly robot that grasps and assembles soft components while suppressing deformation of the components. For example, when handling a thin plastic ring, it is necessary to grasp the ring with a small force of about 1 N.

Figure 32:
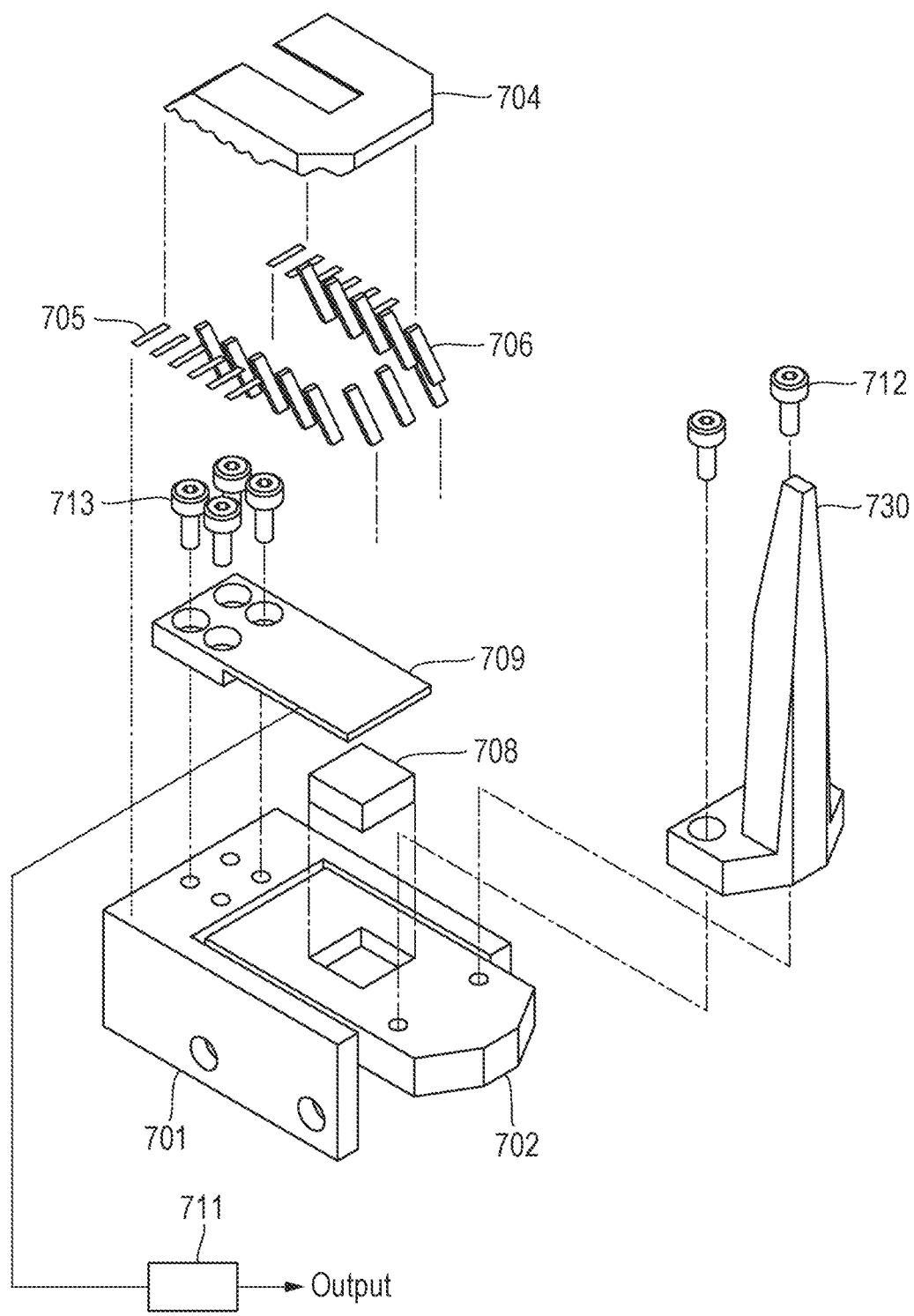
FIG. 32 is an exploded view of a fingertip-force sensor according to a third embodiment.
Figure 33:
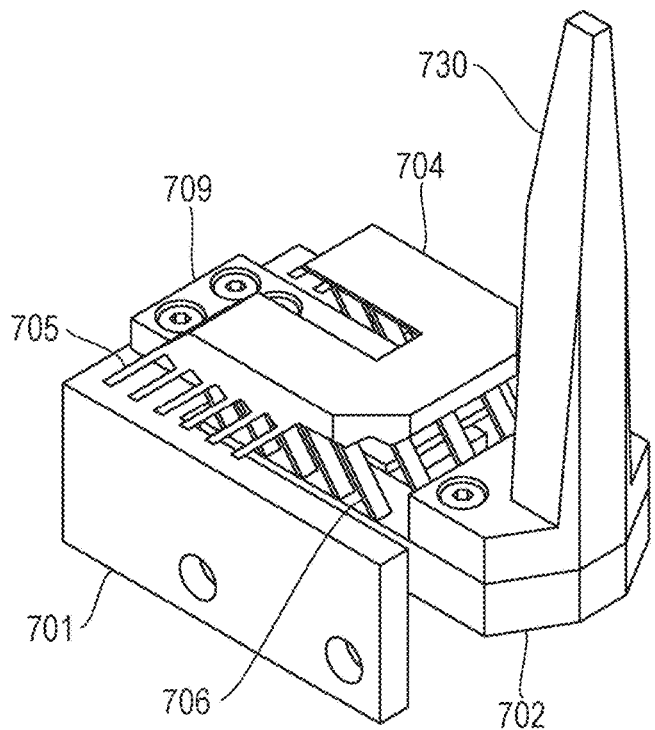
FIG. 33 is a perspective view of the fingertip-force sensor according to the third embodiment.
Figure 34:
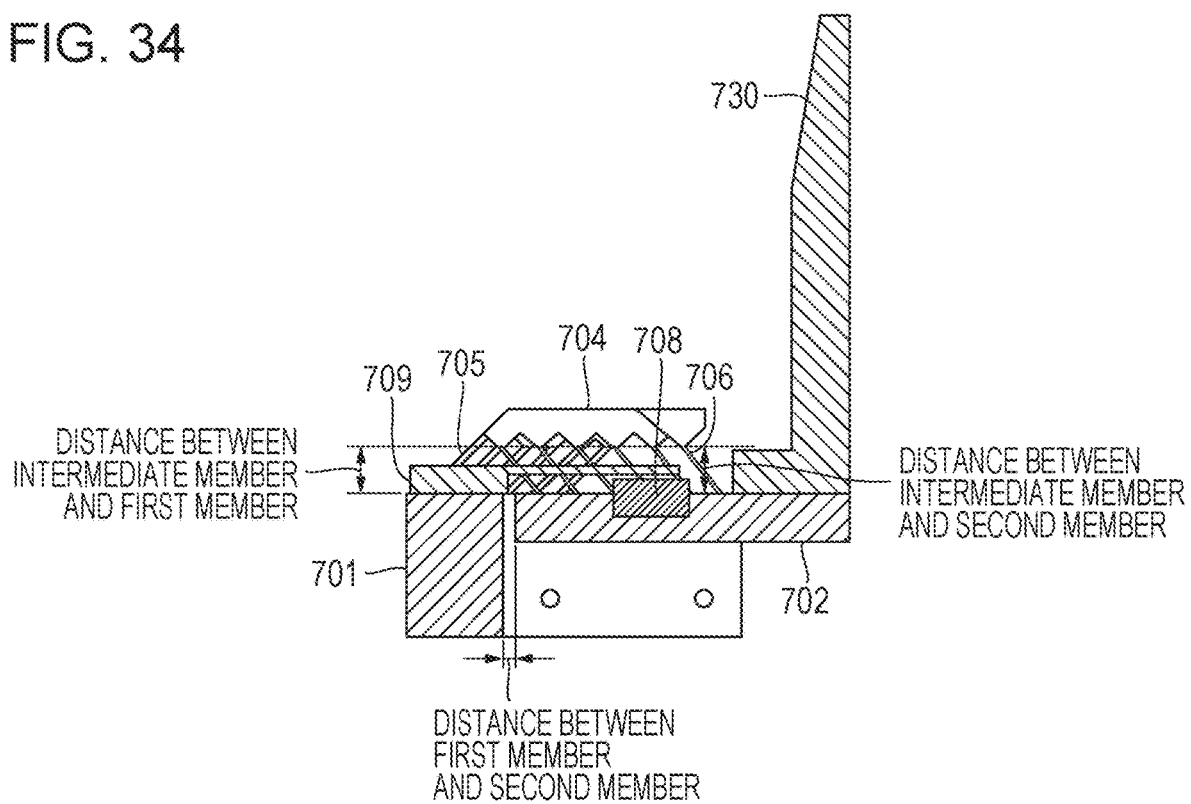
FIG. 34 is a sectional view of the fingertip-force sensor according to the third embodiment.

FIG. 32, FIG. 33, and FIG. 34 illustrate the configuration of the fingertip-force sensor according to the present embodiment. FIG. 32 is an exploded view, FIG. 33 is a perspective view, and FIG. 34 is a sectional view of the fingertip-force sensor.

A first member 701 is provided so as to be fixed to a driving unit (not shown) of the finger, and a second member 702 and an intermediate member 704 are provided. By using a first elastic structure 705, the first member 701 and the intermediate member 704 are coupled. In the present embodiment, an example in which the first elastic structure is composed of twelve elastic structures that are arranged in six columns and two rows is shown. However, the number of the elastic structures and the number of rows are not limited to these.

By using a second elastic structure 706, the second member 702 and the intermediate member 704 are coupled. In the present embodiment, an example in which the second elastic structure is composed of thirteen elastic structures including ten arranged in five columns and two rows and three at a central part is shown. However, the number and the arrangement of the elastic structures are not limited to these.

The first member 701, the second member 702, the intermediate member 704, the first elastic structure 705, and the second elastic structure 706 constitute an elastic body. As described below, the elastic body is an integrated component a part of which is formed by using an additive forming method.

The first member and the second member are disposed along the same plane, and the intermediate member is disposed to be separated from the plane in such a way that, when the intermediate member is projected onto the plane, at least a part of a projection of the intermediate member overlaps a gap between the first member and the second member.

A finger 730 is fixed to the second member 702 with screws 712. A finger that has an appropriate shape corresponding to the shape of an object to be assembled by the robot hand is used.

A sensor board 709 of a displacement detector is fixed to the first member 701 with screws 713. A magnet 708 of the displacement detector is fixed to the second member 702. The displacement detector may be a magnetic displacement gauge having a magnet, or may be an optical displacement gauge as described below.

Because the present embodiment detects displacements of the first member and the second member, whose relative distance therebetween is the smallest among the first member, the second member, and the intermediate member, the present embodiment has a configuration that is most advantageous for realizing high sensitivity. The first member, the second member, and the intermediate member are disposed in the same way as in the first embodiment.

Preferably, the distance between the first member and the second member is in the range of 10 μm to 10 mm, for the same reason as in the first embodiment.

In a case where a magnetic displacement gauge is used, when the magnet 708 moves, the lines of magnetic force around the magnet 708 also move. The movement of the lines of magnetic force is detected by using a plurality of Hall elements or magnetoresistive elements provided on the sensor board 709. With this method, movement of the magnet 708 in the XYZ three directions can be detected. The detection signals δx, δy, and δz are input to a control board 711 illustrated in FIG. 32, and fingertip forces Fx, Fy, and Fz in the XYZ three directions are output. The conversion is performed by using the following equation.

$$\begin{bmatrix} F_x \\ F_y \\ F_z \end{bmatrix} = [K] \begin{bmatrix} \delta_x \\ \delta_y \\ \delta_z \end{bmatrix} \quad (39)$$

Here, [K] is a rigidity matrix, which is a constant obtained beforehand. The matrix can be actually measured by applying a force in three directions to the fingertip. As described below, the matrix can be also calculated by using FEM.

Next, it will be described that the elastic body according to the present embodiment can be manufactured by using an additive forming method. As described above, with an additive forming method, the overhang angle has a limitation, and, in particular, it is difficult to form a horizontal top surface.

Figure 35:
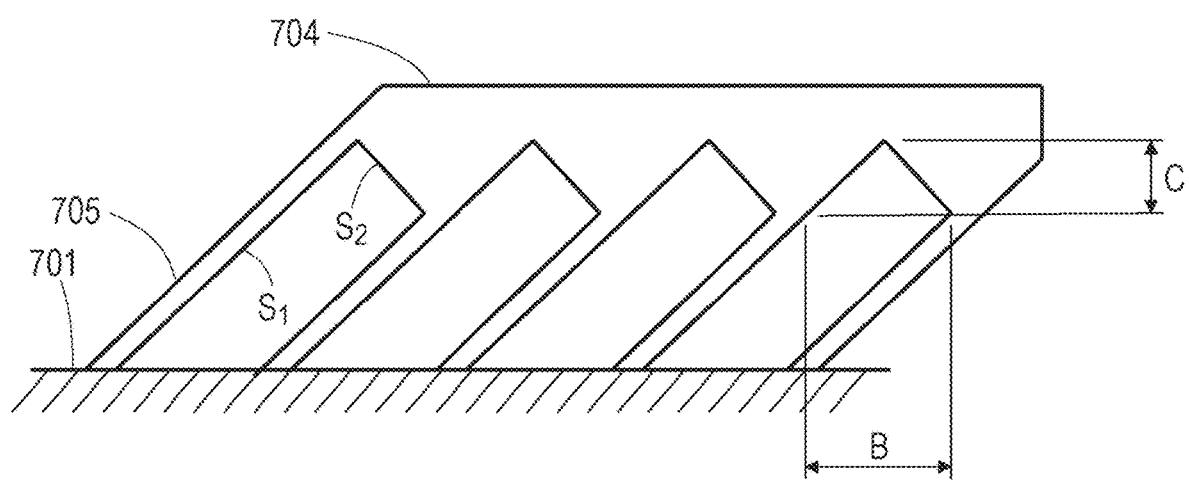
FIG. 35 illustrates an overhang angle according to the third embodiment.

FIG. 35 is a schematic view illustrating an elastic body according to the present embodiment, with a focus on the overhang angle. The first member 701 and the intermediate member 704 are coupled via the first elastic structure 705. Portions for which overhang is concerned are portions S1 and S2 shown in the figure. It is necessary to design the pitch B of the elastic structure and the dimension C of the elastic structure in the vertical direction so that the overhang becomes smaller than or equal to the aforementioned limitation value. As can be seen from the schematic view, the condition is represented as follows.

$$\beta = \arctan\left(\frac{B}{2C}\right) \quad (40)$$

In order to reduce the dimension C and to reduce the thickness of the fingertip-force sensor, it is preferable that the pitch B of the elastic structure be smaller, that is, the number of elastic structures be larger. As described above, increasing the number of elastic structures serves to increase the rigidity ratio of the fingertip-force sensor. With the elastic body according to the present embodiment, by increasing the number of elastic structures, the rigidity ratio can be improved, the overhang angle can be reduced, and the elastic body can be additively formed.

Next, as more specific design examples, the results of an FEM simulation will be described.

First, the idea behind the present embodiment will be described. The definitions of main symbols used in mathematical expressions in the present description are as follows.

L: length of elastic structure
E: Young's modulus of elastic structure
I: geometrical moment of inertia of elastic structure, in a case where thickness is h and width is b, $I=bh^3/12$
P: force in bending direction applied to elastic structure
W: force in axial direction applied to elastic structure
F, M: force and moment $\delta$, $\theta$: displacement and rotation angle
$H_x$, $H_y$: thicknesses of elastic structure in x and y directions
$L_x$, $L_y$: lengths of elastic structure row in x and y directions
$N_x$, $N_y$: numbers of elastic structure rows in x and y directions
$C_0$: sensor coordinate system Because the fingertip-force sensor is constituted by an elastic body and a displacement measurement unit, the mechanical performance is determined by the elastic body. First, the rigidity of the elastic body will be clarified from the viewpoint of the material mechanics.

Figure 36A:
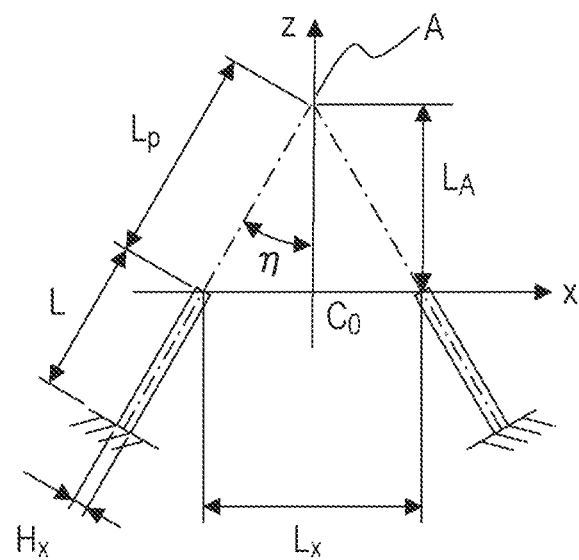
FIG. 36A is a schematic view of a radially-arranged two elastic structures illustrating the third embodiment.

As illustrated in FIG. 36A, two elastic structures that are disposed in radial directions from a point A will be examined. A coordinate system $C_0$ is set at the center of the elastic structure, the distance from the origin to the point A is denoted by $L_A$. The distance between the two elastic structures is denoted by $L_x$. The distance to the point A is denoted by $L_p$, and the inclination angle is denoted by $\eta$.

That is, $$L_p = \sqrt{L_x^2/4 + L_A^2}$$

$$\eta = \arctan(L_x/2L_A) \quad (41)$$

are satisfied.

Figure 36B:
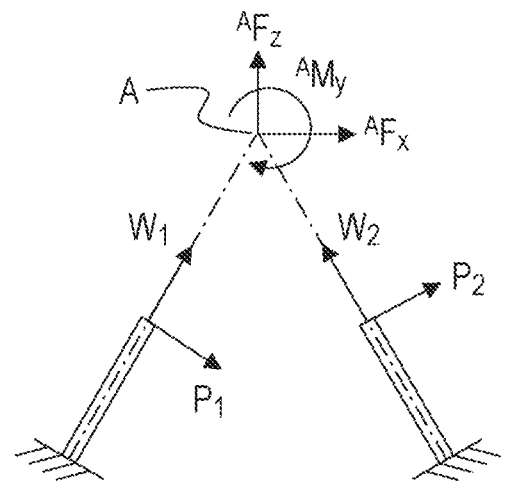
FIG. 36B is a schematic view of the radially-arranged two elastic structures illustrating the third embodiment.

Regarding the notation of force, as illustrated in FIG. 36B, a force F and a rotation moment M that are applied to the point A are each denoted with "A" at the left upper corner of the character for discrimination. Regarding forces applied to the elastic structure, a force in the axial direction is denoted by W, and a force in the bending direction is denoted by P.

Figure 36C:
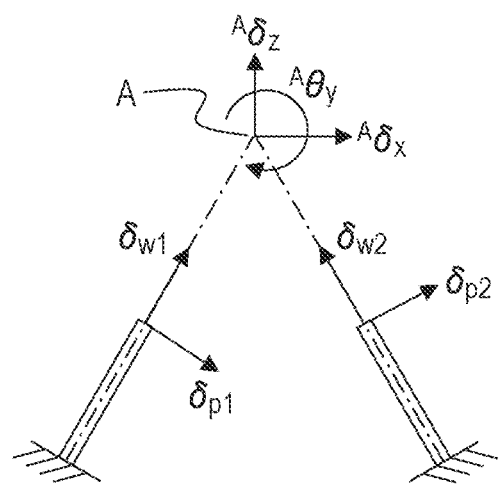
FIG. 36C is a schematic view of the radially-arranged two elastic structures illustrating the third embodiment.

Regarding the notation of displacement, as illustrated in FIG. 36C, the displacement $\delta$ and the rotation angle $\theta$ of the point A are also each denoted with "A" at the left upper corner of the character for discrimination. Regarding displacements of the elastic structure, a displacement in the axial direction is denoted by $\delta w$, and a displacement in the bending direction is denoted by $\delta p$ or the like.

In FIG. 36B, forces $^AFX$ and $^AFz$ and a moment force $^AMy$ applied to the point A will be considered. By decomposing these into forces $W_1$ and $W_2$ in the axial direction and forces $P_1$ and $P_2$ in the bending direction that are applied to two elastic structures and by considering balance of force, the following equations are obtained.

$$^AF_x = (P_1+P_2)\cos(\eta)+(W_1-W_2)\sin(\eta)$$

$$^AF_z = (-P_1+P_2)\sin(\eta r)+(W_1+W_2)\cos(\eta)$$

$$^AM_y = -(P_1+P_2) \quad (42)$$

Regarding the deformation $\delta_w$ in the axial direction and the deformation $\delta_p$ in the bending direction of the elastic structure, the following equations are obtained from the formula of the material mechanics.

$$\delta_{w1} = \frac{LW_1}{EA} \quad (43)$$

$$\delta_{w2} = \frac{LW_2}{EA}$$

$$\delta_{p1} = \frac{L^2 P_1}{12EI}$$

$$\delta_{p2} = \frac{L^3 P_2}{12EI}$$

Here, E is the Young's modulus, I is the geometrical moment of inertia, A is the sectional area, and L is the length of the elastic structure.

In FIG. 36C, regarding the translational movement amounts $^A\delta x$ and $^A\delta z$ and the rotation angle $\Delta\theta y$ of the point A, the following equations are obtained from the geometrical relationship.

$$\delta_{p1} = {}^A\delta_x \cos(\eta) - {}^A\delta_z \sin(\eta) - L_p {}^A\theta_y$$

$$\delta_{p2} = {}^A\delta_x \cos(\eta) + {}^A\delta_z \sin(\eta) - L_p {}^A\theta_y$$

$$\delta_{w1} = {}^A\delta_x \sin(\eta) + {}^A\delta_z \cos(\eta)$$

$$\delta_{w2} = -{}^A\delta_x \sin(\eta) + {}^A\delta_z \cos(\eta) \quad (44)$$

By integrating Expression (42) to Expression (44), the relationship between forces applied to the point A and displacements, that is, the rigidity matrix is calculated, thereby obtaining the following equation.

$$\begin{bmatrix} {}^AF_x \\ {}^AF_z \\ {}^AM_y \end{bmatrix} = \frac{2E}{L^3} \begin{bmatrix} 12I\cos^2(\eta) + AL^2\sin^2(\eta) & 0 & 12IL_p\cos(\eta) \\ 0 & 12I\sin^2(\eta) + AL^2\cos^2(\eta) & 0 \\ 12IL_p\cos(\eta) & 0 & 12IL_p^2 \end{bmatrix} \begin{bmatrix} {}^A\delta_x \\ {}^A\delta_z \\ {}^A\theta_y \end{bmatrix} \quad (45)$$

Figure 37:
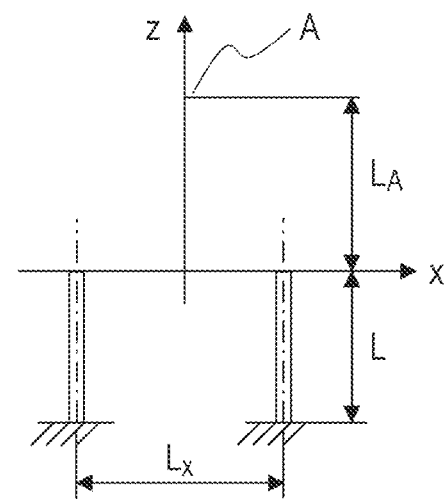
FIG. 37 is a schematic view of a parallelly-arranged two elastic structures illustrating the third embodiment.

Regarding the parallelly-arranged elastic structure illustrated in FIG. 37, by performing calculation in a similar way, the relationship between forces applied to the point A and displacements is represented by the following equation.

$$\begin{bmatrix} {}^AF_x \\ {}^AF_z \\ {}^AM_y \end{bmatrix} = \frac{2E}{L^3} \begin{bmatrix} 12I & 0 & 12IL_a \\ 0 & AL^2 & 0 \\ 12IL_a & 0 & 12IL_a^2 \end{bmatrix} \begin{bmatrix} {}^A\delta_x \\ {}^A\delta_z \\ {}^A\theta_y \end{bmatrix} \quad (46)$$

The following table shows the calculated rigidities of the radially arranged elastic structure and the parallelly arranged elastic structure.

TABLE 2

|  | Rigidity Kx in Horizontal Direction | Rigidity Kz in Vertical Direction |
| --- | --- | --- |
| Radial Arrangement | $\frac{2E}{L^3}(12I\cos^2(\eta) + AL^2\sin^2(\eta))$ | $\frac{2E}{L^3}(12I\sin^2(\eta) + AL^2\cos^2(\eta))$ |
| Parallel Arrangement | $\frac{24EI}{L^3}$ | $\frac{2EA}{L}$ |

It is known that the rigidity of an elastic structure is higher in the axial direction than in the bending direction.

In Table 2, by focusing on the term including the sectional area A related to the rigidity in the axial direction, it can be seen that the rigidity Kx in the horizontal direction is higher in the radial arrangement than in the parallel arrangement.

Next, this relationship will be described by substitution of specific values. It is assumed that the distance Lx between elastic structures, which influences the size of the fingertip-force sensor, is 20 mm, and the distance $L_A$ from the sensor to the point A is 30 mm. It is assumed that the Young's modulus E of the elastic structure is 200 GPa, the width and the thickness of the elastic structure are each 1 mm, and the length L of the elastic structure is 10 mm. In this case, the inclination angle of the radially arranged elastic structure $\eta=18.4$ degrees, and the rigidities can be calculated as shown in the following table.

TABLE 3

|  | Rigidity Kx in Horizontal Direction | Rigidity Kz in Vertical Direction |
| --- | --- | --- |
| Radial Arrangement | 4360 N/mm | 36040 N/mm |
| Parallel Arrangement | 400 N/mm | 40000 N/mm |

When focused on the rigidity Kx in the horizontal direction in Table 3, the rigidity of the radial arrangement is more than 10 times higher than that of the parallel arrangement. A fingertip-force sensor is a sensor that detects deformation of an elastic body due to a force applied to a fingertip. As the rigidity increases, the deformation of the elastic body decreases, and the sensitivity of the sensor decreases.

As described above with reference to the table, although the rigidity Kx in the horizontal direction can be reduced by using the parallel arrangement, the rigidity Kz in the vertical direction is still high.

Figure 38:
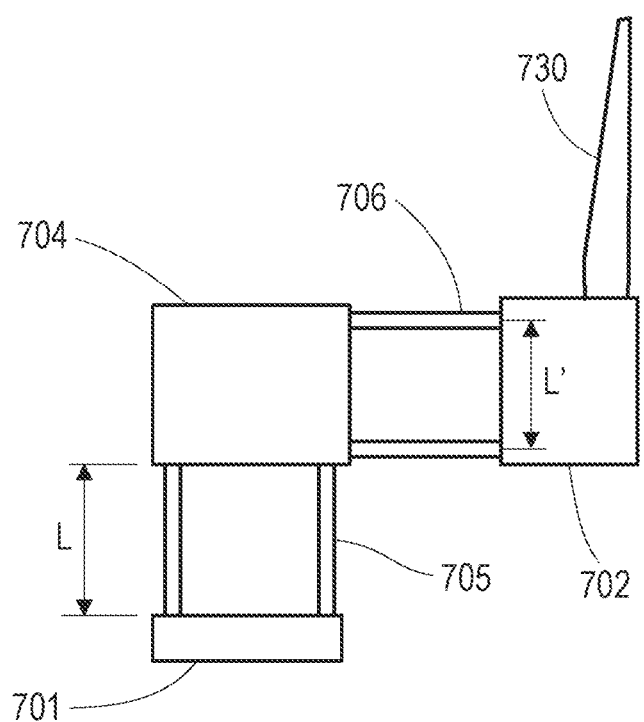
FIG. 38 is a schematic view of a two-stage elastic structure illustrating the third embodiment.

Therefore, in the present embodiment, as illustrated in FIG. 38, two-stage elastic structures are configured. That is, the first member 701, the second member 702, the intermediate member 704 are provided, the first member 701 and the intermediate member 704 are coupled via the first elastic structure 705, and the second member 702 and the intermediate member 704 are coupled via the second elastic structure 706. The first member is fixed to a movement member (not shown) of a finger, and the second member 702 is fixed to the finger 730.

With such a configuration, all the XYZ three axes can be made to coincide with the bending directions of the elastic structure, and rigidity can be designed to be low.

It is important that the first elastic structure 705 and the second elastic structure 706 extend in different directions. A case where the directions are the same is the same as the case of a single elastic structure, and the difference between the rigidity in the horizontal direction and the rigidity in the vertical direction is large. As described below, it is the most effective that the directions of elastic structures differ by 90 degrees.

Figure 39:
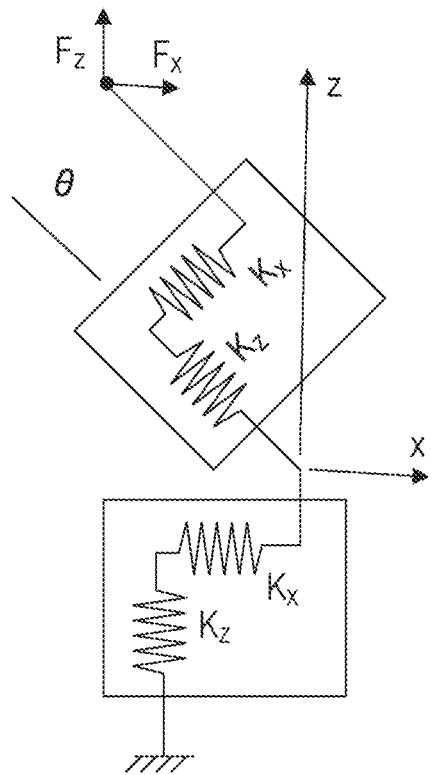
FIG. 39 is a schematic view of an elastic body having an inclined connection illustrating the third embodiment.

FIG. 39 is a schematic view of an elastic body in which the rigidities Kx and Kz in the horizontal and vertical directions are combined and connected at an angle $\theta$.

The displacements of this structure, which is a serial spring, in the X and Y directions can be calculated as follows.

$$\delta_x = \left(\frac{\cos^2(\theta)}{K_x} + \frac{\sin^2(\theta)}{K_z} + \frac{1}{K_x}\right)F_x \quad (47)$$

$$\delta_z = \left(\frac{\sin^2(\theta)}{K_x} + \frac{\cos^2(\theta)}{K_z} + \frac{1}{K_z}\right)F_z$$

Because Kz is sufficiently larger than Kx as described above, Expression (47) can be simplified as follows.

$$\delta_x = \frac{F_x}{K_x}(1 + \cos^2(\theta)) \tag{48}$$

$$\delta_z = \frac{F_z}{K_x}\sin^2(\theta)$$

From the above equations, the rigidity ratio $R_{xz}$ of the entirety of the elastic body between the X and Z two directions is as follows.

$$R_{xz} = \frac{F_x}{\delta_x} \Big/ \frac{F_z}{\delta_z} = \frac{\sin^2(\theta)}{1 + \cos^2(\theta)} \tag{49}$$

Figure 40:
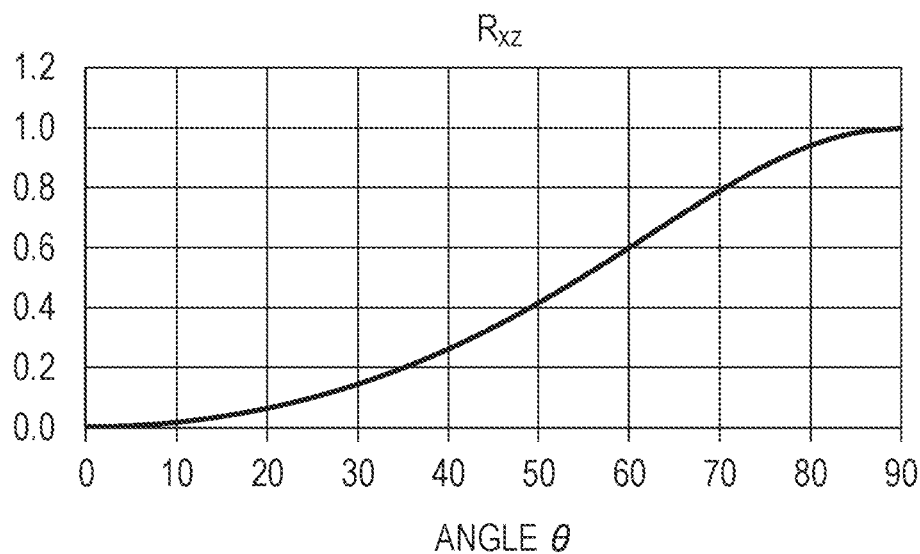
FIG. 40 is a graph of the rigidity ratio illustrating the third embodiment.

FIG. 40 is a graph illustrating the relationship between the rigidity ratio $R_{zx}$ and angle θ in Expression (49). It is preferable that the fingertip-force sensor has same sensitivities in the XYZ three directions. The rigidity ratio is 1, which is the best, when the angle is 90 degrees. Assuming that the practical limit of the sensitivity ratio is about 0.1, it is necessary that the angle be 25 degrees or larger.

According to the material mechanics, the bending rigidity is inversely proportional to the cube of the length L of the elastic structure. Accordingly, it is more advantageous as the length L increases. Moreover, a stress applied to the elastic structure can be also reduced. However, when L is increased, the thickness fingertip sensor increases.

Figure 41:
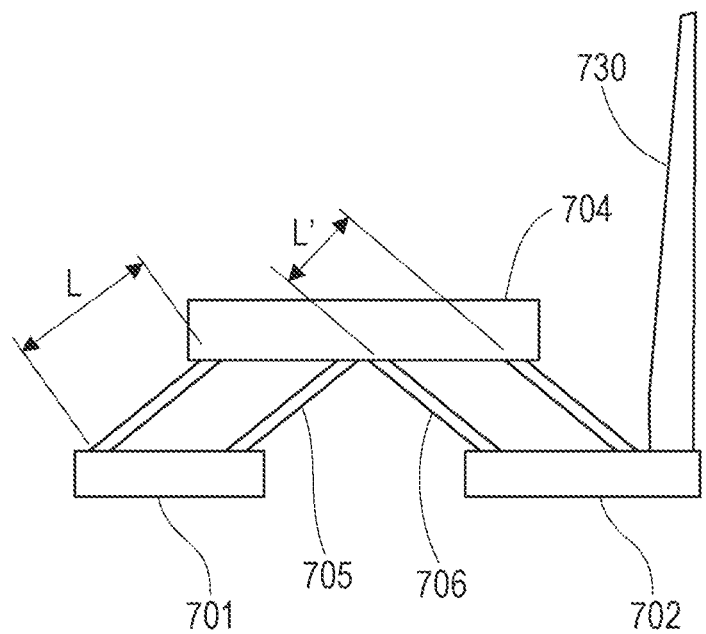
FIG. 41 is a schematic view of inclined two sets of elastic structures illustrating the third embodiment.

Therefore, as illustrated in FIG. 41, two-stage elastic structures are disposed so as to be inclined. As illustrated in the figure, the thickness of the sensor can be reduced to about 0.7 times the original by inclining the elastic structure by 45 degrees even when the length L of the elastic structure is the same. The first elastic structure is disposed so as to be inclined with respect to the normal-line direction from one of the outer surfaces of the first member coupled to the first elastic structure. The second elastic structure is disposed so as to be inclined with respect to the normal-line direction from one of the outer surfaces of the second member coupled to the second elastic structure.

In FIG. 41, which is drawn with unequal scales for convenience of illustration, the distance between the first member 701 and the second member 702 looks comparatively large. However, this distance is smaller than the distance between the first member and the intermediate member and the distance between the second member and the intermediate member.

Moreover, as can be seen by comparing FIG. 41 with FIG. 36A, also regarding the distance L' between the second elastic structures 706, because a large distance in the thickness direction is not necessary, a thinner sensor can be realized. Although the present embodiment has been described by using plan views, when the direction perpendicular to the plane of figure is also considered, the two-stage elastic structure is a set of four or more elastic structures that are arranged in an XY lattice shape.

Figure 42A:
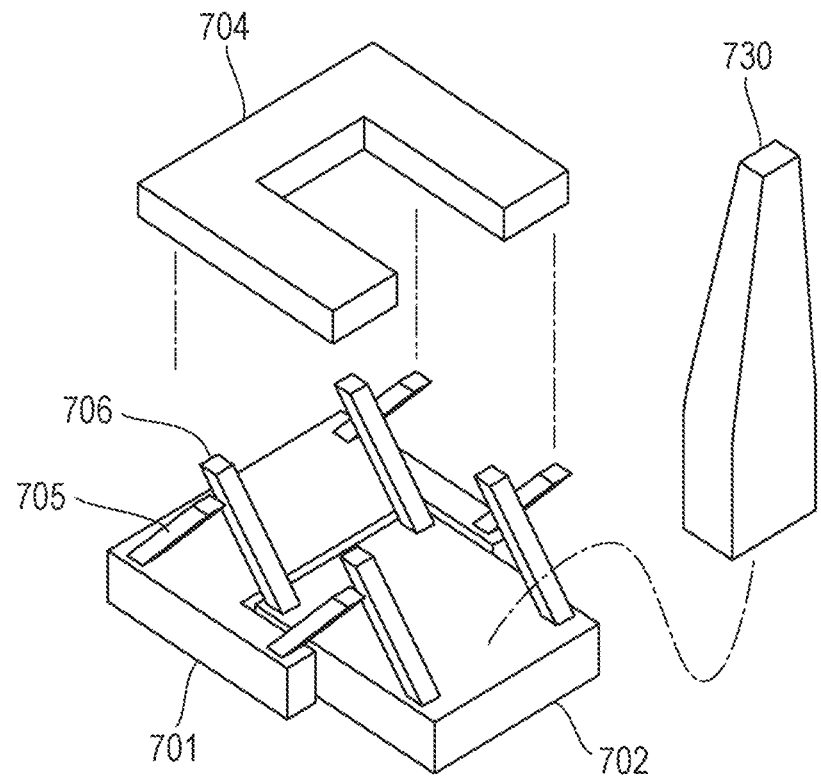
FIG. 42A is an exploded view of the inclined two sets of elastic structures illustrating the third embodiment.
Figure 42B:
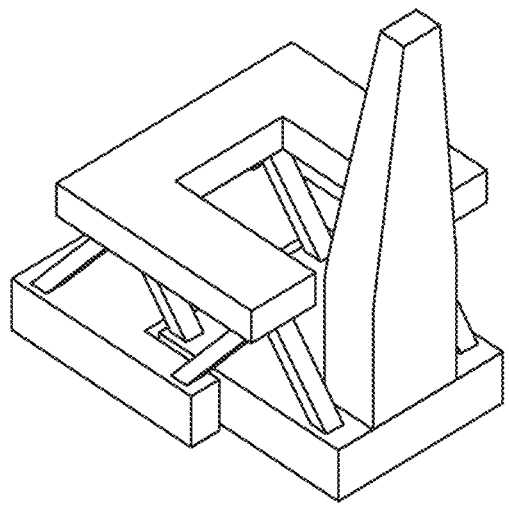
FIG. 42B is a perspective view of a completed body.

FIG. 42A is an exploded view illustrating the structure of the present embodiment. FIG. 42B is a perspective view of a completed body.

In the figures, the first member 701, the second member 702, the intermediate member 704 are provided, and the first member 701 and the intermediate member 704 are coupled to each other via the first elastic structure 705, which is composed of four or more elastic structures. The second member 702 and the intermediate member 704 are coupled to each other via the second elastic structure 706, which is composed of four or more elastic structures. The first member is fixed to a movement member (not shown) of a finger, and the second member 702 is fixed to the finger 730.

Next, the mechanical characteristics of four or more elastic structures that are two-dimensionally arranged in an XY lattice shape will be clarified. It will be clarified that a fingertip-force sensor having higher performance can be configured by increasing the number of elastic structures.

Figure 43:
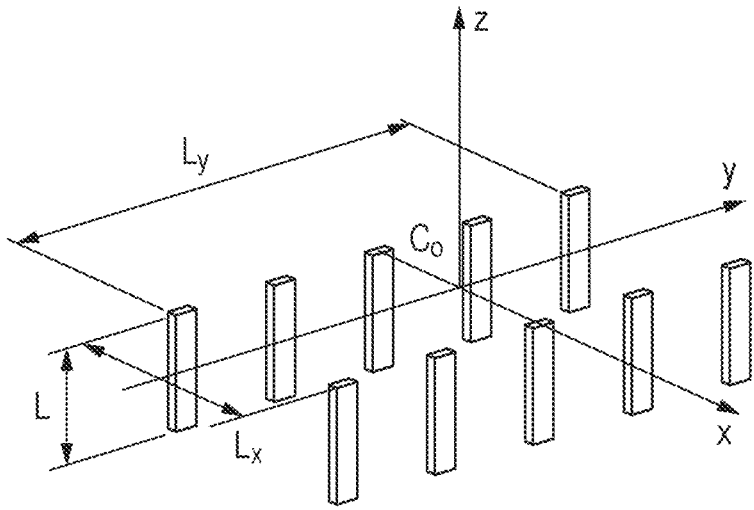
FIG. 43 is a perspective view of an elastic structure illustrating the third embodiment.

Referring to FIG. 43, this will be described. For convenience of description, a coordinate system $C_0$ is set at the center of the fingertip-force sensor, and a coordinate system $C_1$ is set at a point of application to which an external force is applied.

In the coordinate system $C_0$ in the figure, among the elastic structures that are arranged in an XY lattice shape, deformation of one elastic structure at the i-th column and j-th row will be considered. The bending deformations δpx and δpy in the X and Y directions of an elastic structure whose rotations at both ends are restrained and that has a rectangular cross section and the deformation δpz of the elastic structure in the Z direction have the following relationships with forces Px, Py, and Pz in the X, Y, and Z directions.

$$P_{x,i,j} = \frac{EH_x^3 H_y}{L^3}\delta_{px,i,j} \tag{50}$$

$$P_{y,i,j} = \frac{EH_x H_y^3}{L^3}\delta_{py,i,j} \tag{51}$$

$$P_{z,i,j} = \frac{EH_x H_y}{L}\delta_{pz,i,j} \tag{52}$$

Here, $H_x$ and $H_y$ are the thicknesses of the elastic structure in the X and Y directions. Deformation in a case where the elastic structures are arranged in Nx pieces in the X direction and Ny pieces in the Y direction will be calculated. The rigidity in the translation direction can represented as follows, because the elastic structures are connected in parallel.

$$K_x = \frac{F_x}{\delta_x} = \frac{EN_xN_yH_x^3H_y}{L^3} \tag{53}$$

$$K_y = \frac{F_y}{\delta_y} = \frac{EN_xN_yH_xH_y^3}{L^3} \tag{54}$$

$$K_z = \frac{F_z}{\delta_z} = \frac{EN_xH_yH_xH_y}{L} \tag{55}$$

When a rotation angle corresponding to a moment Mx around the X axis is represented by θx, because springs at positions that are separated from the origin by $L_y((j-1)/(Ny-1)+\frac{1}{2})$ are connected in parallel, $$K_{\theta x} = \frac{M_x}{\theta_x} = \sum_{i=1}^{N_x}\sum_{j=1}^{N_y}\frac{EH_xH_y}{L}\left(L_y\left(\frac{j-1}{N_y-1}-\frac{1}{2}\right)\right)^2 = \frac{EN_xN_yH_xH_y}{12L}\frac{L_y^2(N_y+1)}{(N_y-1)}. \tag{56}$$

A rotation angle θy corresponding to a moment My around the Y axis can be represented in a similar way.

$$K_{\theta y} = \frac{M_y}{\theta_y} = \frac{EN_x N_y H_x H_y}{12L} \frac{L_x^2(N_x+1)}{(N_x-1)} \quad (57)$$

Heretofore, the rigidity of the elastic body with respect to the coordinates $C_0$ of the fingertip-force sensor has been shown. At this time, it has been described that, as the rigidity in the translation direction decreases, a fingertip-force sensor having a higher sensitivity can be realized. However, it is preferable that the rotational rigidity be higher. This is because, if the position of a fingertip is displaced by a large distance due to a force applied to the fingertip, a high-precision operation such as assembly may be hindered.

Therefore, the ratio between the rotational rigidity and the translational rigidity will be considered. As the ratio increases, a fingertip-force sensor having a higher performance can be configured.

Regarding the X direction, the rigidity ratio α between the rotation direction and the translation direction is calculated as follows, $$\alpha = \frac{K_{\theta x}}{K_x} = \frac{L_x^2 L^2 (N_x+1)}{12 H_x^2 (N_x-1)}. \quad (58)$$

Here, because the rigidity in the translation direction is a design value that determines the sensitivity of the fingertip-force sensor, Bx is assumed as a constant so that the rigidity in the translation direction does not change even if the number Nx of elastic structures is changed, and when the thickness of the elastic structure is defined as $H_x = B_x(N_x)^{-1/3}$, the rigidity ratio α

$$\alpha = \frac{K_{\theta x}}{K_x} = \frac{L_x^2 L^2}{12 B_x^2} \frac{(N_x+1)N_x^{2/3}}{(N_x-1)} \quad (59)$$

is obtained.

Figure 44:
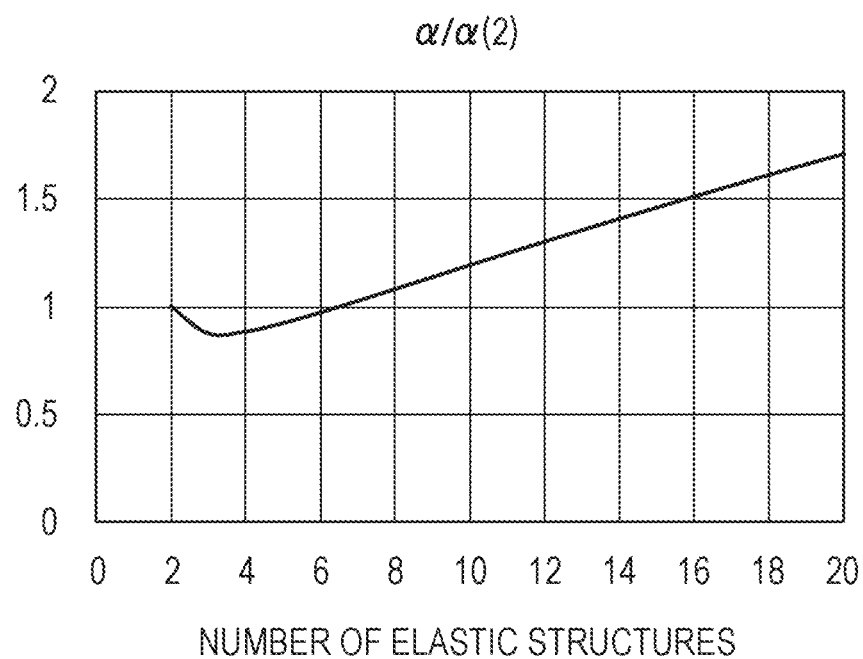
FIG. 44 is a graph of the rigidity ratio illustrating the third embodiment.

FIG. 44 is a graph in which the relationship between the number of elastic structures and α is plotted, in which α is normalized with respect to a value when the number Nx of elastic structures is 2.

The value "1" on the vertical axis represents a rigidity ratio that is the same as the rigidity ratio for the number of elastic structures of two. If the number of elastic structures is six or smaller, the rigidity ratio is the best when the number is two, but, if the number is increased to seven or more, the rigidity ratio becomes better than that when the number is two.

As described above, with the present embodiment, a thin fingertip-force sensor that has high sensitivity against a fingertip force can be configured. Moreover, by increasing the number of elastic structures, a sensor having high moment rigidity can be configured as described above.

With the present embodiment, by using multiple elastic structures and by connecting the elastic structures to each other via an inclined surface, the overhang angle can be made smaller than the limitation, and the sensor can be additively formed.

Moreover, because the displacement of a fingertip is magnified and detected as described below, a fingertip-force sensor having a higher sensitivity can be realized.

Figure 45:
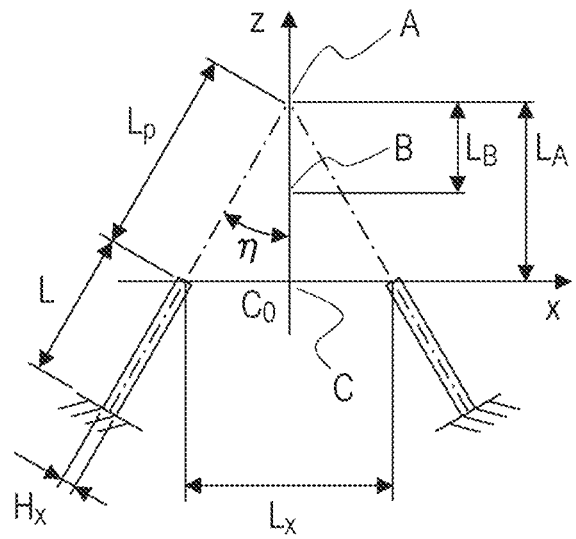
FIG. 45 is a schematic view of inclined two sets of elastic structures illustrating the third embodiment.

FIG. 45 is a schematic view of a radially-arranged elastic structure, which take into account a fingertip position and a sensor position. The point A is a target point that determines the direction of two elastic structures, and the point B is the position of a fingertip, to which a fingertip force is applied. The point C is the position of a sensor, and the displacement of this point is detected. The relationship between the displacement of the point A and a force at the point A has been shown in Expression (45). Here, the relationship between the displacement of the point C and a force at the point B will be shown.

The point B is a position to which a force that a fingertip receives from an object is applied. A formula that converts a force applied to the point A to the point B by coordinate transformation can be represented as follows.

$$\begin{bmatrix} ^BF_x \\ ^BF_x \\ ^BM_y \end{bmatrix} = \begin{bmatrix} 1 & 0 & 0 \\ 0 & 1 & 0 \\ L_B & 0 & 1 \end{bmatrix} \begin{bmatrix} ^AF_x \\ ^AF_x \\ ^AM_y \end{bmatrix} \quad (60)$$

The point C is a position where a sensor that measures the deformation of the elastic body is disposed. A formula that converts a deformation of the point C to the point A by coordinate transformation can be represented as follows.

$$\begin{bmatrix} ^A\delta_x \\ ^A\delta_z \\ ^A\theta_y \end{bmatrix} = \begin{bmatrix} 1 & 0 & L_a \\ 0 & 1 & 0 \\ 0 & 0 & 1 \end{bmatrix} \begin{bmatrix} ^C\delta_x \\ ^C\delta_z \\ ^C\theta_y \end{bmatrix} \quad (61)$$

From these and Expression (45), the displacement of the position of the sensor (point C) due to a force applied to the fingertip (point B) can be calculated. When only the components of the force related the fingertip-force sensor are shown, the displacement is as follows.

$$\begin{bmatrix} ^C\delta_x \\ ^C\delta_z \end{bmatrix} = \begin{bmatrix} \dfrac{(AL^2-12I)L\cos(\eta)L_B + 12L_p IL}{24L_p AEI} & 0 \\ 0 & \dfrac{L^3}{2E(\cos^2(\eta)AL^2 + 12\sin^2(\eta)I)} \end{bmatrix} \begin{bmatrix} ^BF_x \\ ^BF_z \end{bmatrix} \quad (62)$$

The coefficient of the above equation is the sensitivity matrix of the fingertip-force sensor. In can be seen that, by changing the position $L_B$ of the point B to which the force is applied, the (1,1)-th term of the above equation, that is, the sensitivity $S_x$, in the X direction receives an influence. This term will be focused on.

$$S_x = \frac{^C\delta_x}{^BF_x} = \frac{(AL^2-12I)L\cos(\eta)L_B + 12L_p IL}{24L_p AEI} = \frac{(AL^2-12I)L\cos(\eta)}{24L_p AEI}L_B + \frac{L}{2AE} \quad (63)$$

The sign of the parenthesized part of the first term of the right-hand side will be considered. Assuming that the elastic structure has a rectangular cross section of width b and thickness h, this part is as follows.

$$AL^2 - 12I = bh(L^2 - h^2) \qquad (64)$$

The above expression is positive, because the length L of an elastic structure is usually larger than the thickness h. Accordingly, the sensitivity $S_x$ when $L_B$ is positive is necessarily larger than that when $L_B$ is zero, and the sensor sensitivity is improved.

In other words, by disposing the center point A of the radial elastic structure at a position farther than the point B of the fingertip to which a force is applied, the sensor sensitivity can be improved.

For example, it is assumed that the distance Lx between elastic structures that determines the size of the fingertip-force sensor is 20 mm, the Young's modulus E of the elastic structure is 200 GPa, the width and the thickness of the elastic structure are each 1 mm, and the length L of the elastic structure is 10 mm. The distance $L_A$-$L_B$ from the displacement sensor to the fingertip to which a force is applied is a constant value of 30 mm.

Figure 46:
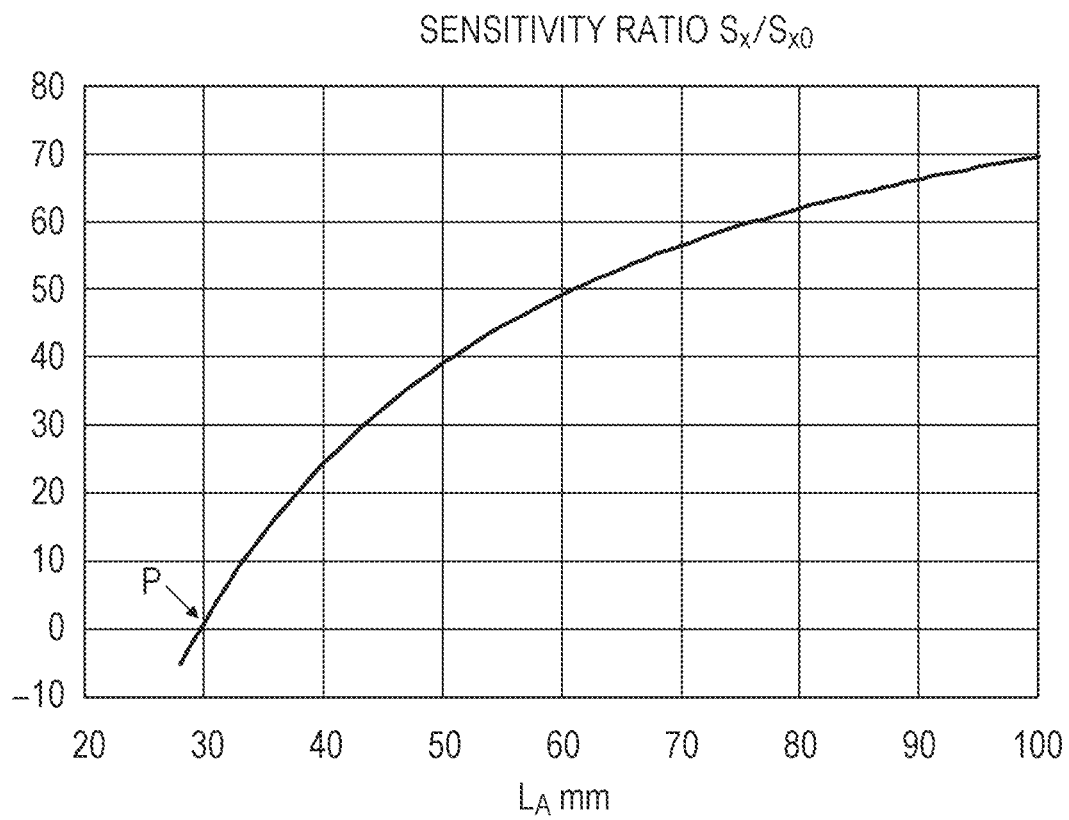
FIG. 46 is a graph of the sensitivity ratio illustrating the third embodiment.

FIG. 46 is a graph in which the ratio between the distances $L_A$ and $L_B$ to the center points of the radially-arranged elastic structures is represented along the horizontal axis and the sensitivity S, in Expression (63) that is normalized with respect to a value when $L_B$=0 is plotted. In the figure, P represents a case where $L_A$=30 mm, that is, $L_B$=0, and the value of the vertical axis is 1. As can be seen from this figure, when the distance $L_A$ to the center point of the elastic structure is longer than 30 mm, the sensitivity ratio is higher than 1 and is preferable.

As described above, by disposing the center point of the elastic structure at a position farther than the fingertip, a fingertip-force sensor having high sensitivity can be configured.

Figure 47A:
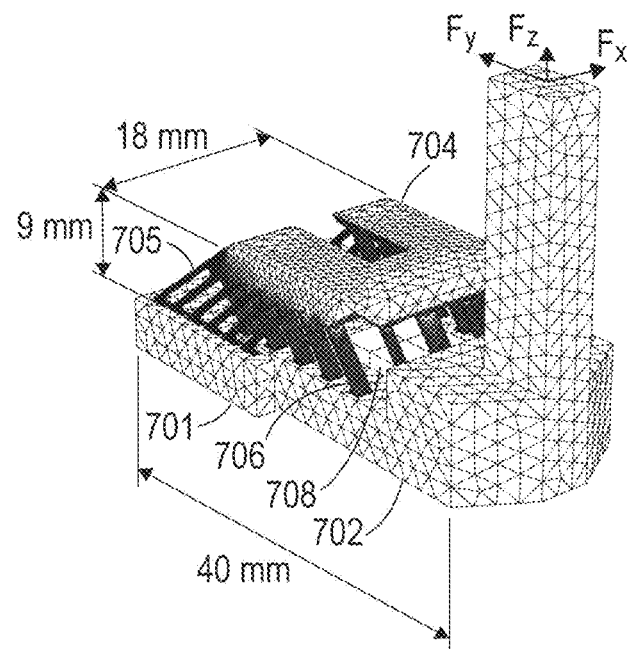
FIG. 47A is a deformation simulation model according to the third embodiment.

FIG. 47A is an FEM model of the elastic body used for simulation. This model is the same as the structure described above with reference to FIGS. 32 to 34. The main features are as follows: first, the width of the elastic structure is larger than the thickness; second, there are twelve first elastic structures 705, including six on each side; third, there are thirteen second elastic structures 706, including five on each side and three in a middle portion.

The width, the thickness, the length, and the number of the elastic structures are design parameters of the fingertip-force sensor according to the present embodiment. An object of the FEM simulation is to determine the design parameters.

Figure 47B:
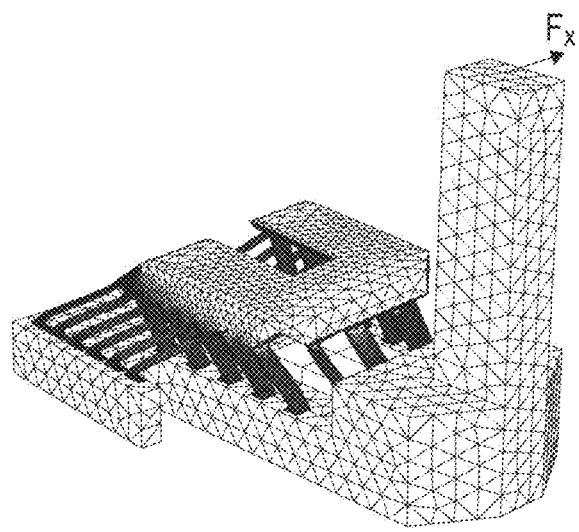
FIG. 47B illustrates deformation when an external force Fx in the X direction is applied.
Figure 47C:
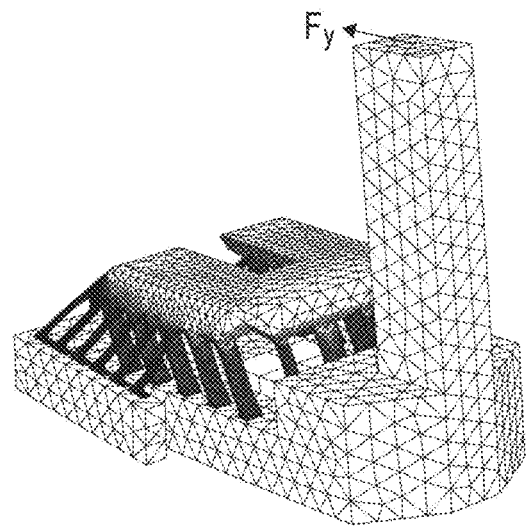
FIG. 47C illustrates deformation when an external force Fy in the Y direction is applied.
Figure 47D:
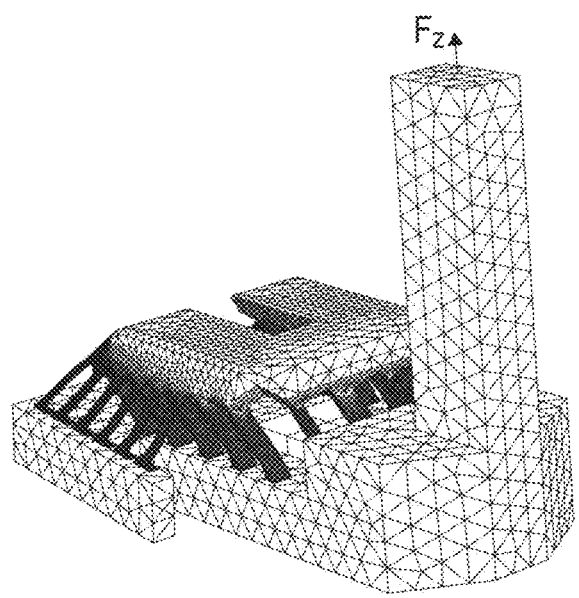
FIG. 47D illustrates deformation when an external force Fz in the Z direction is applied.

FIG. 47B shows calculation results when a force Fx=30 N is applied to the fingertip. This figure is exaggerated so that deformation can be easily seen. FIG. 47C is a deformation calculation result when a force Fy=30 N is applied to the fingertip. FIG. 47D shows calculation result when a force Fz=30 N is applied to the fingertip.

As described above, the displacement detector that detects the deformation of the elastic body detects the position of the magnet 708. The following table shows change in position of the magnet, which is obtained by FEM calculation.

TABLE 4

| Fingertip Force | Displacement δx (μm) | Displacement δy (μm) | Displacement δz (μm) |
|---|---|---|---|
| Fx 30N | −20 | 0 | 18 |
| Fy 30N | 0 | 117 | 0 |
| Fz 30N | 5 | 0 | 41 |

As shown in the table, in this design example, the sensitivity in the Y direction is the highest.

This result can be represented by a matrix as follows, $$\begin{bmatrix} \delta_x \\ \delta_y \\ \delta_z \end{bmatrix} = \begin{bmatrix} -0.667 & 0 & 0.167 \\ 0 & 3.900 & 0 \\ 0.600 & 0 & 1.367 \end{bmatrix} \begin{bmatrix} F_x \\ F_y \\ F_z \end{bmatrix}. \qquad (65)$$

From this equation, as a calculation formula, which corresponds to Expression (39), for calculating a fingertip force from the output of the displacement detector, $$\begin{bmatrix} F_x \\ F_y \\ F_z \end{bmatrix} = \begin{bmatrix} -1.352 & 0 & 0.165 \\ 0 & 0.256 & 0 \\ 0.593 & 0 & 0.659 \end{bmatrix} \begin{bmatrix} \delta_x \\ \delta_y \\ \delta_z \end{bmatrix} \qquad (66)$$

is obtained.

By performing the FEM deformation simulation repeatedly, the design parameters, such as the width and the thickness of the elastic structure, are determined so that desirable sensitivity can be obtained.

Next, a method of manufacturing the force-sense sensor according to the present invention a will be described.

Figure 48A:
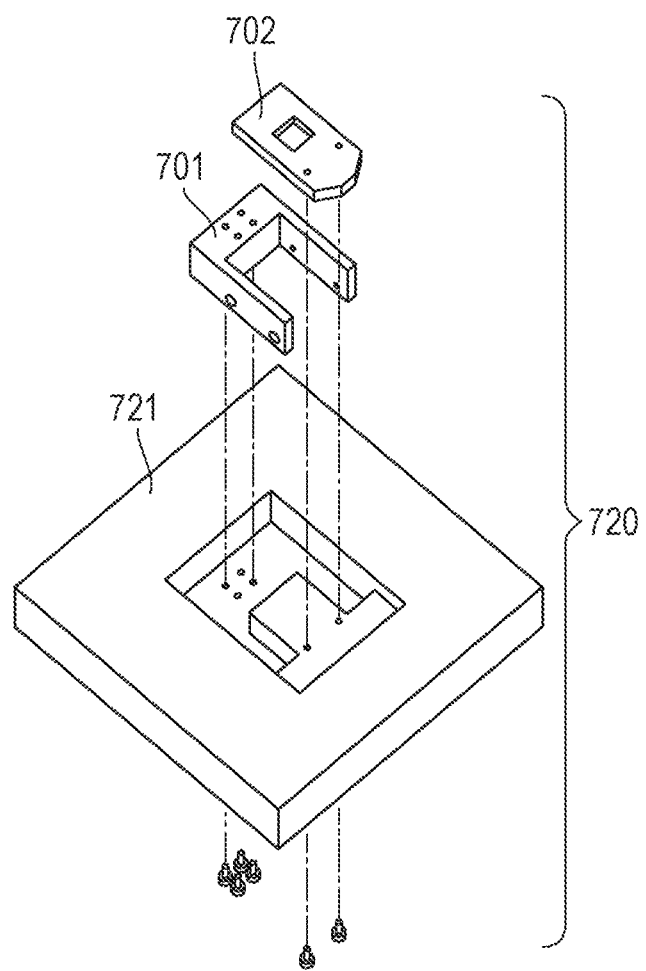
FIG. 48A is an exploded view of a forming unit according to the third embodiment.
Figure 48B:
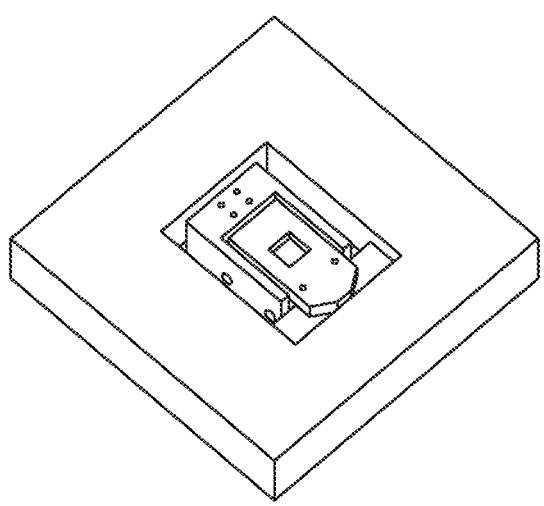
FIG. 48B is an assembly view of the forming unit.

FIG. 48A is an exploded view illustrating a forming unit 720 to be attached to the additive forming apparatus. FIG. 48B is completed view of the forming unit 720.

The first member 701 and the second member 702, which are high-precision components that are manufactured by using a milling machine or the like, are fixed to a forming plate 721 with screws, thereby completing the forming unit 720. Detailed descriptions of forming of these members by using a lathe or the like, screwing of these members to the forming plate 721 shown in FIG. 48A, and irradiation of these members with a laser beam, which are the same as those in the first embodiment, will be omitted.

Figure 49A:
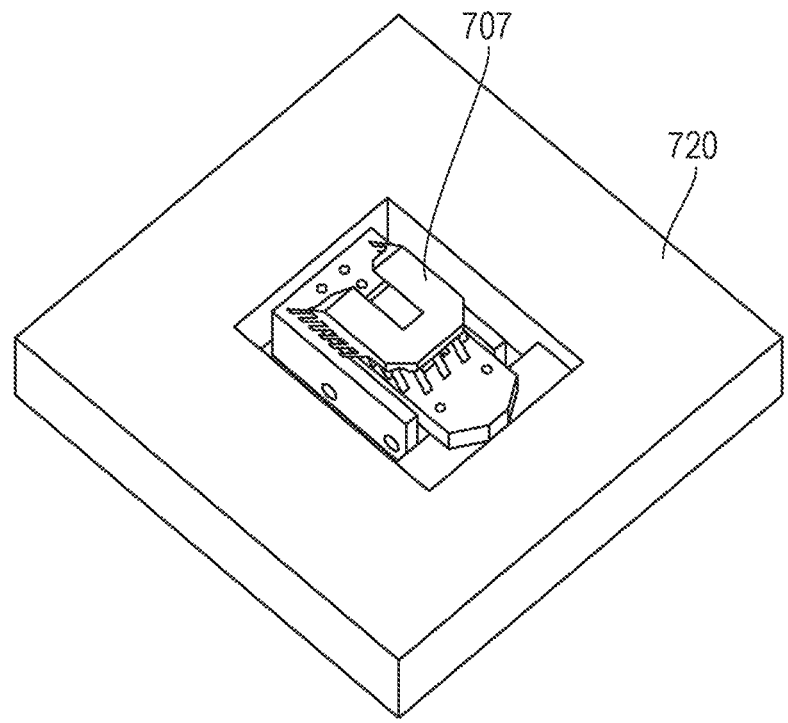
FIG. 49A illustrates an elastic body that is additively formed on a forming plate.
Figure 49B:
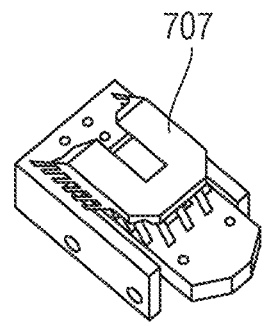
FIG. 49B is a perspective view of a completed elastic body.

FIG. 49A illustrates a state in which an elastic body 707 has been completed by additively forming the elastic body 707 on the forming unit 720. The elastic body 707 is a structure in which the first elastic structure 705, the second elastic structure 706, and the intermediate member 704 are additively formed on the first member 701 and the second member 702. As illustrated in FIG. 49B, the elastic body 707 is completed by removing fixing screws of the forming plate. Then, after forming a three-dimensional formed object in which the first member, the second member, the first elastic structure, the second elastic structure, and the intermediate member are integrated, the three-dimensional formed object is removed from the forming plate.

With this manufacturing method, compared with existing additive forming methods, the manufacturing cost can be reduced in the first to fourth respects described in the first embodiment. Thus, the fingertip-force sensor according to the present embodiment can be manufactured by using an additive forming method, and the manufacturing cost can be reduced.

In contrast to existing machining, with the additive forming method, it is easy to increase the number of elastic structures and to further improve the moment rigidity. Even if a manufacturing error occurs, because the number of elastic structures is large, the manufacturing error of each elastic structure is averaged out, and influence is small.

In the present embodiment, a case where manufacturing is performed by using an additive forming method has been described. However, this is not a limitation. For example, manufacturing may be performed by machining.

In the present embodiment, the cross-sectional shape of the elastic structure is a rectangular shape. However, the cross-sectional may be a shape other than a rectangular shape. For example, the cross-sectional shape may be a rectangular shape with rounded corners or an elliptical shape.

First Modification of Third Embodiment

Referring to FIG. 50, a modification of the third embodiment will be described. The modification differs from the third embodiment in the first elastic structure and is the same as the third embodiment in other respects.

Figure 50A:
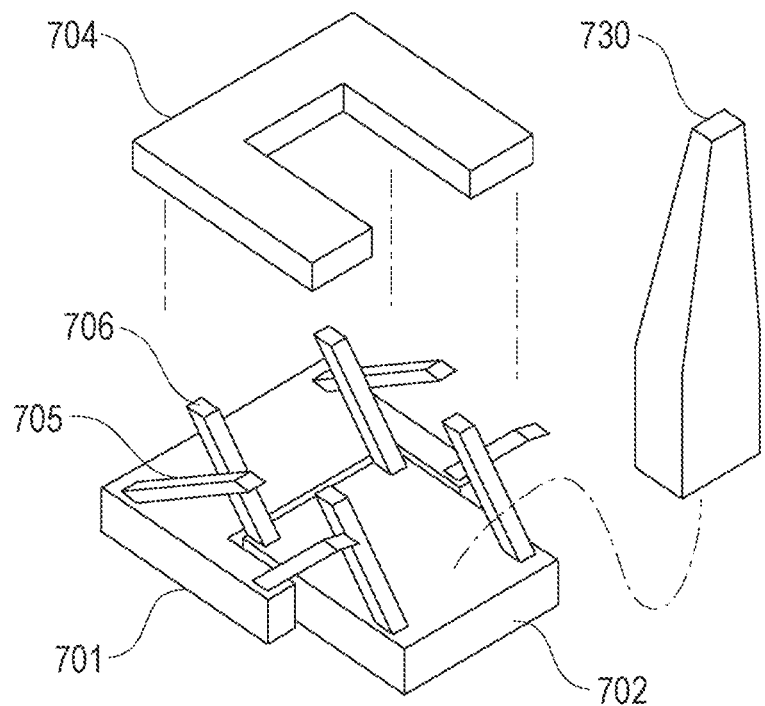
FIG. 50A is an exploded view of an elastic structure according to a first modification of the third embodiment.
Figure 50B:
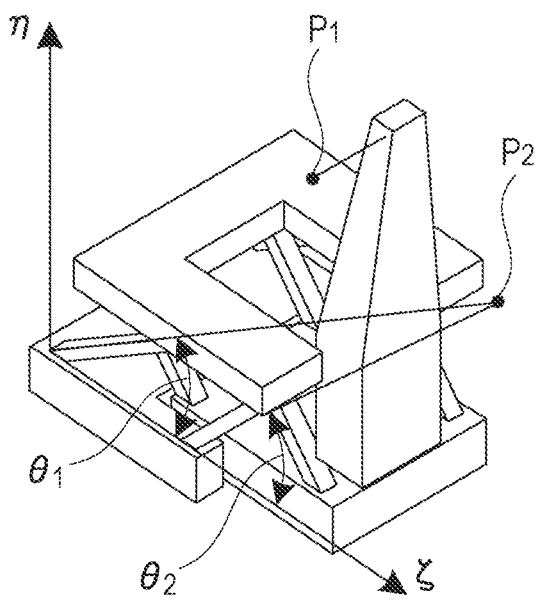
FIG. 50B is a completed view of the elastic structure according to the first modification of the third embodiment.

FIG. 50A is an exploded view for description, and FIG. 50B is a completed view.

The first member 701, the second member 702, and the intermediate member 704 are provided, and the first member 701 and the intermediate member 704 are coupled to each other via the first elastic structure 705 that is composed of four or more elastic structures. The second member 702 and the intermediate member 704 are coupled to each other via the second elastic structure 706 that is composed of four or more elastic structures. The first member is fixed to fixed to a movement member (not shown) of a finger, and the second member 702 is fixed to the finger 730.

The first elastic structure 705 is a radial elastic structure that is disposed on a plane $\eta$–$\xi$ that is spanned by the vertical axis $\eta$ and the horizontal axis $\xi$. A center point $P_2$ is on the plane, and the first elastic structure is directed toward this point. The projection of a point at the distal end of the finger 730 onto the plane $\eta$–$\xi$ will be denoted by $P_1$.

The present embodiment is characterized in that the center point $P_2$ is disposed outside of the point $P_1$. With such disposition, as described above, displacement at the sensor position relative to a force applied to the fingertip $P_1$ is large, and it is possible to configure a fingertip-force sensor having high sensitivity.

Second Modification of Third Embodiment

Figure 51A:
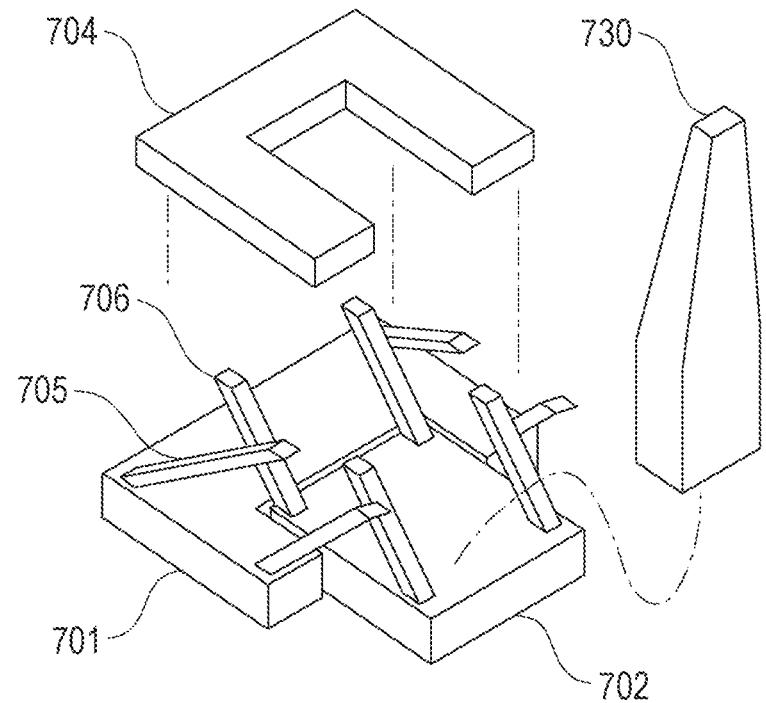
FIG. 51A is an exploded view of an elastic structure according to a second modification of the third embodiment.
Figure 51B:
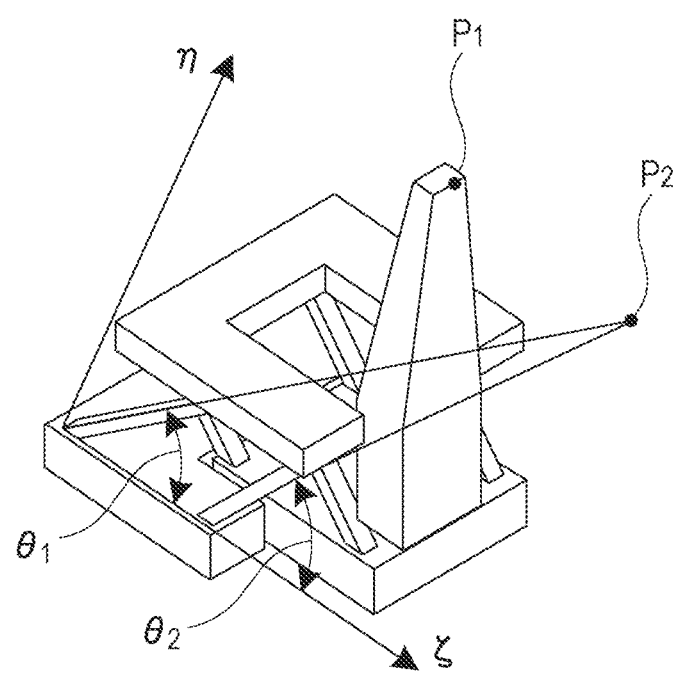
FIG. 51B is a completed view of the elastic structure according to the second modification of the third embodiment.
Figure 52:
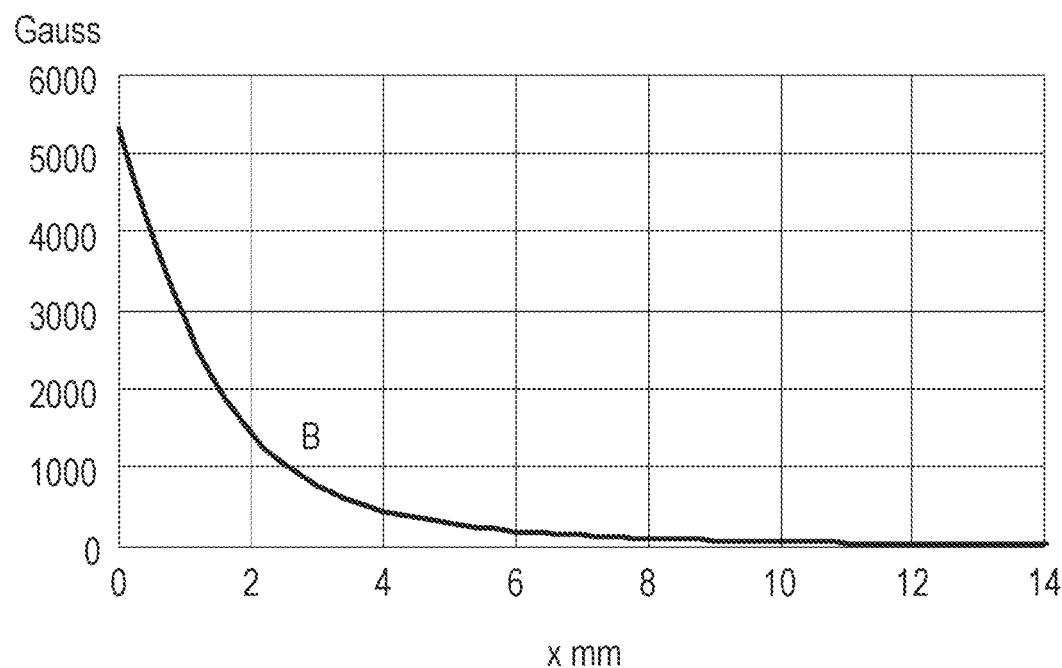
FIG. 52 is a graph illustrating the relationship between the distance and the magnetic flux density of a cylindrical permanent magnet.

Referring to FIG. 51A and FIG. 51B, a second modification of the third embodiment will be described. The modification differs from the other modification illustrated in FIG. 50 in the first elastic structure, particularly the position of the center point $P_2$, and is the same as the other modification in other respects. FIG. 51A is an exploded view for description, FIG. 51B is a completed view.

The first elastic structure 705 is a radial elastic structure that is disposed on a plane $\eta$–$\xi$ that includes the horizontal axis $\xi$ and a point $P_1$ at the distal end of the finger 730. A center point $P_2$ is on the plane, and the first elastic structure is directed toward this point.

With such disposition, as described above, displacement at the sensor position relative to a force applied to the fingertip $P_1$ is large, and it is possible to configure a fingertip-force sensor having high sensitivity.

Third Modification of Third Embodiment

Figure 57:
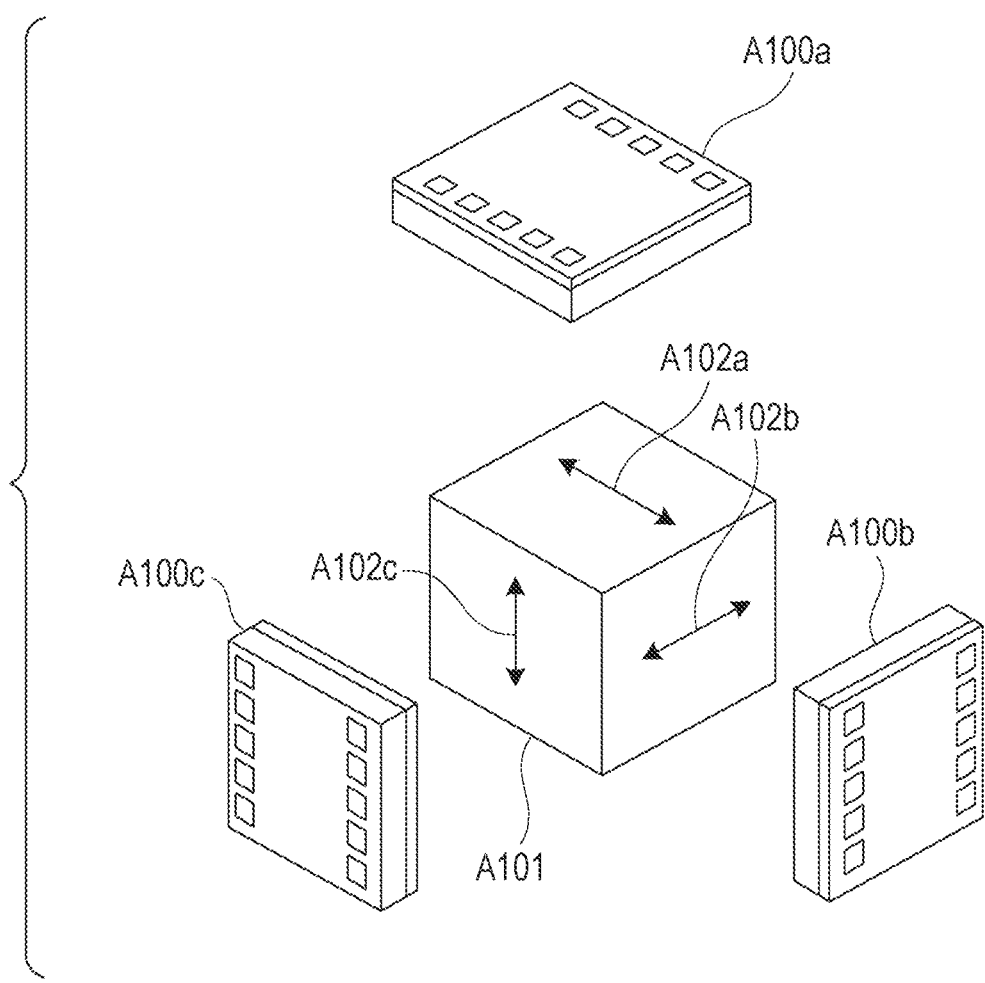
FIG. 57 illustrates a combination of optical displacement sensors.
Figure 58:
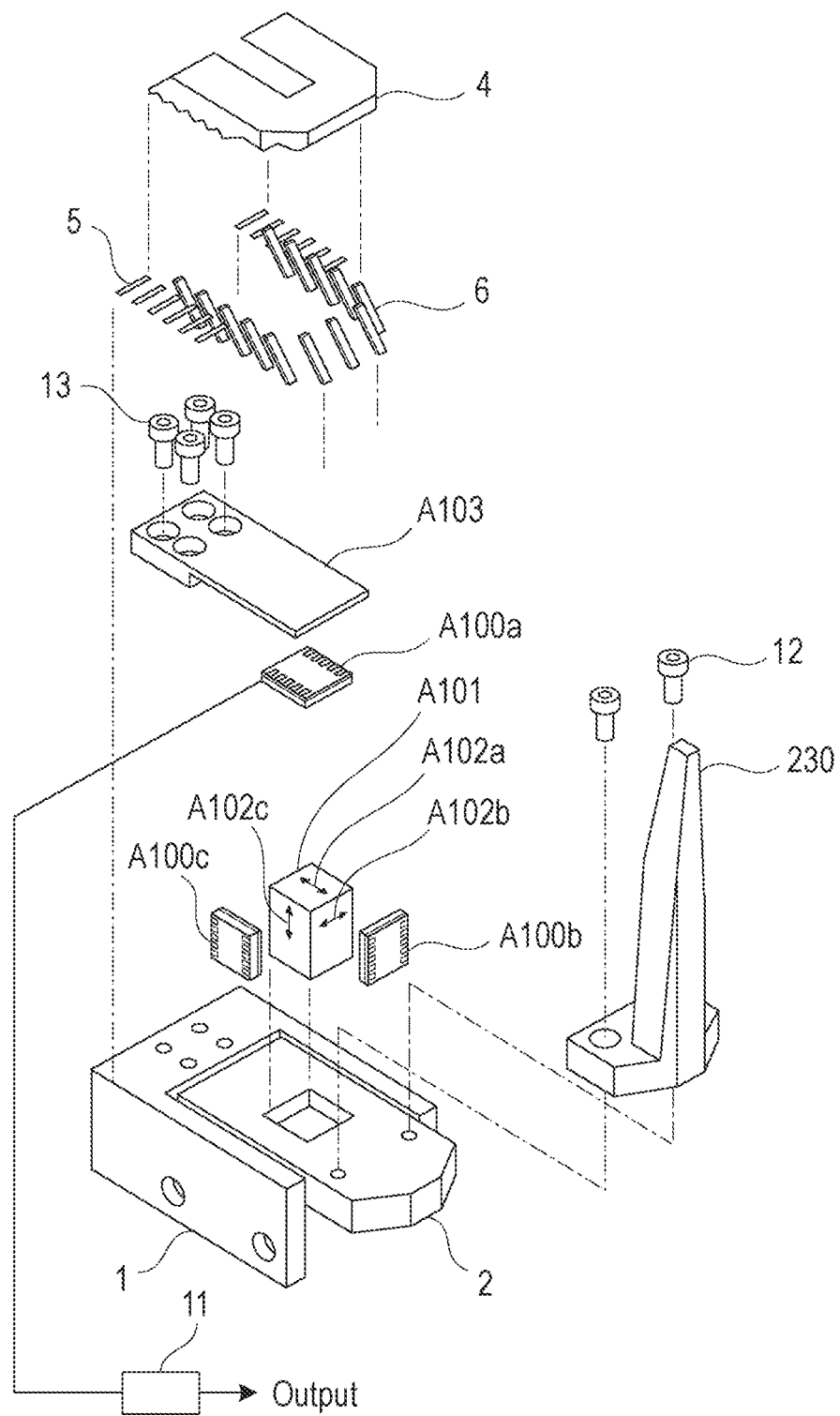
FIG. 58 is a schematic view of a fingertip-force sensor according to a modification of the third embodiment.

Referring to FIGS. 57 and 58, as a third modification of the third embodiment, an embodiment in which an optical sensor, instead of a magnetic sensor, is used as a displacement detector will be described.

FIG. 57 illustrates an example in which a relative position detector in three directions is configured by combining three optical sensors. A scale A101 includes diffraction gratings A102a to A102c in three directions, and three circuit units A100a to A100c are provided so as to face the diffraction gratings.

An optical sensor that simultaneously measures displacements in two directions by using a diffraction grating that is grooved in two directions is also known. Because integration is possible also in this case, it is possible to configure a fingertip-force sensor in a small size. Moreover, as disclosed in Japanese Patent No. 4779117, by appropriately designing an optical system, it is possible to simultaneously measure displacements in three directions by using one diffraction grating.

FIG. 58 is an exploded view of a fingertip-force sensor including such an optical sensor. Because the relative position detector is the only difference from the third embodiment, this portion will be mainly described.

A scale A101 is provided so as to be fixed to the second member 2. The scale A101 is a rectangular parallelepiped, and includes different diffraction gratings A102a to A102c on three surfaces of the rectangular parallelepiped. Three circuit units A100a to A100c are provided so as to be fixed to the electric board A103 and to face the diffraction gratings. The electric board A103 for an optical sensor is fixed to the first member with screws 13. Electric signals of the circuit units A100a to A100c are coupled to the control circuit board 11 via the electric board A103, and three-direction displacements of the first member 1 and the second member 2 are output. Although an example in which three optical sensors each of which measures only one direction are combined has been described, an optical sensor that simultaneously measures three directions by using one diffraction grating may be used.

As described above, with the third embodiment and the modifications thereof, it is possible to provide a fingertip-force sensor that has high detection precision, that is compact, and that can be manufactured at low cost.

Other Embodiments

Embodiments of the present invention are not limited to those described above, and parts of the embodiments may be modified or combined within the technological scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A force sensor that detects information of a force by using a relative displacement amount between a first member and a second member,
wherein the first member and the second member are connected to each other via a first elastic structure, a second elastic structure, and an intermediate member,
wherein the first elastic structure connects the first member and the intermediate member, wherein the second elastic structure connects the second member and the intermediate member, and wherein a displacement detector that detects the relative displacement amount between the first member and the second member is provided in the first member and the second member, wherein the intermediate member is disposed at a distance from the first member and the second member, the first elastic structure is disposed in such a way as to protrude from the first member toward the intermediate member, and the second elastic structure is disposed in such a way as to protrude from the second member toward the intermediate member, and wherein a first distance between the first member and the second member is smaller than each of a second distance between the first member and the intermediate member and a third distance between the second member and the intermediate member.

2. The force sensor according to claim 1,
wherein the first member, the second member, and the intermediate member
are disposed in such a way that an end portion of the first member connected to the first elastic structure and an end portion of the second member connected to the second elastic structure face an end portion of the intermediate member connected to the first elastic structure and the second elastic structure.

3. The force sensor according to claim 1,
wherein a surface, of the first member, connected to the first elastic structure is a first surface, and a surface, of the second member, connected to the second elastic structure is a second surface,
wherein the first member has a third surface extending in a direction perpendicular to the first surface and provided at an edge of the first surface on the second member side,
wherein the second member has a fourth surface extending in a direction perpendicular to the second surface and provided at an edge of the second surface on the first member side, and
wherein the first distance is a distance between the third surface and the fourth surface.

4. The force sensor according to claim 1,
wherein the first member and the second member are disposed along a predetermined plane, and
wherein the intermediate member is disposed to be separated from the plane in such a way that, when the intermediate member is projected onto the plane, at least a part of a projection of the intermediate member overlaps a gap between the first member and the second member.

5. The force sensor according to claim 1,
wherein the first elastic structure is inclined with respect to a normal-line direction of a surface of the first member connected to the first elastic structure.

6. The force sensor according to claim 5,
wherein the second elastic structure is inclined with respect to a normal-line direction of a surface of the second member connected to the second elastic structure.

7. The force sensor according to claim 6, comprising:
a plurality of the first elastic structures and a plurality of the second elastic structures,
wherein the plurality of first elastic structures and the plurality of second elastic structures are arranged so as to intersect when seen in a predetermined direction.

8. A method of manufacturing the force sensor according to claim 1, comprising:
positioning and fixing the first member and the second member to a forming plate so as to be removable;
forming the first elastic structure, the second elastic structure, and the intermediate member on upper surfaces of the first member and the second member by stacking layers of a forming material; and
after forming a three-dimensional formed object in which the first member, the second member, the first elastic structure, the second elastic structure, and the intermediate member are integrated, removing the three-dimensional formed object from the forming plate.

9. The method of manufacturing the force sensor according to claim 8,
wherein the first elastic structure, the second elastic structure, and the intermediate member are formed by stacking layers of powder of the forming material and performing laser irradiation in accordance with shapes of the first elastic structure, the second elastic structure, and the intermediate member.

10. A control method for controlling the force sensor according to claim 1,
wherein the force applied between the first member and the second member is detected using an output of the displacement detector.

11. A non-transitory computer-readable storage medium storing a control program capable of executing the control method according to claim 10.

12. A robot apparatus comprising: the force sensor according to claim 1.

13. A method of manufacturing an object by using the robot apparatus according to claim 12.

14. A torque sensor that detects a torque value by using a relative displacement angle between an annular first member and an annular second member,
wherein the first member and the second member are connected to each other via a first elastic structure, a second elastic structure, and an intermediate member,
wherein the second member has a larger radius than the first member,
wherein the first member and the second member are disposed along a predetermined plane in such a way that a central axis of the first member and a central axis of the second member are coaxial,
wherein the first elastic structure connects the first member and the intermediate member,
wherein the second elastic structure connects the second member and the intermediate member,
wherein a displacement detector that detects the relative displacement angle between the first member and the second member is provided in the first member and the second member, and
wherein the first elastic structure and the second elastic structure are alternately arranged in a circumference direction centered on the central axis,
wherein the intermediate member is disposed at a distance from the first member and the second member, the first elastic structure is disposed in such a way as to protrude from the first member toward the intermediate member, and the second elastic structure is disposed in such a way as to protrude from the second member toward the intermediate member, and
wherein a first distance between the first member and the second member is smaller than each of a second distance between the first member and the intermediate member and a third distance between the second member and the intermediate member.

15. The torque sensor according to claim 14,
wherein a thickness of the first elastic structure is smaller on a side farther from the central axis than on a side nearer to the central axis on the first member side and is smaller on a side nearer to the central axis than on a side farther from the central axis on the intermediate member side, and
wherein a thickness of the second elastic structure is smaller on a side nearer to the central axis than on a side farther from the central axis on the second member side and is smaller on a side farther from the central axis than on a side nearer to the central axis on the intermediate member side.

16. The torque sensor according to claim 14,
wherein the first elastic structure and/or the second elastic structure includes
a plurality of elastic bodies that are separated by a slit.

17. A force-sense sensor that measures a six-axis external force including a force and a moment by using a relative displacement amount between an annular first member and an annular second member,
wherein the first member and the second member are coupled to each other via a first elastic structure, a second elastic structure, and an intermediate member,
wherein the second member has a larger radius than the first member,
wherein the first member and the second member are disposed along a predetermined plane in such a way that a central axis of the first member and a central axis of the second member are coaxial,
wherein the first elastic structure couples the first member and the intermediate member,
wherein the second elastic structure couples the second member and the intermediate member,
wherein a displacement detector that detects the relative displacement amount between the first member and the second member is provided in the first member and the second member,
wherein a plurality of the first elastic structures are arranged on a circumference that is concentric with the central axis of the first member with a distance therebetween and are arranged so as to be inclined at a first torsional inclination angle with respect to an axial line perpendicular to the circumference,
wherein a plurality of the second elastic structures are arranged on a circumference that is concentric with the central axis of the second member with a distance therebetween and are arranged so as to be inclined at a second torsional inclination angle with respect to an axial line perpendicular to the circumference,
wherein the first torsional inclination angle and the second torsional inclination angle are torsional inclination angles that are in directions opposite to each other, and
wherein a rigidity of each of the first elastic structure and the second elastic structure is lower than a rigidity of each of the first member, the intermediate member, and the second member.

18. The force-sense sensor according to claim 17,
wherein the first elastic structure has a shape that is curved so as to be convex in a direction away from the center, and
wherein the second elastic structure has a shape that is curved so as to be convex in a direction toward the center.

19. A fingertip-force sensor that is provided at a fingertip of a robot hand and that detects a force applied to the fingertip by using a relative displacement amount between a first member and a second member,
wherein the first member and the second member are coupled to each other via a first elastic structure, a second elastic structure, and an intermediate member,
wherein the first member and the second member are disposed along a predetermined plane,
wherein the first elastic structure couples the first member and the intermediate member,
wherein the second elastic structure couples the second member and the intermediate member,
wherein a displacement detector that detects the relative displacement amount between the first member and the second member is provided in the first member and the second member,
wherein the first elastic structure includes four or more first elastic structures that are arranged in two or more rows,
wherein the second elastic structure includes four or more second elastic structures that are arranged in two or more rows, and
wherein a direction in which the first elastic structures are arranged and a direction in which the second elastic structures are arranged differ by 25 degrees or more.

20. The fingertip-force sensor according to claim 19,
wherein, when seen from a coordinate system having an origin at a position of the displacement detector, the first elastic structure is disposed so as to be directed toward a position separated farther from the fingertip.

\* \* \* \* \*